(12) United States Patent
MacKay et al.

(10) Patent No.: US 11,972,654 B2
(45) Date of Patent: Apr. 30, 2024

(54) LIGHTWEIGHT VANDAL RESISTANT PARKING METER

(71) Applicant: J.J. MacKay Canada Limited, New Glasgow (CA)

(72) Inventors: George Allan MacKay, New Glasgow (CA); James George MacKay, New Glasgow (CA); Adrian Ignatius O'Neil, New Glasgow (CA); Robert Steven Cosh, Antigonish (CA); Darren Scott Cameron, New Glasgow (CA); Gregory Emile Chauvin, Brookside (CA); David Andrew McMullin, Ottawa (CA); Michael Brown, Ottawa (CA); Matthew Watson, Ottawa (CA)

(73) Assignee: J.J. MacKay Canada Limited, New Glasgow (CA)

( * ) Notice: Subject to any disclaimer, the term of this patent is extended or adjusted under 35 U.S.C. 154(b) by 0 days.

(21) Appl. No.: 15/750,273

(22) PCT Filed: Aug. 8, 2016

(86) PCT No.: PCT/CA2016/050928
§ 371 (c)(1),
(2) Date: Feb. 5, 2018

(87) PCT Pub. No.: WO2017/024397
PCT Pub. Date: Feb. 16, 2017

(65) Prior Publication Data
US 2018/0225909 A1    Aug. 9, 2018

(30) Foreign Application Priority Data

Aug. 11, 2015 (CA) .............................. CA 2900177
Oct. 16, 2015 (CA) .............................. CA 2908793
Jun. 9, 2016 (CA) .............................. CA 2932667

(51) Int. Cl.
*G07F 17/24*    (2006.01)
*G07F 5/00*    (2006.01)
(Continued)

(52) U.S. Cl.
CPC .............. *G07F 17/248* (2013.01); *G07F 5/00* (2013.01); *G07F 7/088* (2013.01); *G07F 7/0893* (2013.01);
(Continued)

(58) Field of Classification Search
CPC . G07F 17/248; G07F 9/10; G07F 5/00; G07F 7/088; G07F 7/0893; G07F 9/023;
(Continued)

(56) References Cited

U.S. PATENT DOCUMENTS 480,108 A    8/1892  Loch
1,189,991 A    7/1916  Mugler
(Continued)

FOREIGN PATENT DOCUMENTS

AT    507762 A1    7/2010
AU    4035701    9/2001
(Continued)

OTHER PUBLICATIONS

MacKay Custodian TM Multi-Space Machine Configuration Guide, 2003-2005 (184 pages).
(Continued)

*Primary Examiner* — Jeffrey A Shapiro
(74) *Attorney, Agent, or Firm* — Neal L. Slifkin; Harris Beach PLLC

(57) ABSTRACT

A parking meter may have a housing that is formed at least significantly of an impact resistant material. In particular, the impact resistant material may comprise one of a polycarbonate copolymer or polycarbonate blended resin, a nylon-based copolymer, or a nylon-based polymer that includes
(Continued)

long glass fiber or Kevlar fiber. The housing encloses the parking meter components to provide protection for the parking meter components against an external environment and vandalism attacks.

35 Claims, 22 Drawing Sheets

(51) Int. Cl.
  *G07F 7/08*  (2006.01)
  *G07F 9/02*  (2006.01)
  *G07F 9/10*  (2006.01)
  *H04B 1/02*  (2006.01)
  *H04W 84/12*  (2009.01)

(52) U.S. Cl.
  CPC ............... *G07F 9/023* (2013.01); *G07F 9/10* (2013.01); *G07F 17/24* (2013.01); *H04B 1/02* (2013.01); *H04W 84/12* (2013.01)

(58) Field of Classification Search
  CPC ........ G07F 17/24; G07F 9/009; H04W 84/12; H04B 1/02; G07D 11/12
  See application file for complete search history.

(56) References Cited

U.S. PATENT DOCUMENTS

| | | |
|---|---|---|
| 1,445,771 A | 2/1923 | Keplinger |
| 1,818,568 A | 8/1931 | Melick |
| D98,810 S | 3/1936 | Magee |
| D100,875 S | 8/1936 | Michaels et al. |
| D101,237 S | 9/1936 | Miller |
| D106,561 S | 10/1937 | Broussard et al. |
| D107,577 S | 12/1937 | McGay et al. |
| 2,118,318 A | 5/1938 | Magee |
| D112,677 S | 12/1938 | Broussard et al. |
| 2,161,046 A | 6/1939 | Rockols |
| D116,805 S | 9/1939 | Reznek et al. |
| 2,229,183 A | 1/1941 | Mitchell |
| 2,261,353 A | 11/1941 | Fedele |
| 2,289,838 A | 7/1942 | Herschede et al. |
| D152,294 S | 1/1949 | Siegel et al. |
| D152,587 S | 2/1949 | Brundage |
| D154,716 S | 8/1949 | Simpson |
| 2,483,805 A | 10/1949 | Broussard et al. |
| 2,495,784 A | 1/1950 | Starts |
| D161,888 S | 2/1951 | Wilkin |
| D162,698 S | 3/1951 | Teague |
| 2,546,433 A | 3/1951 | Dick |
| 2,547,272 A | 4/1951 | Lawson et al. |
| 2,550,433 A | 4/1951 | Tichenor |
| 2,570,920 A | 10/1951 | Clough et al. |
| D166,059 S | 2/1952 | Menhall |
| 2,594,388 A | 4/1952 | Broussard |
| 2,595,124 A | 4/1952 | Campbell |
| D166,753 S | 5/1952 | Jones |
| 2,596,122 A | 5/1952 | Broussard |
| 2,596,123 A | 5/1952 | Broussard |
| 2,596,124 A | 5/1952 | Broussard |
| 2,599,881 A | 6/1952 | Woodruff |
| 2,613,792 A | 10/1952 | Broussard et al. |
| 2,613,871 A | 10/1952 | Broussard et al. |
| 2,618,371 A | 11/1952 | Broussard |
| 2,633,960 A | 4/1953 | Broussard |
| D181,359 S | 11/1957 | Jones |
| 2,818,371 A | 12/1957 | Wessinger |
| 2,822,682 A | 2/1958 | Sollenberger |
| 2,832,506 A | 4/1958 | Hatcher |
| D189,106 S | 10/1960 | Leiderman |
| 2,956,525 A | 10/1960 | Blauvelt |
| 2,985,978 A | 5/1961 | Breen et al. |
| 2,988,191 A | 6/1961 | Grant |
| 2,995,230 A | 8/1961 | Moody et al. |
| 3,018,615 A | 1/1962 | Minton et al. |
| 3,046,774 A | 7/1962 | Glock |
| 3,056,544 A | 10/1962 | Sollenberger et al. |
| D199,270 S | 9/1964 | Michaels |
| D200,216 S | 2/1965 | Broussard et al. |
| 3,183,411 A | 5/1965 | Palfi |
| 3,199,321 A | 8/1965 | Soilenberger |
| 3,204,438 A | 9/1965 | Sollenberger |
| 3,208,061 A | 9/1965 | Gervasi et al. |
| 3,262,540 A | 7/1966 | Sollenberger et al. |
| 3,272,299 A | 9/1966 | Sollenberger |
| 3,324,647 A | 6/1967 | Jedynak |
| 3,373,856 A | 3/1968 | Kusters et al. |
| 3,438,031 A | 4/1969 | Fathauer |
| 3,486,324 A | 12/1969 | Andersson |
| 3,519,113 A | 7/1970 | Arzig et al. |
| 3,535,870 A | 10/1970 | Mitchell |
| 3,565,283 A | 2/1971 | Sciacero et al. |
| 3,637,277 A | 1/1972 | Krug et al. |
| 3,666,067 A | 5/1972 | Kaiser |
| 3,694,590 A | 9/1972 | Otterlei |
| 3,721,463 A | 3/1973 | Attwood et al. |
| 3,770,090 A | 11/1973 | Fayling et al. |
| D230,511 S | 2/1974 | Stieber |
| 3,858,165 A * | 12/1974 | Pegg ................. G10K 11/006 367/173 |
| D234,606 S | 3/1975 | Gamble |
| 3,873,964 A | 3/1975 | Potter |
| 3,875,555 A | 4/1975 | Potter |
| D235,801 S | 7/1975 | Gore |
| 3,941,989 A | 3/1976 | McLaughlin et al. |
| 3,943,339 A | 3/1976 | Koerner et al. |
| 3,964,590 A | 6/1976 | May et al. |
| 3,975,934 A | 8/1976 | Babai et al. |
| 3,982,620 A | 9/1976 | Kortenhaus |
| 3,991,595 A | 11/1976 | Bahry et al. |
| 3,999,372 A | 12/1976 | Welch et al. |
| 4,001,970 A * | 1/1977 | Miyamoto ................ E06B 7/30 49/171 |
| 4,007,564 A * | 2/1977 | Chisholm ............... E04H 12/22 52/98 |
| 4,025,791 A | 5/1977 | Lennington et al. |
| 4,031,991 A | 6/1977 | Malott |
| 4,043,117 A | 8/1977 | Maresca et al. |
| D246,917 S | 1/1978 | Sauter |
| RE29,577 E | 3/1978 | Hederich et al. |
| 4,147,707 A | 4/1979 | Alewelt et al. |
| 4,237,710 A | 12/1980 | Cardozo |
| 4,248,336 A | 2/1981 | Fiedler |
| 4,249,648 A | 2/1981 | Meyer |
| 4,264,963 A | 4/1981 | Leach |
| 4,306,219 A | 12/1981 | Main et al. |
| 4,310,890 A | 1/1982 | Trehn et al. |
| 4,317,180 A | 2/1982 | Lies |
| 4,317,181 A | 2/1982 | Teza et al. |
| 4,323,847 A | 4/1982 | Karbowski |
| 4,358,749 A | 11/1982 | Clark |
| 4,379,334 A | 4/1983 | Feagins, Jr. et al. |
| 4,409,665 A | 10/1983 | Tubbs |
| D272,291 S | 1/1984 | Hauser et al. |
| 4,432,447 A | 2/1984 | Tanaka |
| 4,460,080 A | 7/1984 | Howard |
| 4,460,965 A | 7/1984 | Trehn et al. |
| 4,472,706 A | 9/1984 | Hodge et al. |
| 4,474,281 A | 10/1984 | Roberts et al. |
| 4,479,191 A | 10/1984 | Nojima et al. |
| 4,483,431 A | 11/1984 | Pratt |
| 4,491,841 A | 1/1985 | Clark |
| D278,689 S | 5/1985 | Jupe |
| 4,574,936 A | 3/1986 | Klinger |
| 4,615,280 A | 10/1986 | Shoop et al. |
| 4,639,021 A | 1/1987 | Hope |
| D288,441 S | 2/1987 | Lalonde |
| D289,914 S | 5/1987 | Willinger et al. |
| 4,678,994 A | 7/1987 | Davies |
| 4,680,717 A | 7/1987 | Martin |
| 4,742,903 A | 5/1988 | Trummer |
| 4,749,074 A | 6/1988 | Ueki et al. |
| D296,795 S | 7/1988 | Bouve |

(56) References Cited

U.S. PATENT DOCUMENTS

| | | | |
|---|---|---|---|
| 4,763,769 A | | 8/1988 | Levasseur |
| 4,798,273 A | * | 1/1989 | Ward, II ............... G07F 17/248 |
| | | | 194/350 |
| 4,809,838 A | | 3/1989 | Houserman |
| 4,812,805 A | | 3/1989 | Lachat et al. |
| 4,823,928 A | | 4/1989 | Speas |
| 4,825,425 A | | 4/1989 | Turner |
| 4,827,206 A | | 5/1989 | Speas |
| 4,845,484 A | | 7/1989 | Ellsberg |
| 4,848,556 A | | 7/1989 | Shah et al. |
| 4,851,987 A | | 7/1989 | Day |
| 4,872,149 A | | 10/1989 | Speas |
| 4,875,598 A | | 10/1989 | Dahl |
| 4,880,097 A | | 11/1989 | Speas |
| 4,880,406 A | | 11/1989 | Van Horn et al. |
| 4,895,238 A | | 1/1990 | Speas |
| D307,875 S | | 5/1990 | Mallory |
| 4,951,799 A | | 8/1990 | Kai |
| 4,967,895 A | | 11/1990 | Speas |
| 4,967,985 A | | 11/1990 | Deakin |
| 4,976,630 A | | 12/1990 | Schuder et al. |
| 4,989,714 A | | 2/1991 | Abe |
| 5,027,390 A | | 6/1991 | Hughes |
| 5,027,935 A | | 7/1991 | Berg et al. |
| 5,029,094 A | | 7/1991 | Wong |
| D319,077 S | | 8/1991 | Arato et al. |
| 5,036,859 A | | 8/1991 | Brown |
| 5,060,777 A | | 10/1991 | Van Horn et al. |
| 5,065,156 A | | 11/1991 | Bernier |
| 5,076,414 A | | 12/1991 | Kimoto |
| 5,088,073 A | | 2/1992 | Speas |
| 5,109,972 A | | 5/1992 | Van Horn et al. |
| 5,119,916 A | | 6/1992 | Carmen et al. |
| 5,142,277 A | * | 8/1992 | Yarberry ............. B61L 15/0045 |
| | | | 178/79 |
| 5,153,525 A | | 10/1992 | Hoekman et al. |
| 5,155,614 A | | 10/1992 | Carmen et al. |
| 5,158,166 A | | 10/1992 | Barson |
| D331,996 S | | 12/1992 | Fukutake et al. |
| 5,184,707 A | | 2/1993 | Van Horn et al. |
| 5,192,855 A | | 3/1993 | Insulander et al. |
| 5,201,396 A | | 4/1993 | Chalabian et al. |
| D335,460 S | | 5/1993 | Tanaka |
| D336,860 S | | 6/1993 | Clough |
| 5,222,076 A | | 6/1993 | Ng et al. |
| D337,953 S | | 8/1993 | Verborn et al. |
| 5,244,070 A | | 9/1993 | Carmen et al. |
| D340,038 S | | 10/1993 | Venne et al. |
| 5,259,491 A | | 11/1993 | Ward, II |
| 5,266,947 A | | 11/1993 | Fujiwara et al. |
| D342,209 S | | 12/1993 | Clough |
| 5,273,151 A | | 12/1993 | Carmen et al. |
| 5,287,384 A | | 2/1994 | Avery et al. |
| 5,293,979 A | | 3/1994 | Levasseur |
| 5,298,894 A | | 3/1994 | Cerny et al. |
| 5,339,594 A | * | 8/1994 | Ventura-Berti ......... B29C 70/26 |
| | | | 52/834 |
| 5,343,237 A | | 8/1994 | Morimoto |
| 5,351,187 A | | 9/1994 | Hassett |
| D351,193 S | | 10/1994 | Abe |
| 5,351,798 A | | 10/1994 | Hayes |
| 5,360,095 A | | 11/1994 | Speas |
| D354,047 S | | 1/1995 | Leggate et al. |
| D354,835 S | | 1/1995 | Brendel |
| 5,382,780 A | | 1/1995 | Carmen |
| 5,385,225 A | * | 1/1995 | Chen ........................ G07F 9/06 |
| | | | 109/49.5 |
| 5,402,475 A | | 3/1995 | Lesner, Jr. et al. |
| 5,407,049 A | | 4/1995 | Yost |
| 5,426,363 A | | 6/1995 | Akagi et al. |
| D360,734 S | | 7/1995 | Hall |
| D360,737 S | | 7/1995 | Helbig, Jr. |
| 5,439,089 A | | 8/1995 | Parker |
| 5,442,348 A | | 8/1995 | Mushell |
| 5,454,461 A | | 10/1995 | Yost |
| D364,165 S | | 11/1995 | Esslinger |
| 5,471,139 A | | 11/1995 | Zadoff |
| 5,475,373 A | | 12/1995 | Speas |
| 5,489,014 A | | 2/1996 | Menoud |
| 5,500,517 A | | 3/1996 | Cagliostro |
| 5,507,378 A | | 4/1996 | Leone |
| 5,526,662 A | | 6/1996 | Diekhoff et al. |
| 5,563,491 A | | 10/1996 | Tseng |
| 5,568,441 A | | 10/1996 | Sanemitsu |
| D375,607 S | | 11/1996 | Hall |
| 5,570,771 A | | 11/1996 | Yost |
| 5,573,099 A | | 11/1996 | Church et al. |
| 5,614,892 A | | 3/1997 | Ward, II et al. |
| 5,617,942 A | | 4/1997 | Ward, II et al. |
| 5,619,932 A | | 4/1997 | Efland et al. |
| 5,640,002 A | | 6/1997 | Ruppert et al. |
| 5,642,119 A | | 6/1997 | Jacobs |
| 5,648,906 A | | 7/1997 | Amirpanahi |
| D381,796 S | | 8/1997 | Kittle et al. |
| D381,976 S | | 8/1997 | Sandor et al. |
| 5,659,306 A | | 8/1997 | Bahar |
| 5,687,129 A | | 11/1997 | Kim |
| D388,227 S | | 12/1997 | Dallman et al. |
| D388,231 S | | 12/1997 | Magee et al. |
| 5,710,743 A | | 1/1998 | Dee et al. |
| D391,238 S | | 2/1998 | Sakata |
| 5,732,812 A | | 3/1998 | Grainger et al. |
| D393,212 S | | 4/1998 | Lucas et al. |
| 5,737,710 A | | 4/1998 | Anthonyson |
| 5,740,050 A | | 4/1998 | Ward, II |
| 5,748,103 A | | 5/1998 | Flach et al. |
| D395,133 S | | 6/1998 | Mikami et al. |
| 5,761,061 A | | 6/1998 | Amano |
| 5,777,302 A | | 7/1998 | Nakagawa et al. |
| 5,777,951 A | | 7/1998 | Mitschele et al. |
| 5,777,957 A | | 7/1998 | Lyman |
| 5,778,067 A | | 7/1998 | Jones et al. |
| D396,655 S | | 8/1998 | Anderson |
| 5,792,298 A | | 8/1998 | Sauer et al. |
| 5,803,228 A | | 9/1998 | Lucas |
| 5,805,083 A | | 9/1998 | Sutton et al. |
| 5,806,651 A | | 9/1998 | Carmen et al. |
| D400,115 S | | 10/1998 | Yaron |
| D400,684 S | | 11/1998 | Dallman |
| 5,833,042 A | | 11/1998 | Baitch et al. |
| 5,841,369 A | * | 11/1998 | Sutton ..................... G07F 17/24 |
| | | | 379/106.01 |
| 5,842,411 A | | 12/1998 | Johnson |
| 5,845,268 A | | 12/1998 | Moore |
| 5,852,411 A | | 12/1998 | Jacobs et al. |
| D404,025 S | | 1/1999 | Van Horne et al. |
| 5,903,520 A | | 5/1999 | Dee et al. |
| 5,906,260 A | | 5/1999 | Goodrich |
| 5,911,763 A | | 6/1999 | Quesada |
| D411,848 S | | 7/1999 | Maruska et al. |
| D412,233 S | | 7/1999 | Cajacob et al. |
| D412,289 S | | 7/1999 | Winwood |
| D413,311 S | | 8/1999 | Blalock |
| 5,936,527 A | | 8/1999 | Isaacman et al. |
| 5,936,551 A | | 8/1999 | Allen et al. |
| 5,940,481 A | | 8/1999 | Zeitman |
| 5,946,774 A | | 9/1999 | Ramsey et al. |
| 5,954,182 A | | 9/1999 | Wei |
| 5,966,345 A | | 10/1999 | Dee et al. |
| D419,277 S | | 1/2000 | Ishii et al. |
| 6,018,327 A | | 1/2000 | Nakano et al. |
| 6,026,946 A | | 2/2000 | McCarty, Jr. |
| D421,399 S | | 3/2000 | Bennett et al. |
| 6,037,880 A | | 3/2000 | Manion |
| D423,181 S | | 4/2000 | Dallman |
| D423,755 S | | 4/2000 | Ha |
| 6,052,453 A | | 4/2000 | Sagady et al. |
| D427,413 S | | 6/2000 | Wallace et al. |
| 6,078,272 A | | 6/2000 | Jacobs et al. |
| 6,081,205 A | | 6/2000 | Williams |
| 6,081,206 A | | 6/2000 | Kielland |
| 6,082,153 A | | 7/2000 | Schoell et al. |
| D430,045 S | | 8/2000 | Omuro et al. |
| 6,098,361 A | | 8/2000 | Roten et al. |

(56) References Cited

U.S. PATENT DOCUMENTS

| | | | |
|---|---|---|---|
| 6,107,942 A | 8/2000 | Yoo et al. | |
| 6,109,418 A | 8/2000 | Yost | |
| 6,111,522 A | 8/2000 | Hiltz et al. | |
| D430,810 S | 9/2000 | Omuro et al. | |
| 6,116,403 A | 9/2000 | Kiehl | |
| 6,121,880 A | 9/2000 | Scott et al. | |
| D431,788 S | 10/2000 | Tuxen et al. | |
| D432,286 S | 10/2000 | Irie | |
| 6,132,152 A | 10/2000 | Kaibach et al. | |
| 6,147,624 A | 11/2000 | Clapper | |
| 6,188,328 B1 | 2/2001 | Ho | |
| 6,193,045 B1 | 2/2001 | Ishida et al. | |
| 6,195,015 B1 | 2/2001 | Jacobs et al. | |
| D439,591 S | 3/2001 | Reidt et al. | |
| RE37,193 E | 5/2001 | Ward, II et al. | |
| 6,227,343 B1 | 5/2001 | Neathway et al. | |
| 6,229,455 B1 | 5/2001 | Yost et al. | |
| 6,230,868 B1 * | 5/2001 | Tuxen | G07B 15/02 194/217 |
| 6,236,716 B1 | 5/2001 | Marcus et al. | |
| 6,243,028 B1 | 6/2001 | Krygler et al. | |
| 6,243,029 B1 | 6/2001 | Tomer | |
| 6,275,169 B1 | 8/2001 | Krygler et al. | |
| 6,275,170 B1 | 8/2001 | Jacobs et al. | |
| D447,519 S | 9/2001 | Pinchuk et al. | |
| D447,714 S | 9/2001 | Cappiello | |
| D448,910 S | 10/2001 | Kit et al. | |
| D449,010 S | 10/2001 | Petrucelli | |
| 6,309,098 B1 | 10/2001 | Wong | |
| D450,253 S | 11/2001 | Marguet | |
| 6,312,152 B2 | 11/2001 | Dee et al. | |
| 6,321,201 B1 | 11/2001 | Dahl | |
| RE37,531 E | 1/2002 | Chaco et al. | |
| 6,340,935 B1 | 1/2002 | Hall | |
| 6,344,806 B1 | 2/2002 | Katz | |
| D454,421 S | 3/2002 | Jeon et al. | |
| D454,807 S | 3/2002 | Cappiello | |
| 6,354,425 B1 | 3/2002 | Tuxen et al. | |
| D456,587 S | 4/2002 | Kit et al. | |
| 6,366,220 B1 | 4/2002 | Elliott | |
| 6,373,401 B2 | 4/2002 | Ho | |
| 6,373,422 B1 | 4/2002 | Mostafa | |
| 6,373,442 B1 | 4/2002 | Thomas et al. | |
| 6,380,851 B1 | 4/2002 | Gilbert et al. | |
| D460,005 S | 7/2002 | Jacquet | |
| D461,728 S | 8/2002 | Tuxen et al. | |
| 6,456,491 B1 | 9/2002 | Flannery et al. | |
| D463,749 S | 10/2002 | Petrucelli | |
| 6,457,586 B2 | 10/2002 | Yasuda et al. | |
| 6,467,602 B2 | 10/2002 | Bench et al. | |
| 6,477,785 B1 | 11/2002 | Hsu | |
| 6,477,875 B2 | 11/2002 | Field et al. | |
| D467,954 S | 12/2002 | Suzuki et al. | |
| 6,493,676 B1 | 12/2002 | Levy | |
| 6,505,774 B1 * | 1/2003 | Fulcher | G06Q 30/0284 235/379 |
| D471,238 S | 3/2003 | Showers et al. | |
| D472,362 S | 3/2003 | Zerman et al. | |
| 6,539,370 B1 | 3/2003 | Chang et al. | |
| 6,559,776 B2 | 5/2003 | Katz | |
| 6,575,281 B2 | 6/2003 | Lee | |
| D477,030 S | 7/2003 | Kolls et al. | |
| D481,516 S | 10/2003 | Magee et al. | |
| D485,417 S | 1/2004 | Magee et al. | |
| 6,697,730 B2 | 2/2004 | Dickerson | |
| D488,280 S | 4/2004 | Zerman et al. | |
| 6,731,942 B1 | 5/2004 | Nageli | |
| D490,727 S | 6/2004 | Kido et al. | |
| D492,080 S | 6/2004 | Magee et al. | |
| D492,081 S | 6/2004 | Magee et al. | |
| D492,085 S | 6/2004 | Korte et al. | |
| 6,747,575 B2 | 6/2004 | Chauvin et al. | |
| 6,763,094 B2 | 7/2004 | Conn et al. | |
| D494,730 S | 8/2004 | Magee et al. | |
| 6,791,473 B2 | 9/2004 | Kibria et al. | |
| RE38,626 E | 10/2004 | Kielland | |
| D497,393 S | 10/2004 | Herbst | |
| 6,799,387 B2 | 10/2004 | Pippins | |
| D497,814 S | 11/2004 | Odinotski et al. | |
| D498,795 S | 11/2004 | Nunn | |
| 6,812,857 B1 | 11/2004 | Kassab et al. | |
| 6,823,317 B1 | 11/2004 | Ouimet et al. | |
| 6,856,922 B1 | 2/2005 | Austin et al. | |
| 6,874,340 B1 | 4/2005 | Berman | |
| 6,885,311 B2 | 4/2005 | Howard et al. | |
| D505,240 S | 5/2005 | Swaine et al. | |
| 6,889,899 B2 | 5/2005 | Silberberg | |
| D506,509 S | 6/2005 | Nunn | |
| D506,769 S | 6/2005 | Asai | |
| 6,914,411 B2 | 7/2005 | Couch et al. | |
| D508,064 S | 8/2005 | Ramirez | |
| 6,929,179 B2 | 8/2005 | Fulcher et al. | |
| 6,946,974 B1 | 9/2005 | Racunas, Jr. | |
| D510,751 S | 10/2005 | Magee et al. | |
| 7,004,385 B1 | 2/2006 | Douglass | |
| 7,014,355 B2 | 3/2006 | Potter, Sr. et al. | |
| 7,019,420 B2 | 3/2006 | Kogan et al. | |
| 7,019,670 B2 | 3/2006 | Bahar | |
| 7,023,360 B2 | 4/2006 | Staniszewski | |
| 7,027,773 B1 | 4/2006 | McMillin | |
| 7,027,808 B2 | 4/2006 | Wesby | |
| 7,028,888 B2 | 4/2006 | Laskowski | |
| 7,029,167 B1 | 4/2006 | Mitschele | |
| D520,883 S | 5/2006 | Hillard et al. | |
| 7,040,534 B2 | 5/2006 | Turocy et al. | |
| 7,046,123 B1 | 5/2006 | Goldberg | |
| D524,834 S | 7/2006 | Dozier et al. | |
| 7,071,839 B2 | 7/2006 | Patel et al. | |
| 7,104,447 B1 | 9/2006 | Lopez et al. | |
| 7,110,762 B1 * | 9/2006 | Cameron | G01C 15/00 342/357.27 |
| 7,114,651 B2 | 10/2006 | Hjelmvik | |
| D535,268 S | 1/2007 | Holger | |
| 7,181,426 B2 | 2/2007 | Dutta | |
| 7,183,999 B2 | 2/2007 | Matthews et al. | |
| D538,505 S | 3/2007 | Kang et al. | |
| 7,188,070 B2 | 3/2007 | Dar et al. | |
| D543,588 S | 5/2007 | Herbert et al. | |
| 7,222,031 B2 | 5/2007 | Heatley | |
| 7,222,782 B2 | 5/2007 | Lute, Jr. et al. | |
| 7,230,545 B2 | 6/2007 | Nath et al. | |
| 7,237,176 B2 | 6/2007 | Briggs et al. | |
| D546,365 S | 7/2007 | Jost et al. | |
| 7,237,716 B2 | 7/2007 | Silberberg | |
| 7,253,747 B2 | 8/2007 | Noguchi | |
| 7,262,737 B2 | 8/2007 | Zarnowitz et al. | |
| 7,284,692 B1 | 10/2007 | Douglass | |
| D559,792 S | 1/2008 | Gemme et al. | |
| 7,319,974 B1 | 1/2008 | Brusseaux | |
| 7,321,317 B2 | 1/2008 | Nath et al. | |
| 7,330,131 B2 | 2/2008 | Zanotti et al. | |
| 7,347,368 B1 | 3/2008 | Gravelle et al. | |
| D570,920 S | 6/2008 | Choi | |
| 7,382,238 B2 | 6/2008 | Kavaler | |
| 7,382,281 B2 | 6/2008 | Kavaler | |
| 7,382,282 B2 | 6/2008 | Kavaler | |
| 7,385,484 B2 | 6/2008 | Nath et al. | |
| 7,388,349 B2 | 6/2008 | Elder et al. | |
| 7,388,517 B2 | 6/2008 | Kavaler | |
| 7,391,339 B2 | 6/2008 | Howard et al. | |
| 7,393,134 B2 | 7/2008 | Mitschele | |
| D575,168 S | 8/2008 | King et al. | |
| 7,419,091 B1 | 9/2008 | Scanlon | |
| 7,427,931 B1 | 9/2008 | Kavaler et al. | |
| D579,795 S | 11/2008 | Martinez et al. | |
| 7,445,144 B2 | 11/2008 | Schlabach et al. | |
| D582,125 S | 12/2008 | Kang et al. | |
| D587,141 S | 2/2009 | King et al. | |
| D588,916 S | 3/2009 | DeMarco | |
| D591,181 S | 4/2009 | Kanbar | |
| 7,533,802 B1 | 5/2009 | McGinley et al. | |
| 7,533,809 B1 | 5/2009 | Robinson et al. | |
| 7,554,460 B2 | 6/2009 | Verkleeren et al. | |
| D596,374 S | 7/2009 | Kang et al. | |

(56) References Cited

U.S. PATENT DOCUMENTS

| | | |
|---|---|---|
| 7,558,564 B2 | 7/2009 | Wesby |
| 7,579,964 B2 | 8/2009 | Nath et al. |
| D600,152 S | 9/2009 | Stack et al. |
| 7,594,235 B2 | 9/2009 | Moreau |
| D602,225 S | 10/2009 | Lute et al. |
| D604,189 S | 11/2009 | Leer et al. |
| 7,617,120 B2 | 11/2009 | Derasmo et al. |
| D605,145 S | 12/2009 | Kellar |
| 7,624,919 B2 | 12/2009 | Meek et al. |
| 7,632,419 B1 | 12/2009 | Grimbergen et al. |
| 7,671,803 B2 | 3/2010 | Neill et al. |
| 7,679,526 B2 | 3/2010 | Mardirossian |
| 7,699,224 B2 | 4/2010 | Mole |
| D615,274 S | 5/2010 | Kim et al. |
| D617,799 S | 6/2010 | Odhe et al. |
| 7,739,000 B2 | 6/2010 | Kevaler |
| D620,050 S | 7/2010 | Hultzman et al. |
| 7,748,620 B2 | 7/2010 | Gomez et al. |
| 7,772,720 B2 | 8/2010 | McGee et al. |
| 7,780,072 B1 | 8/2010 | Lute et al. |
| 7,783,530 B2 | 8/2010 | Slemmer et al. |
| D624,274 S | 9/2010 | Pendleton |
| D625,305 S | 10/2010 | Bleck et al. |
| 7,806,248 B2 | 10/2010 | Hunter et al. |
| D627,814 S | 11/2010 | Tzeng et al. |
| 7,825,826 B2 | 11/2010 | Welch |
| 7,854,310 B2 | 12/2010 | King et al. |
| 7,855,661 B2 | 12/2010 | Ponert |
| 7,874,482 B2 | 1/2011 | Mitschele |
| D632,740 S | 2/2011 | Adeline |
| D634,417 S | 3/2011 | Abbondanzio et al. |
| D635,035 S | 3/2011 | Matsumoto |
| 7,899,583 B2 | 3/2011 | Mendelson |
| 7,908,149 B2 | 3/2011 | Dar et al. |
| 7,933,841 B2 | 4/2011 | Schmeyer et al. |
| 7,945,670 B2 | 5/2011 | Nakamura et al. |
| D645,223 S | 9/2011 | Bleck et al. |
| 8,035,533 B2 | 10/2011 | Kavaler |
| 8,044,139 B2 | 10/2011 | Youn et al. |
| D651,784 S | 1/2012 | Rohan et al. |
| D652,329 S | 1/2012 | MacKay et al. |
| D652,601 S | 1/2012 | Rohan et al. |
| D652,602 S | 1/2012 | Rohan et al. |
| D652,872 S | 1/2012 | Mougin et al. |
| D653,012 S | 1/2012 | Rohan et al. |
| D653,014 S | 1/2012 | Rohan et al. |
| D653,420 S | 1/2012 | Rohan et al. |
| D653,421 S | 1/2012 | Rohan et al. |
| D653,422 S | 1/2012 | Rohan et al. |
| D653,423 S | 1/2012 | Rohan et al. |
| D653,424 S | 1/2012 | Rohan et al. |
| D654,816 S | 2/2012 | MacKay et al. |
| RE43,245 E | 3/2012 | Ouimet et al. |
| D655,263 S | 3/2012 | Tsai |
| D656,046 S | 3/2012 | MacKay et al. |
| 8,138,950 B1 | 3/2012 | Leung |
| 8,144,034 B2 | 3/2012 | Kavaler |
| D659,557 S | 5/2012 | Jones et al. |
| 8,184,019 B2 | 5/2012 | Chauvin et al. |
| D661,603 S | 6/2012 | MacKay et al. |
| D661,608 S | 6/2012 | Kimmich |
| 8,193,540 B2 | 6/2012 | Huang et al. |
| 8,207,394 B2 | 6/2012 | Feldkamp et al. |
| 8,232,894 B2 | 7/2012 | Weiss et al. |
| 8,250,887 B2 | 8/2012 | MacKay et al. |
| 8,264,401 B1 | 9/2012 | Kavaler |
| 8,279,107 B2 | 10/2012 | Krstanovic et al. |
| D672,525 S | 12/2012 | Lee et al. |
| 8,325,057 B2 | 12/2012 | Salter |
| D674,985 S | 1/2013 | Lee |
| D677,035 S | 2/2013 | Lee et al. |
| D677,714 S | 3/2013 | Helgesson et al. |
| 8,395,532 B2 | 3/2013 | Chauvin et al. |
| 8,402,281 B2 | 3/2013 | Dahl |
| 8,402,380 B2 | 3/2013 | Kikin-Gil et al. |
| D680,156 S | 4/2013 | Hernandez et al. |
| 8,417,715 B1 | 4/2013 | Bruckhaus et al. |
| D681,717 S | 5/2013 | Helgesson et al. |
| 8,450,627 B2 | 5/2013 | Mittleman et al. |
| D683,779 S | 6/2013 | Uemachi et al. |
| D683,794 S | 6/2013 | Randall |
| D683,795 S | 6/2013 | Randall |
| D684,745 S | 6/2013 | Reuter et al. |
| D684,870 S | 6/2013 | Jones et al. |
| 8,479,909 B2 | 7/2013 | King et al. |
| 8,487,754 B2 | 7/2013 | Mitschele |
| D687,809 S | 8/2013 | Bergmann et al. |
| 8,513,832 B2 | 8/2013 | Hunter et al. |
| D689,554 S | 9/2013 | Echanove Hernandez |
| D690,771 S | 10/2013 | Randall |
| D691,165 S | 10/2013 | Attoma |
| 8,566,159 B2 | 10/2013 | King et al. |
| 8,568,055 B2 | 10/2013 | Marques Lito Velez Grilo |
| D692,784 S | 11/2013 | Andersson et al. |
| D693,983 S | 11/2013 | Budde et al. |
| 8,589,216 B2 | 11/2013 | Yu et al. |
| 8,590,687 B2 | 11/2013 | King et al. |
| 8,595,054 B2 | 11/2013 | King et al. |
| D696,484 S | 12/2013 | Lee et al. |
| D696,485 S | 12/2013 | Lee et al. |
| 8,621,245 B2 | 12/2013 | Shearer et al. |
| 8,631,921 B2 | 1/2014 | Jones et al. |
| 8,662,279 B2 | 3/2014 | Jones et al. |
| 8,666,801 B2 | 3/2014 | Cho |
| D702,913 S | 4/2014 | Budde et al. |
| D702,914 S | 4/2014 | Budde et al. |
| 8,684,158 B2 | 4/2014 | Jones et al. |
| 8,710,798 B2 | 4/2014 | Turner |
| D705,090 S | 5/2014 | MacKay et al. |
| 8,727,207 B1 | 5/2014 | Church et al. |
| D707,140 S | 6/2014 | King et al. |
| D707,141 S | 6/2014 | King et al. |
| D707,142 S | 6/2014 | King et al. |
| D707,574 S | 6/2014 | Ku et al. |
| 8,749,403 B2 | 6/2014 | King et al. |
| 8,770,371 B2 | 7/2014 | MacKay et al. |
| 8,770,372 B2 | 7/2014 | Dobbins et al. |
| 8,807,317 B2 | 8/2014 | MacKay et al. |
| D714,165 S | 9/2014 | Salama |
| D715,661 S | 10/2014 | McKaughan et al. |
| D716,156 S | 10/2014 | Jones et al. |
| D716,157 S | 10/2014 | MacKay et al. |
| D716,515 S | 10/2014 | Cha et al. |
| 8,862,494 B2 | 10/2014 | King et al. |
| 8,866,624 B2 | 10/2014 | Ales. III et al. |
| D716,671 S | 11/2014 | Jones et al. |
| 8,884,785 B2 | 11/2014 | Groft et al. |
| 8,936,505 B2 * | 1/2015 | Bengtsson ............... G07D 1/00 193/DIG. 1 |
| D722,740 S | 2/2015 | Budde et al. |
| 8,957,787 B1 | 2/2015 | Al-Hmalan et al. |
| D724,290 S | 3/2015 | Cha et al. |
| D724,811 S | 3/2015 | Reitinger |
| D724,812 S | 3/2015 | Cha et al. |
| D725,504 S | 3/2015 | McEneany et al. |
| D728,190 S | 4/2015 | Sheley |
| 9,002,723 B2 | 4/2015 | King et al. |
| 9,047,712 B2 | 6/2015 | King et al. |
| 9,064,358 B2 | 6/2015 | Lidror |
| D733,585 S | 7/2015 | Jones et al. |
| D735,437 S | 7/2015 | Randall |
| D735,438 S | 7/2015 | Randall |
| D735,439 S | 7/2015 | Randall |
| D735,440 S | 7/2015 | Randall |
| D735,963 S | 8/2015 | Randall |
| D735,964 S | 8/2015 | Randall |
| D735,965 S | 8/2015 | Randall |
| D739,637 S | 9/2015 | Randall |
| D739,638 S | 9/2015 | Randall |
| D739,639 S | 9/2015 | Randall |
| 9,123,184 B2 | 9/2015 | Jones et al. |
| 9,127,964 B2 | 9/2015 | Schwarz et al. |
| 9,147,345 B2 | 9/2015 | Agrait et al. |
| D742,090 S | 10/2015 | Randall |

(56) References Cited

U.S. PATENT DOCUMENTS

| | | |
|---|---|---|
| 9,159,080 B2 | 10/2015 | Fiorucci et al. |
| 9,169,626 B2 | 10/2015 | Guler et al. |
| D742,371 S | 11/2015 | Bopp et al. |
| 9,196,097 B2 | 11/2015 | Jones et al. |
| 9,196,161 B2 | 11/2015 | Lai et al. |
| D746,015 S | 12/2015 | King et al. |
| D746,704 S | 1/2016 | Jones et al. |
| D748,364 S | 1/2016 | King et al. |
| D748,888 S | 2/2016 | King et al. |
| D749,000 S | 2/2016 | King et al. |
| 9,262,915 B2 | 2/2016 | Clem et al. |
| 9,269,216 B2 | 2/2016 | Keilwert |
| D750,513 S | 3/2016 | King et al. |
| D750,978 S | 3/2016 | van Slooten et al. |
| D752,552 S | 3/2016 | D'Ascanio et al. |
| D755,649 S | 5/2016 | King et al. |
| D755,650 S | 5/2016 | King et al. |
| D756,807 S | 5/2016 | King et al. |
| D756,808 S | 5/2016 | King et al. |
| D762,040 S | 7/2016 | King et al. |
| 9,384,554 B2 | 7/2016 | Xu et al. |
| 9,391,474 B2 | 7/2016 | Hunter et al. |
| 9,406,056 B2 | 8/2016 | MacKay et al. |
| 9,407,608 B2 | 8/2016 | Mullick et al. |
| 9,424,691 B2 | 8/2016 | King et al. |
| 9,443,236 B2 | 9/2016 | MacKay et al. |
| 9,489,776 B2 | 11/2016 | Keller et al. |
| 9,494,922 B2 | 11/2016 | MacKay et al. |
| 9,508,198 B1 | 11/2016 | King et al. |
| 9,508,260 B2 | 11/2016 | Shaik |
| 9,519,761 B2 | 12/2016 | Jakobsson |
| 9,524,498 B2 | 12/2016 | Jones et al. |
| 9,536,235 B2 | 1/2017 | Jones et al. |
| 9,536,370 B2 | 1/2017 | Jones et al. |
| D779,771 S | 2/2017 | King et al. |
| D779,772 S | 2/2017 | King et al. |
| D779,773 S | 2/2017 | King et al. |
| 9,580,198 B2 | 2/2017 | Ehrmann et al. |
| D781,024 S | 3/2017 | King et al. |
| D782,349 S | 3/2017 | Konotopskyi et al. |
| 9,601,018 B2 | 3/2017 | Cogill et al. |
| 9,652,921 B2 | 5/2017 | MacKay et al. |
| 9,661,403 B2 | 5/2017 | King et al. |
| 9,685,027 B2 | 6/2017 | King et al. |
| 9,692,256 B2 | 6/2017 | Hunter et al. |
| D791,621 S | 7/2017 | Loye et al. |
| D792,049 S | 7/2017 | Oh et al. |
| 9,697,506 B2 | 7/2017 | Jones et al. |
| 9,707,911 B1 | 7/2017 | Myers et al. |
| D795,523 S | 8/2017 | King et al. |
| 9,728,085 B2 | 8/2017 | Schwarz et al. |
| 9,749,823 B2 | 8/2017 | Rowe et al. |
| D796,355 S | 9/2017 | Cho et al. |
| 9,773,351 B2 | 9/2017 | Hudson et al. |
| D799,992 S | 10/2017 | Ehara |
| D801,304 S | 10/2017 | Kiafoulis et al. |
| D801,405 S | 10/2017 | Shih et al. |
| 9,779,565 B2 | 10/2017 | Rabbat |
| 9,805,518 B2 | 10/2017 | King et al. |
| D802,874 S | 11/2017 | King et al. |
| D802,875 S | 11/2017 | King et al. |
| D802,876 S | 11/2017 | King et al. |
| D802,877 S | 11/2017 | King et al. |
| D802,878 S | 11/2017 | King et al. |
| 9,842,346 B2 | 12/2017 | Fiorucci et al. |
| 9,842,455 B2 | 12/2017 | MacKay et al. |
| D813,059 S | 3/2018 | MacKay et al. |
| D813,838 S | 3/2018 | Pietschmann et al. |
| 9,934,645 B2 | 4/2018 | MacKay et al. |
| 10,069,233 B2 | 9/2018 | Goto |
| D832,553 S | 10/2018 | Angelopoulos et al. |
| 10,089,814 B2 | 10/2018 | King et al. |
| D832,809 S | 11/2018 | Hardi |
| D834,971 S | 12/2018 | Ahn et al. |
| 10,154,029 B1 | 12/2018 | Griffin |
| 10,192,388 B2 | 1/2019 | MacKay et al. |
| D843,973 S | 3/2019 | Klosowski et al. |
| 10,275,650 B2 | 4/2019 | Laaksonen |
| D851,605 S | 6/2019 | Maetani et al. |
| 10,315,665 B2 | 6/2019 | Halder |
| D854,430 S | 7/2019 | Elrod et al. |
| 10,366,546 B2 | 7/2019 | King et al. |
| D858,381 S | 9/2019 | Ahn et al. |
| 10,424,147 B2 | 9/2019 | MacKay et al. |
| D863,074 S | 10/2019 | MacKay et al. |
| D863,075 S | 10/2019 | MacKay et al. |
| D863,076 S | 10/2019 | MacKay et al. |
| D863,987 S | 10/2019 | MacKay et al. |
| D863,988 S | 10/2019 | MacKay et al. |
| 10,464,530 B2 | 11/2019 | Falkson et al. |
| 10,503,990 B2 | 12/2019 | Gleeson-May et al. |
| D872,600 S | 1/2020 | King et al. |
| D879,404 S | 3/2020 | Morishito et al. |
| D882,426 S | 4/2020 | Gross et al. |
| D883,605 S | 5/2020 | Lee et al. |
| D886,649 S | 6/2020 | Lan et al. |
| 10,674,236 B2 | 6/2020 | King et al. |
| 10,691,904 B1 | 6/2020 | Randall et al. |
| 10,741,064 B2 | 8/2020 | Schwarz et al. |
| D901,825 S | 11/2020 | Nelson et al. |
| 10,861,278 B2 | 12/2020 | MacKay et al. |
| 10,861,334 B2 | 12/2020 | Torres |
| D911,857 S | 3/2021 | King et al. |
| RE48,566 E | 5/2021 | Mackay et al. |
| 10,998,612 B2 | 5/2021 | MacKay et al. |
| 11,074,612 B2 | 7/2021 | King et al. |
| D927,998 S | 8/2021 | Ahn et al. |
| D928,639 S | 8/2021 | Ahn et al. |
| 11,100,824 B2 | 8/2021 | King et al. |
| D930,493 S | 9/2021 | Katzenelson |
| 11,132,723 B2 | 9/2021 | King et al. |
| 11,172,274 B2 | 11/2021 | King et al. |
| D938,668 S | 12/2021 | Jia |
| D954,571 S | 6/2022 | Ahn et al. |
| D955,230 S | 6/2022 | King et al. |
| D955,231 S | 6/2022 | King et al. |
| 11,386,420 B2 | 7/2022 | Nolan et al. |
| D959,298 S | 8/2022 | Jones et al. |
| D959,299 S | 8/2022 | Jones et al. |
| D959,997 S | 8/2022 | Jones et al. |
| D960,400 S | 8/2022 | Ding |
| D962,239 S | 8/2022 | Arenas de Jesus et al. |
| 11,423,776 B2 | 8/2022 | Schwarz et al. |
| 11,430,027 B2 | 8/2022 | King et al. |
| 11,436,649 B2 | 9/2022 | King et al. |
| 11,462,109 B2 | 10/2022 | King et al. |
| 11,475,491 B2 | 10/2022 | King et al. |
| D971,033 S | 11/2022 | King et al. |
| D971,034 S | 11/2022 | King et al. |
| D971,035 S | 11/2022 | King et al. |
| D986,082 S | 5/2023 | Jones et al. |
| D986,084 S | 5/2023 | Jones et al. |
| D987,444 S | 5/2023 | King et al. |
| 11,683,617 B2 | 6/2023 | King et al. |
| 11,688,277 B2 | 6/2023 | Schwarz et al. |
| 2001/0012241 A1 | 8/2001 | Dee et al. |
| 2001/0027626 A1* | 10/2001 | Natelli, Jr. ............... E01F 9/685 52/170 |
| 2001/0047278 A1 | 11/2001 | Brookner et al. |
| 2001/0051531 A1 | 12/2001 | Singhal et al. |
| 2002/0008639 A1 | 1/2002 | Dee |
| 2002/0030606 A1 | 3/2002 | Chauvin et al. |
| 2002/0062172 A1 | 5/2002 | Bench |
| 2002/0063035 A1 | 5/2002 | Blad et al. |
| 2002/0074344 A1 | 6/2002 | Long et al. |
| 2002/0080013 A1 | 6/2002 | Anderson, III et al. |
| 2002/0100810 A1 | 8/2002 | Amadeo |
| 2002/0109609 A1 | 8/2002 | Potter, Sr. et al. |
| 2002/0109610 A1 | 8/2002 | Katz |
| 2002/0109611 A1 | 8/2002 | Howard |
| 2002/0111768 A1 | 8/2002 | Ghorayeb et al. |
| 2002/0134645 A1 | 9/2002 | Alexander et al. |
| 2003/0010821 A1 | 1/2003 | Silberberg |
| 2003/0017904 A1 | 1/2003 | Lee |

(56) References Cited

U.S. PATENT DOCUMENTS

| | | |
|---|---|---|
| 2003/0058084 A1 | 3/2003 | O'Hara |
| 2003/0092387 A1 | 5/2003 | Hjelmvik |
| 2003/0112151 A1 | 6/2003 | Chauvin et al. |
| 2003/0112597 A1* | 6/2003 | Smith ................... G06F 1/187 |
| 2003/0117904 A1 | 6/2003 | Lank et al. |
| 2003/0121754 A1 | 7/2003 | King |
| 2003/0128010 A1 | 7/2003 | Hsu |
| 2003/0128136 A1 | 7/2003 | Spier et al. |
| 2003/0132292 A1* | 7/2003 | Gomez ................. G06Q 20/341 235/383 |
| 2003/0132840 A1 | 7/2003 | Bahar |
| 2003/0135407 A1 | 7/2003 | Reinhardt et al. |
| 2003/0140531 A1 | 7/2003 | Pippins |
| 2003/0144905 A1 | 7/2003 | Smith |
| 2003/0144972 A1 | 7/2003 | Cordery et al. |
| 2003/0169183 A1 | 9/2003 | Korepanov et al. |
| 2003/0179107 A1 | 9/2003 | Kibria et al. |
| 2003/0220835 A1 | 11/2003 | Barnes, Jr. |
| 2003/0222792 A1 | 12/2003 | Berman et al. |
| 2003/0234888 A1 | 12/2003 | Hong et al. |
| 2004/0011099 A1 | 1/2004 | Andersson |
| 2004/0016796 A1 | 1/2004 | Hanna et al. |
| 2004/0039632 A1 | 2/2004 | Han et al. |
| 2004/0040028 A1 | 2/2004 | Moreau |
| 2004/0059693 A1 | 3/2004 | Hausen et al. |
| 2004/0068434 A1 | 4/2004 | Kanekon |
| 2004/0084278 A1 | 5/2004 | Harris et al. |
| 2004/0094619 A1 | 5/2004 | Silberberg |
| 2004/0160905 A1 | 8/2004 | Bernier et al. |
| 2004/0160906 A1 | 8/2004 | Greszczuk et al. |
| 2004/0181496 A1 | 9/2004 | Odinotski et al. |
| 2004/0207530 A1 | 10/2004 | Nielsen |
| 2004/0232878 A1 | 11/2004 | Couch et al. |
| 2004/0243526 A1 | 12/2004 | Krygler et al. |
| 2004/0254840 A1 | 12/2004 | Slemmer et al. |
| 2004/0254900 A1 | 12/2004 | Reinhard |
| 2004/0262379 A1 | 12/2004 | Gomes |
| 2004/0263117 A1 | 12/2004 | Kogan |
| 2004/0264302 A1 | 12/2004 | Ward, II |
| 2005/0029340 A1 | 2/2005 | Ferraro |
| 2005/0035740 A1 | 2/2005 | Elder et al. |
| 2005/0040951 A1 | 2/2005 | Zalewski et al. |
| 2005/0068201 A1 | 3/2005 | Wulff et al. |
| 2005/0099320 A1 | 5/2005 | Nath et al. |
| 2005/0102075 A1 | 5/2005 | Dar et al. |
| 2005/0155839 A1 | 7/2005 | Banks et al. |
| 2005/0168352 A1 | 8/2005 | Tomer |
| 2005/0178639 A1 | 8/2005 | Brumfield et al. |
| 2005/0192911 A1 | 9/2005 | Mattern |
| 2005/0216354 A1 | 9/2005 | Bam et al. |
| 2005/0226201 A1 | 10/2005 | McMillin |
| 2006/0020487 A1 | 1/2006 | Spittel et al. |
| 2006/0021848 A1 | 2/2006 | Smith |
| 2006/0028919 A1 | 2/2006 | Mitschele |
| 2006/0052055 A1 | 3/2006 | Rowse et al. |
| 2006/0072286 A1 | 4/2006 | Tseng |
| 2006/0114159 A1 | 6/2006 | Yoshikawa et al. |
| 2006/0116972 A1 | 6/2006 | Wong |
| 2006/0136131 A1 | 6/2006 | Dugan et al. |
| 2006/0149684 A1 | 7/2006 | Matsuura et al. |
| 2006/0152349 A1 | 7/2006 | Ratnakar |
| 2006/0152385 A1 | 7/2006 | Mandy |
| 2006/0173733 A1 | 8/2006 | Fancher |
| 2006/0227010 A1 | 10/2006 | Berstis et al. |
| 2006/0255119 A1 | 11/2006 | Marchasin et al. |
| 2006/0259354 A1 | 11/2006 | Yan |
| 2006/0267799 A1 | 11/2006 | Mendelson |
| 2006/0281435 A1* | 12/2006 | Shearer ................... H02J 50/20 455/343.1 |
| 2007/0011700 A1 | 1/2007 | Johnson |
| 2007/0016539 A1 | 1/2007 | Groft et al. |
| 2007/0017265 A1 | 1/2007 | Andersson |
| 2007/0029825 A1 | 2/2007 | Franklin et al. |
| 2007/0040449 A1 | 2/2007 | Spurlin et al. |
| 2007/0044523 A1 | 3/2007 | Davis |
| 2007/0046651 A1 | 3/2007 | Sinclair |
| 2007/0061155 A1 | 3/2007 | Ji et al. |
| 2007/0074702 A1 | 4/2007 | Nakamura et al. |
| 2007/0094153 A1 | 4/2007 | Ferraro |
| 2007/0114849 A1 | 5/2007 | Falik et al. |
| 2007/0119682 A1 | 5/2007 | Banks et al. |
| 2007/0129974 A1 | 6/2007 | Chen et al. |
| 2007/0136128 A1 | 6/2007 | Janacek et al. |
| 2007/0171069 A1 | 7/2007 | Allen |
| 2007/0184852 A1 | 8/2007 | Johnson et al. |
| 2007/0189907 A1 | 8/2007 | Kunihiro et al. |
| 2007/0208499 A1 | 9/2007 | Kwong |
| 2007/0210935 A1 | 9/2007 | Yost et al. |
| 2007/0276724 A1 | 11/2007 | Catt |
| 2007/0285281 A1 | 12/2007 | Welch |
| 2008/0052254 A1 | 2/2008 | Al Amri |
| 2008/0061967 A1 | 3/2008 | Corrado |
| 2008/0071611 A1 | 3/2008 | Lovett |
| 2008/0092343 A1* | 4/2008 | Unda ..................... B42F 13/14 24/67.5 |
| 2008/0093121 A1* | 4/2008 | Webb ..................... H02G 1/00 174/502 |
| 2008/0093454 A1 | 4/2008 | Yamazaki et al. |
| 2008/0147268 A1 | 6/2008 | Fuller |
| 2008/0158010 A1 | 7/2008 | Nath et al. |
| 2008/0165030 A1 | 7/2008 | Kuo et al. |
| 2008/0208680 A1 | 8/2008 | Cho |
| 2008/0218383 A1 | 9/2008 | Franklin et al. |
| 2008/0238715 A1 | 10/2008 | Cheng et al. |
| 2008/0245638 A1* | 10/2008 | King ..................... G06Q 20/127 194/350 |
| 2008/0257965 A1 | 10/2008 | Klein et al. |
| 2008/0265019 A1 | 10/2008 | Artino et al. |
| 2008/0266138 A1 | 10/2008 | Ponert |
| 2008/0270227 A1 | 10/2008 | Al Amri |
| 2008/0277468 A1 | 11/2008 | Mitschele |
| 2008/0289030 A1 | 11/2008 | Poplett |
| 2008/0291054 A1 | 11/2008 | Groft |
| 2008/0296365 A1 | 12/2008 | Schliebe |
| 2008/0319837 A1 | 12/2008 | Mitschele |
| 2009/0026842 A1 | 1/2009 | Hunter et al. |
| 2009/0032368 A1 | 2/2009 | Hunter et al. |
| 2009/0049875 A1 | 2/2009 | Buhl et al. |
| 2009/0057398 A1 | 3/2009 | Douglass et al. |
| 2009/0083149 A1 | 3/2009 | Maekawa et al. |
| 2009/0095593 A1* | 4/2009 | King ..................... G07D 5/00 194/302 |
| 2009/0099761 A1 | 4/2009 | Davis et al. |
| 2009/0102726 A1 | 4/2009 | Imano et al. |
| 2009/0109062 A1 | 4/2009 | An |
| 2009/0121889 A1 | 5/2009 | Lin et al. |
| 2009/0137204 A1 | 5/2009 | Chang et al. |
| 2009/0146796 A1 | 6/2009 | Goto et al. |
| 2009/0159674 A1* | 6/2009 | King ..................... G07F 17/0014 235/382 |
| 2009/0174528 A1 | 7/2009 | Toda et al. |
| 2009/0177580 A1 | 7/2009 | Lowenthal et al. |
| 2009/0183966 A1 | 7/2009 | King et al. |
| 2009/0192950 A1 | 7/2009 | King et al. |
| 2009/0199966 A1 | 8/2009 | Coleman et al. |
| 2009/0254438 A1 | 10/2009 | Johnson, Jr. et al. |
| 2009/0256707 A1 | 10/2009 | Uschold et al. |
| 2009/0267732 A1 | 10/2009 | Chauvin et al. |
| 2009/0284907 A1* | 11/2009 | Regimbal ................. G06F 1/181 361/679.02 |
| 2009/0287578 A1 | 11/2009 | Paluszek et al. |
| 2009/0315720 A1 | 12/2009 | Clement et al. |
| 2010/0019936 A1 | 1/2010 | Kaveler |
| 2010/0025459 A1 | 2/2010 | Yamada |
| 2010/0026522 A1 | 2/2010 | Ward, II |
| 2010/0030629 A1 | 2/2010 | Ward, II |
| 2010/0032266 A1 | 2/2010 | Stephan |
| 2010/0060479 A1 | 3/2010 | Salter |
| 2010/0103100 A1 | 4/2010 | Yamamoto |
| 2010/0106517 A1 | 4/2010 | Kociubinski et al. |
| 2010/0116883 A1 | 5/2010 | Cost et al. |
| 2010/0153193 A1 | 6/2010 | Ashby et al. |
| 2010/0161489 A1 | 6/2010 | Goodall et al. |
| 2010/0168694 A1 | 7/2010 | Gakhar et al. |

(56) References Cited

U.S. PATENT DOCUMENTS

| | | |
|---|---|---|
| 2010/0185325 A1 | 7/2010 | Kwon |
| 2010/0187300 A1 | 7/2010 | Ramachandran et al. |
| 2010/0188932 A1 | 7/2010 | Hanks et al. |
| 2010/0241056 A1 | 9/2010 | Lehtoluoto |
| 2010/0241564 A1 | 9/2010 | Miller et al. |
| 2010/0243729 A1 | 9/2010 | Russell et al. |
| 2010/0328104 A1 | 12/2010 | Groft |
| 2010/0332394 A1 | 12/2010 | Ioli |
| 2011/0015934 A1 | 1/2011 | Rowe et al. |
| 2011/0037562 A1 | 2/2011 | Braukmann et al. |
| 2011/0057815 A1* | 3/2011 | King ............ G07B 15/02 340/932.2 |
| 2011/0060653 A1 | 3/2011 | King et al. |
| 2011/0062230 A1 | 3/2011 | Ward, II et al. |
| 2011/0063133 A1 | 3/2011 | Keller et al. |
| 2011/0066297 A1 | 3/2011 | Saberi et al. |
| 2011/0079564 A1* | 4/2011 | Palmer ............ B62H 3/00 211/22 |
| 2011/0093314 A1 | 4/2011 | Redmann et al. |
| 2011/0106329 A1* | 5/2011 | Donnelly ............ B60L 53/65 700/291 |
| 2011/0122036 A1 | 5/2011 | Leung et al. |
| 2011/0133613 A1* | 6/2011 | Descamps ............ G07F 9/06 312/223.1 |
| 2011/0158331 A1 | 6/2011 | Kavaler et al. |
| 2011/0203901 A1 | 8/2011 | King et al. |
| 2011/0204847 A1 | 8/2011 | Turner |
| 2011/0205087 A1 | 8/2011 | Kell et al. |
| 2011/0210827 A1 | 9/2011 | Lidror |
| 2011/0213656 A1 | 9/2011 | Turner |
| 2011/0218940 A1* | 9/2011 | Bergstrom ............ G06Q 30/0284 705/418 |
| 2011/0221624 A1 | 9/2011 | Kavaler |
| 2011/0222957 A1 | 9/2011 | Marques Lito Velez Grilo |
| 2011/0241442 A1 | 10/2011 | Mittleman et al. |
| 2011/0261548 A1 | 10/2011 | Gandhi |
| 2011/0276519 A1 | 11/2011 | MacKay et al. |
| 2011/0313822 A1 | 12/2011 | Burdick |
| 2011/0316716 A1 | 12/2011 | MacKay et al. |
| 2011/0320243 A1 | 12/2011 | Khan |
| 2011/0320256 A1 | 12/2011 | Florucci et al. |
| 2012/0026015 A1 | 2/2012 | Kavaler |
| 2012/0078686 A1 | 3/2012 | Bashani |
| 2012/0084210 A1 | 4/2012 | Farahmand |
| 2012/0092528 A1 | 4/2012 | Jung et al. |
| 2012/0143657 A1 | 6/2012 | Silberberg |
| 2012/0158466 A1 | 6/2012 | John |
| 2012/0173171 A1 | 7/2012 | Bajwa et al. |
| 2012/0185325 A1 | 7/2012 | Shani |
| 2012/0197806 A1 | 8/2012 | Hill |
| 2012/0208521 A1 | 8/2012 | Häger et al. |
| 2012/0213351 A1* | 8/2012 | Boyce ............ H04M 1/0291 379/167.01 |
| 2012/0215375 A1 | 8/2012 | Chang |
| 2012/0222935 A1* | 9/2012 | MacKay ............ G06Q 20/3278 194/210 |
| 2012/0223841 A1* | 9/2012 | Chauvin ............ G06Q 20/32 340/870.02 |
| 2012/0273322 A1 | 11/2012 | MacKay et al. |
| 2012/0285790 A1* | 11/2012 | Jones ............ G07F 17/24 194/217 |
| 2012/0285791 A1 | 11/2012 | Jones et al. |
| 2012/0285792 A1 | 11/2012 | Jones et al. |
| 2012/0285793 A1 | 11/2012 | Jones et al. |
| 2012/0286036 A1 | 11/2012 | Jones et al. |
| 2012/0286968 A1 | 11/2012 | Jones et al. |
| 2012/0292385 A1 | 11/2012 | MacKay et al. |
| 2013/0005445 A1 | 1/2013 | Walker et al. |
| 2013/0016952 A1 | 1/2013 | Knuth |
| 2013/0021201 A1 | 1/2013 | del Castillo et al. |
| 2013/0027218 A1 | 1/2013 | Schwarz et al. |
| 2013/0085928 A1 | 4/2013 | McKinney |
| 2013/0099943 A1 | 4/2013 | Subramanya |
| 2013/0116952 A1 | 5/2013 | Chai |
| 2013/0124270 A1 | 5/2013 | Tziperman et al. |
| 2013/0124320 A1 | 5/2013 | Karner |
| 2013/0143536 A1 | 6/2013 | Ratti |
| 2013/0231985 A1* | 9/2013 | MacKay ............ G06Q 50/30 705/13 |
| 2013/0238406 A1 | 9/2013 | King et al. |
| 2013/0257589 A1* | 10/2013 | Mohiuddin ............ G08C 17/02 340/5.61 |
| 2013/0262275 A1 | 10/2013 | Outwater et al. |
| 2013/0285455 A1 | 10/2013 | Hunter et al. |
| 2014/0040028 A1 | 2/2014 | King et al. |
| 2014/0041301 A1 | 2/2014 | Oakely et al. |
| 2014/0058805 A1 | 2/2014 | Paesler et al. |
| 2014/0108107 A1 | 4/2014 | Jones et al. |
| 2014/0129158 A1 | 5/2014 | Shea |
| 2014/0139360 A1* | 5/2014 | Vilajosana Guillen ............ G08G 1/142 340/932.2 |
| 2014/0158767 A1 | 6/2014 | Ramaci |
| 2014/0165885 A1 | 6/2014 | Denny |
| 2014/0172518 A1 | 6/2014 | King et al. |
| 2014/0174881 A1 | 6/2014 | King et al. |
| 2014/0210646 A1 | 7/2014 | Subramanya |
| 2014/0213176 A1 | 7/2014 | Mendelson |
| 2014/0214499 A1 | 7/2014 | Hudson et al. |
| 2014/0214500 A1 | 7/2014 | Hudson et al. |
| 2014/0218527 A1* | 8/2014 | Subramanya ............ G08G 1/143 348/148 |
| 2014/0229246 A1 | 8/2014 | Ghaffari |
| 2014/0231505 A1 | 8/2014 | King et al. |
| 2014/0257943 A1 | 9/2014 | Nerayoff et al. |
| 2014/0279565 A1* | 9/2014 | Trump ............ G06Q 20/3821 705/72 |
| 2014/0289025 A1 | 9/2014 | King et al. |
| 2014/0319211 A1 | 10/2014 | MacKay et al. |
| 2014/0344891 A1 | 11/2014 | Mullick et al. |
| 2015/0000511 A1* | 1/2015 | Engl ............ F41H 5/0407 89/36.08 |
| 2015/0028893 A1 | 1/2015 | Schnare |
| 2015/0029041 A1 | 1/2015 | Liu et al. |
| 2015/0045984 A1 | 2/2015 | Hui et al. |
| 2015/0068827 A1* | 3/2015 | Makitalo ............ B60K 15/073 180/190 |
| 2015/0084786 A1 | 3/2015 | King et al. |
| 2015/0106172 A1 | 4/2015 | Salama |
| 2015/0120336 A1 | 4/2015 | Grokop et al. |
| 2015/0129391 A1 | 4/2015 | Jones et al. |
| 2015/0134460 A1 | 5/2015 | Tian et al. |
| 2015/0179070 A1 | 6/2015 | Sandbrook |
| 2015/0191178 A1 | 7/2015 | Roy et al. |
| 2015/0235503 A1 | 8/2015 | King et al. |
| 2015/0242605 A1 | 8/2015 | Du et al. |
| 2015/0278969 A1 | 10/2015 | Benoy et al. |
| 2015/0283902 A1 | 10/2015 | Tuukkanen |
| 2015/0288713 A1 | 10/2015 | Lawrence et al. |
| 2015/0294526 A1 | 10/2015 | Vogt |
| 2015/0302057 A1 | 10/2015 | Kealey et al. |
| 2015/0332587 A1 | 11/2015 | Schwarz et al. |
| 2015/0333598 A1* | 11/2015 | Conticchio ............ F03G 5/06 290/1 R |
| 2015/0341241 A1* | 11/2015 | Robertson ............ H04L 43/0811 709/224 |
| 2015/0356604 A1 | 12/2015 | Kim et al. |
| 2015/0371483 A1 | 12/2015 | Sun |
| 2015/0376891 A1* | 12/2015 | Laurindo ............ E04B 1/12 52/588.1 |
| 2016/0001782 A1 | 1/2016 | Fiedler |
| 2016/0012418 A1 | 1/2016 | MacKay et al. |
| 2016/0012602 A1 | 1/2016 | Xu et al. |
| 2016/0040699 A1 | 2/2016 | Nayar |
| 2016/0055322 A1 | 2/2016 | Thomas |
| 2016/0069557 A1* | 3/2016 | Rückgauer ............ F21V 17/16 361/689 |
| 2016/0086397 A1 | 3/2016 | Phillips |
| 2016/0133085 A1* | 5/2016 | Eagon ............ H04Q 9/00 705/13 |
| 2016/0163119 A1 | 6/2016 | Bashani |

(56) References Cited

U.S. PATENT DOCUMENTS

| | | |
|---|---|---|
| 2016/0181688 A1* | 6/2016 | Gu .................... H01Q 1/242 343/702 |
| 2016/0267340 A1 | 9/2016 | Jensen |
| 2016/0268838 A1 | 9/2016 | Hunter et al. |
| 2016/0288753 A1* | 10/2016 | Greene ................ B60J 5/045 |
| 2016/0321714 A1 | 11/2016 | King et al. |
| 2016/0371915 A1 | 12/2016 | MacKay et al. |
| 2017/0032485 A1 | 2/2017 | Vemury |
| 2017/0032582 A1 | 2/2017 | Moran et al. |
| 2017/0034600 A1 | 2/2017 | King et al. |
| 2017/0083043 A1 | 3/2017 | Bowers et al. |
| 2017/0094517 A1 | 3/2017 | Jakobsson |
| 2017/0096123 A1 | 4/2017 | Gennermann et al. |
| 2017/0098339 A1 | 4/2017 | Keller et al. |
| 2017/0116857 A1 | 4/2017 | Moran et al. |
| 2017/0148230 A1 | 5/2017 | Richard |
| 2017/0154368 A1 | 6/2017 | Jones et al. |
| 2017/0168155 A1 | 6/2017 | Richard |
| 2017/0186054 A1 | 6/2017 | Fish et al. |
| 2017/0193734 A1 | 7/2017 | King et al. |
| 2017/0197586 A1 | 7/2017 | Kawamura et al. |
| 2017/0206716 A1 | 7/2017 | King et al. |
| 2017/0213262 A1 | 7/2017 | Kelley, II et al. |
| 2017/0256983 A1 | 9/2017 | Hunter et al. |
| 2017/0262882 A1 | 9/2017 | Shina |
| 2017/0299400 A1 | 10/2017 | Joung et al. |
| 2017/0320501 A1 | 11/2017 | Li et al. |
| 2017/0323227 A1 | 11/2017 | Sadeghi |
| 2017/0323513 A1 | 11/2017 | Jones et al. |
| 2017/0325082 A1 | 11/2017 | Rowe et al. |
| 2017/0369071 A1 | 12/2017 | Gould et al. |
| 2018/0018179 A1 | 1/2018 | Scheufler et al. |
| 2018/0025549 A1 | 1/2018 | King et al. |
| 2018/0025550 A1 | 1/2018 | Hudson et al. |
| 2018/0025629 A1 | 1/2018 | Schwarz et al. |
| 2018/0061172 A1 | 3/2018 | MacKay et al. |
| 2018/0068337 A1 | 3/2018 | Fiorucci et al. |
| 2018/0082488 A1 | 3/2018 | King et al. |
| 2018/0082489 A1 | 3/2018 | King et al. |
| 2018/0082490 A1 | 3/2018 | King et al. |
| 2018/0160282 A1 | 6/2018 | van de Poll |
| 2018/0225908 A1 | 8/2018 | MacKay et al. |
| 2018/0225909 A1 | 8/2018 | MacKay et al. |
| 2018/0322534 A1 | 11/2018 | King et al. |
| 2018/0339708 A1 | 11/2018 | Geller |
| 2018/0342165 A1 | 11/2018 | Sweeney et al. |
| 2019/0062914 A1 | 2/2019 | King et al. |
| 2019/0066424 A1 | 2/2019 | Hassani et al. |
| 2019/0073837 A1 | 3/2019 | Oliver |
| 2019/0114869 A1 | 4/2019 | MacKay et al. |
| 2019/0131819 A1 | 5/2019 | Bell |
| 2019/0220011 A1 | 7/2019 | Della Penna |
| 2019/0227954 A1 | 7/2019 | Shi |
| 2019/0236940 A1 | 8/2019 | Schwarz et al. |
| 2019/0378368 A1 | 12/2019 | MacKay et al. |
| 2020/0136229 A1 | 4/2020 | MacKay et al. |
| 2020/0153270 A1 | 5/2020 | Hunter et al. |
| 2020/0160263 A1 | 5/2020 | Kuettner |
| 2020/0276503 A1 | 9/2020 | Marchiorello |
| 2020/0310528 A1 | 10/2020 | Upmanue et al. |
| 2020/0327801 A1 | 10/2020 | Schwarz et al. |
| 2020/0334581 A1 | 10/2020 | Skaling |
| 2020/0349666 A1 | 11/2020 | Hodge et al. |
| 2020/0364967 A1 | 11/2020 | Spice |
| 2021/0065263 A1 | 3/2021 | King et al. |
| 2021/0067846 A1 | 3/2021 | King et al. |
| 2021/0319485 A1 | 10/2021 | King et al. |
| 2021/0344218 A1 | 11/2021 | Hunter et al. |
| 2021/0407348 A1 | 12/2021 | King et al. |
| 2022/0030335 A1 | 1/2022 | King et al. |
| 2022/0076303 A1 | 3/2022 | King et al. |
| 2022/0076304 A1 | 3/2022 | King et al. |
| 2022/0076305 A1 | 3/2022 | King et al. |
| 2023/0005369 A1 | 1/2023 | King et al. |
| 2023/0057773 A1 | 2/2023 | King et al. |
| 2023/0072870 A1 | 3/2023 | Marvi et al. |

FOREIGN PATENT DOCUMENTS

| | | |
|---|---|---|
| AU | 200227724 A1 | 1/2003 |
| AU | 2006203554 A1 | 9/2006 |
| CA | 2233931 A1 | 4/1997 |
| CA | 2248347 C | 10/1997 |
| CA | 2448347 C | 10/1997 |
| CA | 2511461 C | 10/1997 |
| CA | 2260925 A1 | 1/1998 |
| CA | 2227833 C | 7/1998 |
| CA | 2346908 A1 | 4/2000 |
| CA | 2302922 C | 9/2000 |
| CA | 2352968 A1 | 4/2001 |
| CA | 2373400 A1 | 8/2001 |
| CA | 2401429 A1 | 9/2001 |
| CA | 2377010 A1 | 10/2001 |
| CA | 2357179 A1 | 3/2002 |
| CA | 2437722 A1 | 8/2002 |
| CA | 2387540 C | 11/2002 |
| CA | 2453369 A1 | 1/2003 |
| CA | 2363915 A1 | 5/2003 |
| CA | 2413198 A1 | 5/2003 |
| CA | 2414132 A1 | 6/2003 |
| CA | 2453369 | 1/2004 |
| CA | 2443677 C | 3/2004 |
| CA | 2595309 A1 | 7/2006 |
| CA | 2631699 A1 | 6/2007 |
| CA | 2622164 C | 8/2008 |
| CA | 2693911 A1 | 1/2009 |
| CA | 2650192 A1 | 7/2009 |
| CA | 2650195 A1 | 7/2009 |
| CA | 2650195 C | 7/2009 |
| CA | 2933066 A1 | 7/2009 |
| CA | 2745368 C | 7/2010 |
| CA | 2773132 C | 3/2011 |
| CA | 2773135 A1 | 3/2011 |
| CA | 2517717 | 1/2012 |
| CA | 2770093 A1 | 5/2012 |
| CA | 2870544 C | 5/2012 |
| CA | 2870592 A1 | 5/2012 |
| CA | 2773250 C | 9/2012 |
| CA | 142346 | 7/2013 |
| CA | 145137 | 7/2013 |
| CA | 2900177 A1 | 2/2017 |
| CA | 2908793 A1 | 2/2017 |
| CA | 2932667 A1 | 2/2017 |
| CA | 3046774 A1 | 12/2019 |
| CA | 189362 | 6/2021 |
| CA | 189363 | 6/2021 |
| CA | 189364 | 6/2021 |
| CA | 189365 | 6/2021 |
| CA | 189366 | 6/2021 |
| CN | 1037604 A | 11/1989 |
| CN | 2395344 Y | 9/2000 |
| CN | 2470887 Y | 1/2002 |
| CN | 2544352 Y | 4/2003 |
| CN | 1549990 A | 11/2004 |
| CN | 201303054 Y | 9/2009 |
| CN | 305987969 | 8/2020 |
| DE | 2804085 A1 | 8/1978 |
| DE | 2750193 A1 | 5/1979 |
| DE | 102005041290 A1 | 3/2007 |
| EP | 0265328 A1 | 4/1988 |
| EP | 0329129 A3 | 8/1989 |
| EP | 0933288 A2 | 4/1999 |
| EP | 0933288 A2 | 8/1999 |
| EP | 0980055 A1 | 2/2000 |
| EP | 1227448 A2 | 7/2002 |
| EP | 1327962 A2 | 7/2003 |
| EP | 1376491 A1 | 2/2004 |
| EP | 1748393 A1 | 1/2007 |
| EP | 1128350 B1 | 10/2007 |
| EP | 1898360 A1 | 3/2008 |
| EP | 2215605 B1 | 8/2012 |
| EP | 1898360 B8 | 2/2013 |

(56) References Cited

FOREIGN PATENT DOCUMENTS

| | | |
|---|---|---|
| EP | 002416206-0001 A1 | 3/2014 |
| EP | 002416206-0002 A1 | 3/2014 |
| EP | 002416206-0003 A1 | 3/2014 |
| EP | 002479352-0001 A1 | 6/2014 |
| EP | 002479352-0002 A1 | 6/2014 |
| EP | 002479352-0003 A1 | 6/2014 |
| EP | 002479360-0001 A1 | 6/2014 |
| EP | 002479360-0002 A1 | 6/2014 |
| EP | 002479360-0003 A1 | 6/2014 |
| EP | 002479428-0001 A1 | 6/2014 |
| EP | 002479428-0002 A1 | 6/2014 |
| EP | 002479428-0003 A1 | 6/2014 |
| EP | 003076702-0001 A1 | 4/2016 |
| EP | 003076702-0002 | 4/2016 |
| EP | 003076702-0003 A1 | 4/2016 |
| EP | 003076702-0004 A1 | 4/2016 |
| EP | 003076702-0005 A1 | 4/2016 |
| EP | 003076702-0006 A1 | 4/2016 |
| EP | 003462183-0001 A1 | 11/2016 |
| EP | 003462183-0002 A1 | 11/2016 |
| EP | 003462183-0003 A1 | 11/2016 |
| EP | 003462183-0004 A1 | 11/2016 |
| EP | 003462183-0005 A1 | 11/2016 |
| EP | 003462183-0006 A1 | 11/2016 |
| EP | 004415164-0001 | 10/2017 |
| EP | 004415164-0002 | 10/2017 |
| EP | 004415164-0003 | 10/2017 |
| EP | 004415164-0004 | 10/2017 |
| EP | 004415164-0005 | 10/2017 |
| EP | 004415164-0006 | 10/2017 |
| EP | 3582195 A1 | 12/2019 |
| FR | 2600448 A1 | 12/1987 |
| FR | 2837583 A1 | 9/2003 |
| FR | 2928678 A1 | 9/2009 |
| FR | 2979726 A1 | 3/2013 |
| GB | 1237579 | 6/1971 |
| GB | 1283555 | 7/1972 |
| GB | 1431862 | 4/1976 |
| GB | 2077475 A | 12/1981 |
| GB | 2155228 A | 9/1985 |
| GB | 2284919 A | 6/1995 |
| GB | 2298510 A | 9/1996 |
| GB | 2461397 A | 6/2010 |
| IL | 149880 A | 6/2007 |
| JP | 58121494 A | 7/1983 |
| JP | 6437661 | 2/1989 |
| JP | S6437661 A | 2/1989 |
| JP | H01165494 | 6/1989 |
| JP | H01303026 | 12/1989 |
| JP | H028692 A | 1/1990 |
| JP | H0261711 A | 3/1990 |
| JP | H02180623 A | 7/1990 |
| JP | H03253992 | 11/1991 |
| JP | H0487533 A | 3/1992 |
| JP | H08305998 A | 11/1996 |
| JP | 2002074430 A | 3/2002 |
| JP | 2002099640 A | 4/2002 |
| JP | 2002528799 A | 9/2002 |
| JP | 2003169133 A | 6/2003 |
| JP | 3441832 | 9/2003 |
| JP | 2003527701 A | 9/2003 |
| JP | 2005242888 A | 9/2005 |
| JP | 2005267430 A | 9/2005 |
| JP | 2007052773 A | 3/2007 |
| JP | 4240927 B2 | 3/2009 |
| JP | 4247079 | 4/2009 |
| JP | 2011060206 A | 3/2011 |
| JP | 5238316 | 7/2013 |
| JP | 5259000 B1 | 8/2013 |
| KR | 20000016671 A | 3/2000 |
| KR | 20000030290 | 6/2000 |
| KR | 20010028481 A | 4/2001 |
| KR | 102005038077 A | 4/2005 |
| KR | 20060008085 | 8/2006 |
| KR | 100693204 B1 | 3/2007 |
| KR | 1020080026282 A | 3/2008 |
| KR | 20080041730 A | 5/2008 |
| MX | 2008007047 A | 8/2008 |
| NZ | 20020530606 A | 11/2006 |
| WO | 198100778 A1 | 3/1981 |
| WO | 1995020204 | 7/1995 |
| WO | 199611453 A1 | 4/1996 |
| WO | 199712345 A1 | 4/1997 |
| WO | 1997033341 A1 | 9/1997 |
| WO | 199737328 A1 | 10/1997 |
| WO | 199804080 A1 | 1/1998 |
| WO | 200059201 A1 | 10/2000 |
| WO | 2000059201 A1 | 10/2000 |
| WO | 200124127 A1 | 4/2001 |
| WO | WO2001024127 A1 | 4/2001 |
| WO | 200169541 A1 | 9/2001 |
| WO | 200180157 A1 | 10/2001 |
| WO | 2002063570 A2 | 8/2002 |
| WO | 2002084600 A1 | 10/2002 |
| WO | 2003005324 A1 | 1/2003 |
| WO | 2003009238 A1 | 1/2003 |
| WO | 2003065322 A1 | 8/2003 |
| WO | 2004012352 A1 | 2/2004 |
| WO | 2005027035 A1 | 3/2005 |
| WO | 2005031494 A2 | 4/2005 |
| WO | 2006076773 A1 | 7/2006 |
| WO | 2006095352 A2 | 9/2006 |
| WO | 2007063530 A2 | 6/2007 |
| WO | 2009009854 A1 | 1/2009 |
| WO | 2009154787 A2 | 12/2009 |
| WO | 2010008610 A2 | 1/2010 |
| WO | 2010062105 A2 | 6/2010 |
| WO | 2010071972 A1 | 7/2010 |
| WO | 2010071974 A1 | 7/2010 |
| WO | 2011029061 A2 | 3/2011 |
| WO | 2011029062 A2 | 3/2011 |
| WO | 2012015453 A1 | 2/2012 |
| WO | 2012092609 A2 | 7/2012 |
| WO | 2012154902 A1 | 11/2012 |
| WO | 2012154913 A2 | 11/2012 |
| WO | 2013016453 A2 | 1/2013 |
| WO | 2013019273 A1 | 2/2013 |
| WO | 2013049418 A2 | 4/2013 |
| WO | 2014014494 A1 | 1/2014 |
| WO | 2014127384 A1 | 8/2014 |
| WO | 2014152369 A3 | 9/2014 |
| WO | 2017024396 A1 | 2/2017 |
| WO | 2017024397 A1 | 2/2017 |
| WO | WO2017024396 A1 | 2/2017 |
| WO | WO2017024397 A1 | 2/2017 |

OTHER PUBLICATIONS

Reino International, Recommended Cashbox Handling Guidelines, Version 2.0, Nov. 26, 2003 (7 pages).
Digital Payment Technologies, Credit Card Processing with Luke and Shelby, Dec. 2007 (15 pages).
Duncan Solutions—Intermec CN50 webpage, Mar. 8, 2011 (2 pages).
Duncan Solutions—Motorola MC75 webpage, Mar. 8, 2011 (2 pages).
Duncan Solutions—AutoCITE brochure, 2013 (2 pages).
Duncan Solutions—AutoCITE TM X3 Handheld Computer, 2013 (2 pages).
Ambravan, B., "Improved-Clarity Polycarbonate (PC) Resins used in liniLED PU," http://organiclighting.com/tag/polycarbonate-pc-resins/, Sep. 26, 2016 (1 page).
Intrinsyc Software International, Inc., Intrinsyc and Digital Pioneer Partner on Development of New Leading Edge Parking Terminal Solution, Aug. 14, 2003 (2 pages).
Shaheen, S., "Smart Parking Management Field Test: A Bay Area Rapid Transit (BART) District Parking Demonstration," Institute of Transportation Studies, UC Davis, Jan. 1, 2005 (139 pages).
Micrel, Application Note 51 Frequency Hopping Techniques, Jun. 2006, Rev. 1.0 (8 pages).
Cardinal Tracking Inc.—MobileCite brochure, dated prior to Jun. 15, 2015 (2 pages).

(56) References Cited

OTHER PUBLICATIONS

The United States Conference of Mayors Press Release, "The U.S. Conference of Mayors Presents 'Best-Practice' Awards," Jan. 20, 2012 (3 pages).
Reino, Operator User Manual, 2003 (106 pages).
Remedios et al., "NFC Technologies in Mobile Phones and Emerging Applications," 2006, IFIP International Federation for Information Processing, vol. 220, Information Technology for Balanced Manufacturing Systems, ed. Shen, W., (Boston: Springer, pp. 425-434 (10 pages).
Reino, Parking Systems RSV2 Service Manual, Version 3.1, Dec. 2003 (78 pages).
Duncan Solutions, Pay-by-Space Parking Meters, Customer Support Manual, Jul. 2006 (216 pages).
Bayless et al., "Smart Parking and the Connected Consumer," IDS America Research, Dec. 2012 (39 pages).
Bernspang, F., "Smart Parking using Magnetometers and Mobile Applications," Master's Thesis, Master of Science in Engineering Technology, Computer Science and Engineering, Lulea University of Technology, Nov. 2010—May 2011 (35 pages).
Cosgrove, D., "SmartPark," Senior Project Report, Jun. 12, 2013 (20 pages).
Spyker, R. L., "Predicting capacitor run time for a battery/capacitor hybrid source," Power Electronic Drives and Energy Systems for Industrial Growth, 1998, abstract only (2 pages).
Video link, "PhotoViolationHandHeldUnit TM" https://web.archive.org/web/20080222104246/http://www.photoviolation.com/videos/HHU.wmv, Photo Violation Technologies Corp., dated prior to Jun. 15, 2015.
Video link, "The PBS Solution" https://web.archive.org/web/20080222104246/http://www.photoviolation.com/videos/PBS.wmv, Photo Violation Technologies Corp., dated prior to Jun. 15, 2015.
Video link, "The PVM Solution" https://web.archive.org/web/20080222104246/http://www.photoviolation.com/videos/PVM.wmv, Photo Violation Technologies Corp., dated prior to Jun. 15, 2015.
Video link, "Park Card Meter TM System," https://web.archive.org/web/20080222104246/http://www.photoviolation.com/videos/PCM.wmv, Photo Violation Technologies Corp., dated prior to Jun. 15, 2015.
Information Disclosure Statement by Applicant filed for U.S. Appl. No. 12/355,734 on May 23, 2012 (2 pages).
Information Disclosure Statement by Applicant filed for U.S. Appl. No. 12/355,740 on May 23, 2012 (2 pages).
Information Disclosure Statement by Applicant filed for U.S. Appl. No. 12/875,959 on May 24, 2012 (2 pages).
Information Disclosure Statement by Applicant filed for U.S. Appl. No. 12/875,975 on May 24, 2012 (2 pages).
Information Disclosure Statement by Applicant filed for U.S. Appl. No. 12/355,734 on Oct. 23, 2012 (2 pages).
Transmittal of Information Disclosure Statement by Applicant filed for U.S. Appl. No. 12/973,109 on May 31, 2012 (2 pages).
U.S. Appl. No. 15/474,773, filed Mar. 30, 2017 (68 pages).
Byrd Dennis, Parking Meter Manufacturer Sees Bright Future for New Sun-Powered Devices, Los Angeles Times, May 14, 1989 (2 pages).
Design U.S. Appl. No. 29/466,267, filed Sep. 5, 2013 (19 pages).
Design U.S. Appl. No. 29/466,268, filed Sep. 5, 2013 (19 pages).
Design U.S. Appl. No. 29/466,269, filed Sep. 5, 2013 (19 pages).
Design U.S. Appl. No. 29/477,176, filed Dec. 19, 2013 (24 pages).
Design U.S. Appl. No. 29/477,195, filed Dec. 19, 2013 (21 pages).
Design U.S. Appl. No. 29/477,196, filed Dec. 19, 2013 (21 pages).
Design U.S. Appl. No. 29/477,339, filed Dec. 20, 2013 (21 pages).
Design U.S. Appl. No. 29/477,402, filed Dec. 20, 2013 (24 pages).
Design U.S. Appl. No. 29/477,405, filed Dec. 20, 2013 (24 pages).
Design U.S. Appl. No. 29/520,918, filed Mar. 18, 2015 (23 pages).
Design U.S. Appl. No. 29/521,401, filed Mar. 23, 2015 (24 pages).
AU315846—Figures.
AU315847—Figures.
AU314132—Figures.
AU315845—Figures.
Written Opinion issued in application No. PCT/US2012/037229, dated Jan. 28, 2013.
Written Opinion issued in application No. PCT/US2012/037205, dated Oct. 4, 2012.
Office Action issued in U.S. Appl. No. 13/545,871, dated Apr. 12, 2013.
Office Action issued in U.S. Appl. No. 13/545,871, dated Aug. 6, 2013.
Office Action issued in U.S. Appl. No. 13/545,871, dated Dec. 28, 2012.
Office Action issued in U.S. Appl. No. 13/545,871, dated Nov. 28, 2012.
Office Action issued in U.S. Appl. No. 13/546,918, dated Apr. 15, 2013.
Office Action issued in U.S. Appl. No. 13/546,918, dated Dec. 5, 2013.
Office Action issued in U.S. Appl. No. 13/546,918, dated May 8, 2014.
Office Action issued in U.S. Appl. No. 13/546,918, dated Sep. 26, 2012.
Office Action issued in U.S. Appl. No. 14/094,382, dated Aug. 5, 2014.
Office Action issued in U.S. Appl. No. 14/094,382, dated Dec. 26, 2014.
Office Action issued in U.S. Appl. No. 14/325,134, dated Apr. 1, 2015.
Office Action in U.S. Appl. No. 14/325,134, dated Nov. 24, 2015.
Office Action issued in U.S. Appl. No. 14/743,691, dated May 13, 2016.
Office Action issued in U.S. Appl. No. 14/743,691, dated Sep. 2, 2016.
Office Action issued in U.S. Appl. No. 14/698,806, dated Dec. 14, 2015.
Office Action issued in U.S. Appl. No. 15/220,228, dated Jun. 16, 2017.
Office Action issued in U.S. Appl. No. 15/802,298 dated Apr. 2, 2018.
Office Action issued in U.S. Appl. No. 29/477,402, dated Apr. 9, 2015.
Office Action issued in U.S. Appl. No. 29/477,176, dated May 4, 2015.
Office Action issued in U.S. Appl. No. 29/477,200, dated Apr. 9, 2015.
Office Action issued in U.S. Appl. No. 29/477,201, dated Apr. 9, 2015.
Office Action issued in U.S. Appl. No. 29/477,204, dated Apr. 9, 2015.
Office Action issued in U.S. Appl. No. 29/477,321, dated May 15, 2015.
Office Action issued in U.S. Appl. No. 29/477,324, dated Apr. 23, 2015.
Duncan Solutions "Single-Space Meters" brochure (2 pages); Rev. Apr. 2006, 2006 Duncan Solutions, Inc.
Duncan Solutions—VM Pay-by-Spcae Multi-Space Meter brochure, 2013 (2 pages).
Duncan, Duncan VM—Solar Power meter photograph, pre-Mar. 2011 (1 page).
Duncan Solutions, Duncan VS, 2006 (2 pages).
McCullagh, D., "Hackers: We can bypass San Francisco e-parking meters," Jul. 30, 2009, http://news.cnet.com (2 pages).
Exhibit 1003—Declaration of Todd Magness in Support of Petition for Inter Partes Review of U.S. Pat. No. 7,854,310, dated Oct. 21, 2015 (70 pages).
Exhibit 1004—Declaration of Anderson Moore in Support of Petition for Inter Partes Review of U.S. Pat. No. 8,595,054, dated Oct. 21, 2015 (19 pages).
Exhibit 1005—U.S. Appl. No. 60/741,920, filed Dec. 2, 2005 (20 pages).
Exhibit 1009—Tung, Y., "Design of an Advanced On-street Parking Meter," Thesis, Rochester Institute of Technology, 2001 (75 pages).

(56) References Cited

OTHER PUBLICATIONS

Exhibit 1010—Christian, S. E., "Parking Meter Winding Up for Computer Age," Chicago Tribune, May 19, 1995 (6 pages).
Exhibit 1011—Associated Press, "New parking meters based on computer," The San Diego Union, Feb. 1, 1987 (1 page).
Exhibit 1012—Lunden, J., Good Morning America transcript, Nov. 6, 1986 (3 pages).
Exhibit 1013—Luke Parking Station ad (p. 28), Parking Today, vol. 10, No. 4, Apr. 2005 (64 pages)—Part 1.
Exhibit 1014—Blass, E., "Changing times," Lansing State Journal, Feb. 19, 1987 (1 page).
Exhibit 1015—Gabriele, M.C., "Electronic Parking Meters Rival Mechanical Units," American Metal Market/Metalworking News, Sep. 29, 1986 (1 page).
Exhibit 1016—Sandler, L., "Lovely VISA, meter maid: Use credit card to park," Milwaukee Journal Sentinel, Jun. 13, 2005 (1 page).
Exhibit 1017—Item for Finance Commitee, "Capital Works Reserve Fund, Head 708—Capital Subventions and Major Systems and Equipment," FCR(2002-03)18, May 24, 2002 (15 pages).
Exhibit 1018—Anonymous, "Happy %#@! Anniversary, First Parking Meter Installed Jul. 16, 1935," The Expired Meter News, Views, Information on Driving in Chicago, Jul. 16, 2009 (10 pages).
Exhibit 1019—Anonymous, "Parking Meter Patented 72 Years Ago Today", The Expired Meter News, Views Information on Driving in Chicago, May 24, 2010 (6 pages).
Exhibit 1032—U.S. Pat. No. 5,570,771 to Jacobs, Nov. 5, 1996 (29 pages).
Exhibit 1034—Anonymous, "Smart Cards and Parking," TC-06001, Smart Card Alliance Transportation Council White Paper, Jan. 2006 (52 pages).
Exhibit 1037—Catalog Entry for Exhibit 1009, Tung, Y., "Design of an advanced on-street parking meter," Oct. 18, 2015 (2 pages).
Exhibit 1038—POM Parking Meters website, Oct. 20, 2015 (4 pages).
IPS Group Inc., Exhibit 2001, Design of an advanced on-street parking meter, Jan. 12, 2016 (2 pages).
IPS Group Inc., Exhibit 2002, About RIT Digital Media Library, Jan. 12, 2016 (1 page).
IPS Group Inc., Exhibit 2003, The U.S. Conference of Mayors Presents 'Best-Practice' Awards, Jan. 20, 2012 (2 pages).
IPS Group Inc., Exhibit 2004, City of Los Angeles, Card & Coin Parking Meter Lease, Nov. 29, 2010 (4 pages).
IPS Group Inc., Exhibit 2005, City of Culver City, California, Approval of a Contract with IPS Group Inc., for the Sole-Source Purchase of 1,000 Parking Meters, Dec. 12, 2011 (3 pages).
IPS Group Inc., Exhibit 2006, City of San Luis Obispo City Manager Report, Award of Credit Card Meters and Service Contract, RFP Specification No. 91137, Jan. 20, 2012 (5 pages).
IPS Group Inc., Exhibit 2007, Walnut Creek, Alternate Downtown Parking Pay Technology, Oct. 20, 2011 (4 pages).
IPS Group Inc., Exhibit 2008, How M2M Maximizes Denver's Revenue, Oct. 2011 (4 pages).
IPS Group Inc., Exhibit 2009, Somerville, MA, T&P Introduces User-Friendly Parking Meters & Service Upgrades with Electronic Meter Pilot, Apr. 19, 2011 (2 pages).
Fidelman, C., "Time's running out for parking meters at present locations: $270,000 cited as replacement cost. City employees who ticket motorists find electronic meters unsuitable," The Gazette, Final Edition, Montreal, Quebec, Canada, Nov. 12, 2002, p. A7 (2 pages).
Flatley, J., "In San Francisco, hackers park for free," posted Jul. 31, 2009, www.engadget.com (1 page).
Digital Payment Technologies, Response to Request for Proposal for Multi-Space Parking Meters, City of Fort Lauderdale, Jan. 13, 2010 (89 pages).
Howland, S., "How M2M Maximizes Denver's Revenue," FieldTechnologiesOnline.com, Oct. 2011, pp. 9-12 (4 pages).
MAX Dual Space Meter advertisement, Jun. 25, 2015 (2 pages).
IPS Multi Bay Parking Meter product description, http://www.design-industry.com.au/work/multi-bay-parking-meter/, Oct. 6, 2015 (6 pages).
Reino Parking Systems: On-Street Service Procedures, Jun. 29, 2004 (19 pages).
Reino Meter Advertisement, The power of a paystation, Parking Today, Aug. 2003 (1 page).
Duncan Solutions/Reino, RSV3 Digital Parking Meter, Jul. 5, 2011 (2 pages).
Reino, RSV3 brochure, Nov. 10, 2007 (4 pages).
Digital Payment Technologies, Sierra Wireless Case Study, Dec. 7, 2009 (2 pages).
IPS Single Bay Parking Meter product description, http://www.design-industry.com.au/work/ips-single-parking-meter/, Oct. 6, 2015 (6 pages).
StreetSmart Technology, LLC, "Technical Specifications and System Features for the StreetSmart Solution" Brochure, May 2011 (8 pages).
Digital Payment Technologies, Digital Payment Technologies and PXT Payments Forge Partnership to Bring Cities Smart Parking Meters and Merchant Loyalty Debit Cards, www.digitalpaytech.com, Apr. 27, 2010 (2 pages).
(Cell Net Data Systems) "First Wireless Monitoring of Parking Meters Results in Theft Arrests Using CellNet Data Systems Technology," PRNewswire, May 11, 1999 (3 pages).
Basu et al., "Networked Parking Spaces: Architecture and Appliances," MCL Technical Report No. 07-01-2002, Proc. IEEE Vehicular Transportation Conference, Vancouver, Canada, Sep. 2002 (10 pages).
Burden et al., "Near Field Communications (NFC) in Public Transport," Digital Identity Forum, 2006 (18 pages).
Exhibit 1013—Luke Parking Station ad (p. 28), Parking Today, vol. 10, No. 4, Apr. 2005 (64 pages)—Part 2.
Written Opinion issued in application No. PCT/IB2006/054574, dated Oct. 27, 2008.
*Duncan Parking Technologies, Inc.* v. *IPS Group Inc.*; Case IPR2016-01144; Patent Owner's Preliminary Response; dated Sep. 8, 2016 (58 pages).
*Duncan Parking Technologies, Inc.* v. *IPS Group Inc.*; Case IPR2016-01145; Patent Owner's Preliminary Response; dated Sep. 8, 2016 (52 pages).
Applicant's response to Office Action dated Sep. 25, 2015; U.S. Appl. No. 14/027,011.
Specification of Co-Pending U.S. Appl. No. 15/465,165, filed Mar. 21, 2017.
*Duncan Parking Technologies, Inc.* v. *IPS Group Inc*; Case IPR2016-00068; Decision Denying Institution of Inter Partes Review; dated Mar. 30, 2016 (13 pages).
*Duncan Parking Technologies, Inc.* v. *IPS Group Inc*; Case IPR2016-00070; Decision Denying Institution of Inter Partes Review; dated Apr. 1, 2016 (17 pages).
*Duncan Parking Technologies, Inc.* v. *IPS Group Inc*; Case IPR2016-00069; Decision Denying Institution of Inter Partes Review; dated Apr. 1, 2016 (13 pages).
*Duncan Parking Technologies, Inc.* v. *IPS Group Inc*; Case IPR2016-00067; Decision Granting Institution of Inter Partes Review; dated Mar. 30, 2016 (19 pages).
*Duncan Parking Technologies, Inc.* v. *IPS Group Inc.*; Case IPR2016-00067; Patent Owner's Response; dated Jul. 12, 2016 (32 pages).
*Duncan Parking Technologies, Inc.* v. *IPS Group Inc.*; Case IPR2016-00067; Preliminary Response; dated Jan. 29, 2016 (38 pages).
*Duncan Parking Technologies, Inc.* v. *IPS Group Inc.*; Case IPR2016-00067; Scheduling Order; dated Mar. 30, 2016 (9 pages).
*Duncan Parking Technologies, Inc.* v. *IPS Group Inc.*; Case IPR2016-00068; Patent Owner's Preliminary Response; dated Feb. 1, 2016 (48 pages).
*Duncan Parking Technologies, Inc.* v. *IPS Group Inc.*; Case IPR2016-00069; Patent Owner's Preliminary Response; dated Feb. 1, 2016 (48 pages).
*Duncan Parking Technologies, Inc.* v. *IPS Group Inc.*; Case IPR2016-00070; Preliminary Response; dated Feb. 1, 2016 (49 pages).

(56) References Cited

OTHER PUBLICATIONS

*Duncan Parking Technologies, Inc.* v. *IPS Group Inc.*; Case: To Be Assigned; U.S. Pat. No. 7,854,310; Petition for Inter Partes Review; dated Jun. 3, 2016 (70 pages).
International Preliminary Report on Patentability and Written Opinion issued on application No. PCT/IB2006/054574, dated Mar. 10, 2009.
International Preliminary Report on Patentability and Written Opinion issued in application No. PCT/US2010/047906, dated Mar. 6, 2012.
International Preliminary Report on Patentability and Written Opinion issued on application No. PCT/US2010/047907, dated Mar. 6, 2012.
*Duncan Parking Technologies, Inc.* v. *IPS Group Inc.*; Case IPR2016-00067; Patent Owner's Mandatory Notices; dated Nov. 6, 2015 (4 pages).
International Search Report issued on application No. PCT/CA2012/000191, dated Jun. 20, 2012.
International Search Report issued in application No. PCT/CA2007/001266, dated Apr. 21, 2008.
International Search Report issued in application No. PCT/CA2009/001657, dated Feb. 17, 2010.
International Search Report issued in application No. PCT/IB2006/054574, dated Oct. 27, 2008.
International Search Report issued in application No. PCT/US2010/047906, dated Mar. 30, 2011.
International Search Report issued in application No. PCT/US2010/047907, dated Apr. 26, 2011.
International Search Report issued in application No. PCT/US2012/048190, dated Jan. 22, 2013.
International Search Report issued in application No. PCT/US2013/021201, dated Apr. 30, 2013.
International Search Report issued in application No. PCT/US2012/037205, dated Oct. 4, 2012.
International Search Report issued in application No. PCT/US2012/037229, dated Jan. 28, 2013.
International Preliminary Report on Patentability and Written Opinion issued in application No. PCT/CA2012/000191, dated Sep. 3, 2013.
International Search Report and Written Opinion issued in application No. PCT/CA2016/050927, dated Nov. 25, 2016.
International Search Report and Written Opinion issued in application No. PCT/CA2016/050928, dated Oct. 12, 2016.
International Search Report issued in application No. PCT/CA2009/001058, dated Nov. 12, 2009.
Office Action issued in U.S. Appl. No. 29/477,329, dated May 22, 2015.
Office Action issued in U.S. Appl. No. 13/141,977, dated May 28, 2015.
Office Action issued in U.S. Appl. No. 13/468,881, dated Sep. 4, 2013.
Office Action issued in U.S. Appl. No. 14/811,641, dated Oct. 5, 2016.
Office Action issued in U.S. Appl. No. 14/979,104, dated May 5, 2016.
Office Action issued in U.S. Appl. No. 29/455,221, dated Jan. 13, 2014.
Office Action issued in U.S. Appl. No. 14/864,170, dated Apr. 19, 2017.
Office Action issued in U.S. Appl. No. 14/864,170, dated Oct. 7, 2016.
Office Action issued in U.S. Appl. No. 15/160,646, dated Apr. 14, 2017.
Office Action issued in U.S. Appl. No. 14/325,134, dated Jul. 21, 2015.
"Happy Anniversary, First Parking Meter Installed Jul. 16, 1935", TheExpiredMeter.com, Jul. 16, 2009, 10pgs.
"An Excerise in Changing the Business: Advertising Vending Machines", Jim Bonfield, www.adweek.com/agencyspy, Feb. 7, 2008, 4 pgs.
Duncan Solutions Brochure, "Single-Space Meters: Smart technology for true system integration and intelligent parking management", www.duncansolutions.com, Apr. 2006, 2 pgs.
"Technology breakthrough counters abuse of disabled parking", Scoop Media, Press Release: Car Parking Technology, New Zealand, Dec. 7, 2011, 1 pg.
Digital Payment Technologies, "Technologies Launches Luke II Multi-Space Parking Pay Station", Source: Marketwire News Releases, May 16, 2011 (3 pgs).
Transcript & Screenshot of Photo Violation Technologies Corp.—"PhotoViolationHandHeldUnit™", (7 pgs).
Transcript & Screenshot of Photo Violation Technologies Corp.—"The PBS Solution," (10 pgs).
Transcript & Screenshot of Photo Violation Technologies Corp.—"The PVM Solution," (17 pgs).
SEDADI_Card_and_Coin_Meter_Lease_City_of_LA_Nov. 29, 2010_4pgs.
The_Patented_PhotoViolationMeter_Solution_book_view_dated_Mar. 28, 2006_Part_1.
The_Patented_PhotoViolationMeter_Solution_book_view_dated_Mar. 28, 2006_Part_2.
The_Patented_PhotoViolationMeter_Solution_book_view_dated_Mar. 28, 2006_Part_3.
The_Patented_PhotoViolationMeter_Solution_book_view_dated_Mar. 28, 2006_Part_4.
You_Tube_Video_The PhotoViolationMeter_TM_Dec. 15, 2006_2_pgs.
Ebay_listing_Amano_Mcgann_MSM_Metric_Elite_LS_Solar_2022.
Nebraska_Innovation_Campus_Additional_way_to_pay_metered_street_parking_at_NIC_2022.
IPS_Group_Inc._Vehicle_ Detection_Sensors_6_pgs_webpage.
The_Klinghardt_Brain_Solutions_Protocol_Klinghardtinstitute.com_2_pgs.
Office_Action_of_U.S. Appl. No. 14/185,691_dated Jun. 17, 2015.
Office_Action_of_U.S. Appl. No. 14/185,691_dated Oct. 7, 2015.
Office_Action_of_U.S. Appl. No. 14/297,525_dated Jun. 19, 2015.
Office_Action_of_U.S. Appl. No. 14/698,806_dated May 13, 2016.
Office_Action_of_U.S. Appl. No. 14/811,641_dated May 2, 2016.
Office_Action_of_U.S. Appl. No. 14/811,641_dated Oct. 5, 2016.
Office_Action_of_U.S. Appl. No. 15/208,056_dated Jun. 9, 2017.
Office_Action_of_U.S. Appl. No. 15/208,056_dated Oct. 11, 2017.
Office_Action_of_U.S. Appl. No. 15/465,165_dated Oct. 12, 2017.
Office_Action_of_U.S. Appl. No. 15/633,290_dated Jan. 5, 2018.
Office_Action_of_U.S. Appl. No. 15/705,085_dated Dec. 15, 2017.
Office_Action_of_U.S. Appl. No. 15/826,584_dated Feb. 9, 2018.
Office_Action_of_U.S. Appl. No. 15/826,587_dated Mar. 8, 2018.
POM_APM_Photo_4Xfront.
POM_APM_Photo_10_03_11_1537.
POM_APM_Photo_10_03_11_1538.
POM_APM_Photo_10_03_11_1539.
POM_APM_Photo_apm2xcrop.
POM_APM_Photo_apm2xyellow.
POM_APM_Photo_DSC06379.
POM_APM_Photo_DSC06380.
POM_APM_Photo_DSC06381.
POM_APM_Photo_DSC06382.
POM_APM_Photo_DSC06383.
POM_APM_Photo_DSC06384.
POM_APM_Photo_DSC06385.
POM_APM_Photo_DSC06386.
POM_APM_Photo_DSC06387.
POM_APM_Photo_DSC06389.
POM_APM_Photo_DSC06390.
POM_APM_Photo_DSC06391.
POM_APM_Photo_DSC06393.
POM_APM_Photo_DSC06394.
POM_APM_Photo_DSC06395.
POM_APM_Photo_IMG_20120423_00336.
POM_APM_Photo_IMG_20120423_00337.
POM_APM_Photo_IMG_20120423_00338.
POM_APM_Photo_IMG_20120423_00339.
POM_APM_Photo_IMG_20120423_00340.

(56) References Cited

OTHER PUBLICATIONS

POM_APM_Photo_IMG_20120423_00341.
POM_APM_Photo_IMG_20120423_00342.
POM_APM_Photo_IMG_20120423_00344.
POM_APM_Photo_IMG_20120423_00346.
POM_APM_Photo_IMG_20120423_00348.
POM_APM_Photo_IMG_20120423_00350.
POM_APM_Photo_IMG_20120423_00351.
Co_pending_U.S. Appl. No. 15/826,587.
Co_pending_U.S. Appl. No. 15/826,584.
Co_pending_U.S. Appl. No. 15/826,583.
Co_pending_U.S. Appl. No. 15/474,773.
Office_Action_of_U.S. Appl. No. 14/027,011_dated Sep. 25, 2015.
Office_Action_of_U.S. Appl. No. 14/027,011_dated Apr. 21, 2016.
Office_Action_of_U.S. Appl. No. 13/928,058_dated Feb. 2, 2016.
Office_Action_of_U.S. Appl. No. 13/928,058_dated Dec. 3, 2015.
Office_Action_of_U.S. Appl. No. 14/027,011_dated Dec. 29, 2017.
Office Action issued in application No. CA 2770093, dated Jul. 5, 2012 (5 pages).
Office Action issued in U.S. Appl. No. 14/094,382, dated Mar. 24, 2015 (16 pages).
Interview Summary issued in U.S. Appl. No. 12/059,909, dated Jun. 29, 2011 (3 pages).
Interview Summary issued in U.S. Appl. No. 12/095,914, dated Apr. 11, 2011 (3 pages).
Interview Summary issued in U.S. Appl. No. 12/355,734, dated Apr. 6, 2012 (3 pages).
Notice of Allowance issued in U.S. Appl. No. 13/410,831, dated Oct. 11, 2013 (31 pages).
Notice of Allowance issued in U.S. Appl. No. 13/141,977, dated Jul. 29, 2016 (10 pages).
Notice of Allowance issued in U.S. Appl. No. 13/545,871, dated May 28, 2013 (9 pages).
Notice of Allowance issued in U.S. Appl. No. 13/546,918, dated Feb. 26, 2015 (10 pages).
Notice of Allowance issued in U.S. Appl. No. 13/546,918, dated Jun. 19, 2015 (19 pages).
Notice of Allowance issued in U.S. Appl. No. 13/546,918, dated Mar. 28, 2016 (28 pages).
Notice of Allowance issued in U.S. Appl. No. 13/546,918, dated Nov. 20, 2015 (9 pages).
Notice of Allowance issued in U.S. Appl. No. 14/864,170, dated Aug. 3, 2017 (25 pages).
Notice of Allowance issued in U.S. Appl. No. 14/325,134, dated Apr. 28, 2016 (7 pages).
Notice of Allowance issued in U.S. Appl. No. 14/325,134, dated Feb. 3, 2016 (7 pages).
Notice of Allowance issued in U.S. Appl. No. 15/220,228, dated Aug. 4, 2017 (20 pages).
Notice of Allowance issued in U.S. Appl. No. 29/477,339, dated Apr. 1, 2015 (3 pages).
Notice of Allowance issued in U.S. Appl. No. 29/477,402, dated Aug. 3, 2015 (3 pages).
Notice of Allowance issued in U.S. Appl. No. 29/477,405, dated Apr. 1, 2015 (10 pages).
Notice of Allowance issued in U.S. Appl. No. 13/545,871, dated Dec. 16, 2013 (10 pages).
Notice of Allowance issued in U.S. Appl. No. 29/433,549, dated Feb. 27, 2014 (59 pages).
Notice of Allowance issued in U.S. Appl. No. 29/489,572, dated Jun. 11, 2014 (9 pages).
Office Action issued in U.S. Appl. No. 08/418,018, dated Jan. 17, 1997 (11 pages).
Office Action issued in U.S. Appl. No. 08/418,018, dated Jul. 25, 1997 (6 pages).
Office Action issued in U.S. Appl. No. 08/959,109, dated Apr. 1, 2011 (7 pages).
Office Action issued in U.S. Appl. No. 08/959,109, dated Apr. 23, 2013 (5 pages).
Office Action issued in U.S. Appl. No. 08/959,109, dated Aug. 5, 2011 (7 pages).
Office Action issued in U.S. Appl. No. 08/959,109, dated Jan. 26, 1998 (9 pages).
Office Action issued in U.S. Appl. No. 08/959,109, dated May 25, 2012 (4 pages).
Office Action issued in U.S. Appl. No. 08/959,109, dated Nov. 21, 2012 (24 pages).
Office Action issued in U.S. Appl. No. 12/059,909, dated Jul. 27, 2011 (15 pages).
Office Action issued in U.S. Appl. No. 12/355,734, dated Apr. 6, 2012 (39 pages).
Office Action issued in U.S. Appl. No. 12/355,734, dated Dec. 7, 2011 (28 pages).
Office Action issued in U.S. Appl. No. 12/355,740, dated Dec. 20, 2011 (12 pages).
Office Action issued in U.S. Appl. No. 12/355,740, dated Sep. 15, 2011 (6 pages).
Office Action issued in U.S. Appl. No. 12/430,733, dated Sep. 14, 2011 (7 pages).
Office Action issued in U.S. Appl. No. 12/973,109, dated Apr. 30, 2012 (11 pages).
Office Action issued in U.S. Appl. No. 12/973,109, dated Dec. 13, 2011 (12 pages).
Office Action issued in U.S. Appl. No. 12/973,109, dated Jan. 28, 2013 (16 pages).
Office Action issued in U.S. Appl. No. 13/141,977, dated Aug. 1, 2013 (37 pages).
Office Action issued in U.S. Appl. No. 13/141,977, dated May 8, 2013 (29 pages).
Office Action issued in U.S. Appl. No. 13/141,977, dated Oct. 11, 2012 (29 pages).
Office Action issued in U.S. Appl. No. 13/141,983, dated Jun. 14, 2013 (27 pages).
Office Action issued in U.S. Appl. No. 13/141,983, dated Oct. 22, 2013 (47 pages).
Office Action issued in U.S. Appl. No. 13/410,831, dated Feb. 12, 2013 (11 pages).
Office Action issued in U.S. Appl. No. 13/410,831, dated Jul. 12, 2013 (6 pages).
Office Action issued in U.S. Appl. No. 13/410,831, dated May 28, 2013 (7 pages).
Office Action issued in U.S. Appl. No. 13/410,831, dated Nov. 6, 2012 (11 pages).
Office Action issued in U.S. Appl. No. 13/529,914, dated Jun. 21, 2013 (8 pages).
Office Action issued in U.S. Appl. No. 13/529,914, dated Sep. 27, 2013 (18 pages).
*Duncan Parking Technologies, Inc.* v. *IPS Group Inc.*; Case: To Be Assigned; Petition for Inter Partes Review; dated Jun. 3, 2016 (79 pages).
*Duncan Parking Technologies, Inc.* v. *IPS Group Inc.*; Case: IPR2016-00067; Petition for Inter Partes Review; dated Oct. 22, 2015 (66 pages).
*Duncan Parking Technologies, Inc.* v. *IPS Group Inc.*; Case: IPR2016-00068; Petition for Inter Partes Review; dated Oct. 22, 2015 (64 pages).
*Duncan Parking Technologies, Inc.* v. *IPS Group Inc.*; Case: IPR2016-00069; Petition for Inter Partes Review; dated Oct. 22, 2015 (67 pages).
*Duncan Parking Technologies, Inc.* v. *IPS Group Inc.*; Case: IPR2016-00070; Petition for Inter Partes Review; dated Oct. 22, 2015 (61 pages).
Request for Continued Examination, dated May 31, 2012 in U.S. Appl. No. 12/973,109 (3 pages).
Request for Continued Examination, dated Mar. 30, 2012 in U.S. Appl. No. 12/355,734 (3 pages).
Request for Continued Examination, dated Sep. 27, 2011 in U.S. Appl. No. 12/059,909 (1 page).
Supplementary European Search Report issued in application No. EP 07784953, dated Jul. 1, 2010 (1 page).
Duncan Solutions—Eagle CK brochure, 2013 (2 pages).

(56) References Cited

OTHER PUBLICATIONS

Written Opinion issued in application No. PCT/CA2012/000191, dated Jun. 20, 2012 (5 pages).
Duncan Solutions—Eagle 2100 brochure, 2013 (2 pages).
On-street Parking Automatic Toll Collector System Proposal for Jinan City dated May 2005 (41 pages).
DAT Self-service System Limited, User Manual for DAT Focus Meter, Version 1.0, Date: May 2005, pp. 1-39 (39 pages) (no translation).
Photo Violation Technologies—Revolutionizing the Industry by Perfecting How People Park, https://web.archive.org/web/20060813094459/http://photoviolation.com/, Aug. 13, 2006 (65 pages).
Photo Violation Technologies—Revolutionizing the Industry by Perfecting How People Park, https://web.archive.org/web/20060823100739/http://photoviolation.com/, Aug. 23, 2006 (68 pages).
Photo Violation Technologies—Revolutionizing the Industry by Perfecting How People Park, https://web.archive.org/web/20080222104246/http://photoviolation.com/, Feb. 22, 2008 (47 pages).
Photo Violation Technologies—Revolutionizing the Industry by Perfecting How People Park, https://web.archive.org/web/20060110041849/http://photoviolation.com/, Jan. 10, 2006 (57 pages).
Photo Violation Technologies—Revolutionizing the Industry by Perfecting How People Park, https://web.archive.org/web/20060715195511/http://photoviolation.com/, Jul. 15, 2006 (49 pages).
Photo Violation Technologies—Revolutionizing the Industry by Perfecting How People Park, https://web.archive.org/web/20070628195927/http://photoviolation.com/, Jun. 28, 2007 (49 pages).
Photo Violation Technologies Corp., https://web.archive.org/web/20040401225217/http://photoviolation.com/, Apr. 1, 2004 (50 pages).
Photo Violation Technologies Corp., https://web.archive.org/web/20131118213440/http://photoviolation.com/, Nov. 18, 2013 (8 pages).
YouTube video, "The PhotoViolationMeter TM" https://www.youtube.com/watch?v=YEFuebnwn_Y, Dec. 15, 2006 (2 pages).
Bridge IR Goup, Inc., Changing the Way the World Pays for On-Street Parking, Research Report, United States—Technology Processing Systems/Products, Dec. 6, 2006 (23 pages).
Barefoot, D., "There'll be lies, there'll be tears, a jury of your peers," DarrenBarefoot.com: Dec. 2005, pp. 8-9 (39 pages).
Photo Violation Technologies Corp.—Products, Oct. 2, 2015 (3 pages).
Photo Violation Technologies Corp. Press Releases, Jul. 18, 2005-Jan. 17, 2006 (9 pages).
The Patented PhotoViolationMeter Solution book view, dated Mar. 28, 2006 (12 pages).
PhotoViolationMeter pamphlet, dated Jan. 18, 2006 (2 pages).
The PhotoViolationMeter Case Study, Photo Violation Technologies Corp., Dec. 15, 2015 (4 pages).
Transcript & Screenshots of https://web.archive.org/web/20080222104246/http://www.photoviolation.com/videos/HHU.wmv, Photo Violation Technologies Corp.—"PhotoViolationHandHeldUnitTM," dated prior to Jun. 15, 2015 (7 pages).
Transcript & Screenshots of https://web.archive.org/web/20080222104246/http://www.photoviolation.com/videos/PBS.wmv, Photo Violation Technologies Corp.—"The PBS Solution," dated prior to Jun. 15, 2015 (10 pages).
Transcript & Screenshots of https://web.archive.org/web/20080222104246/http://www.photoviolation.com/videos/PVM.wmv, Photo Violation Technologies Corp.—"The PVM Solution," dated prior to Jun. 15, 2015 (17 pages).
Transcript & Screenshots of https://web.archive.org/web/20080222104246/http://www.photoviolation.com/videos/PCM.wmv, Photo Violation Technologies Corp.—"ParkCardMeter TM System," dated prior to Jun. 15, 2015 (6 pages).
Byrd, Dennis, "City officials plug solar-powered parking meters, Electronic eye ends free parking," Lawrence Journal World, Apr. 30, 1989, p. 11C (1 Page).
Anonymous, "The Originators of Metered Parking, Series II, APM-E Mechanism, Service Manual," POM Incorporated, May 23, 2006 revision (22 pages).
POM APM Solar Powered Meter advertisements, dated Apr. 28, 2010 (5 pages).
CWT MAX Single/Dual Space Meter, Technical Data, May 18, 2016 (4 pages).
Digital Payment Technologies—LUKE brochure, dated prior to Jun. 15, 2015 (4 pages).
Digital Payment Technologies, Request for Proposal #B09030—Parking Pay Stations, City of Dover, New Hampshire, Oct. 22, 2008 (part 1; 110 pages).
Digital Payment Technologies, Request for Proposal #B09030—Parking Pay Stations, City of Dover, New Hampshire, Oct. 22, 2008 (part 2; 160 pages).
Digital Payment Technologies, Technologies Launches Luke II Multi-Space Parking Pay Station, May 16, 2011 (3 pages).
Digital Payment Technologies—Luke website, https://web.archive.org/web/20061025094839/http:www.digitalpaytech.com/luke.html, Oct. 25, 2006 (5 pages).
No_change_for_car_park_charge_Just_RingGo_Jul. 6, 2017.
Parking_Pay_Stations_Cocoa_Beach_FL_Official_Website.
ALIBABA_com_Ticket_Dispenser_Parking_Management_System_Auto_Pay_Station_Product_12_pgs.pdf.
IPS_Group_com_M5_Single_Space_Smart_Meter_2022_2_pgs.pdf.
IPS_Group_com_Vehicle_Detection_Stereoscopic_Smart_Sensors_2022_2_pgs.pdf.
Made_In_China_com_Pay_Station_for_Payment_Parking_Meter_with_Solar_3_pgs.
PAR_KUT_com_Pay_Station_Shelters_3_pgs.
GARRA_et_al_A_Privacy_Preserving_Pay_by_Phone_Parking_System_2017_10pgs.
R_Maitra_Payphones_Parking_Meters_Vending_Machines_Feb. 2001.

\* cited by examiner

LIGHTWEIGHT VANDAL RESISTANT PARKING METER

TECHNICAL FIELD

The current application relates to parking meters and in particular to lightweight and vandal resistant parking meters.

BACKGROUND

Traditional single space parking meters comprise a number of components. The metering functionality is typically provided by a meter mechanism that is received within a protective lower housing that is permanently fixed in location. A parking meter housing may be secured to the lower housing to retain the meter mechanism within the protective housing. These protective housing components are traditionally made either of a lighter weight cast metal such as Zamak which is an alloy made of zinc, aluminum, magnesium and copper, or of a much heavier cast ductile iron. Impact resistant plastic has previously been used as a housing material; however, this was typically limited to, for example, a polycarbonate resin. A specific example would be clear plastic windows made of a polycarbonate resin that covers and protects a parking meter display. A well-known clear polycarbonate brand in this regard is Lexan™. However, a Lexan window of a parking meter would not have been the material substantially or significantly forming the protective housing of a parking meter. As noted above, housing components have traditionally been made of metal.

In the past, as parking costs and, correspondingly, primarily coins being deposited at parking meters have increased, vandalism and other attacks on parking meters have increased, and the use of metal housings has become standard for unattended (e.g., on street) locations in order to withstand and deter vandalism, including repeated attacks. In this regard, because of security concerns, plastic has historically been seen to be inferior to metal for the purpose of a protective housing of a parking meter. Further, plastic has been seen to be prone to undesirable UV degradation.

As a result, at present, those skilled in the art generally prefer metallic parking meter housings given such housings are widely accepted and in use based on a strong track record for security and vandal-resistance, given use of plastics in parking meters has been overwhelmingly limited to internal molded plastic components and limited external components such as clear plastics for windows that cover a user display or solar panel, or plastics used to protect radiating antennas, and/or given the disadvantages of traditional polycarbonate or other traditional plastic material that would or may be felt if such material were used in or for a parking meter housing.

More recently, the use of cash as a form of payment for parking meters has been augmented by a number of alternative forms or methods of non-cash payment, which may include stored value smart cards, pay-by-cell mobile phone applications, loyalty cards, contactless credit cards, NFC-enabled mobile phones, magnetic stripe-based debit or credit cards, and EMV chip credit cards. With non-cash payment alternatives becoming increasingly popular, fewer and fewer users are carrying cash on their person or in their vehicles. It is not uncommon for the total revenue amounts and number of transactions based on these alternative non-cash payment methods to quickly surpass cash deposit amounts and cash transaction counts when such alternatives to cash payments are available.

Although traditional metal parking meter housings provide adequate protection for parking meters, it would be beneficial to have additional or alternative options for parking meter housings capable of withstanding or resisting vandalism attacks.

BRIEF DESCRIPTION OF THE DRAWINGS

Embodiments are described herein with reference to the appended drawings, in which.

DETAILED DESCRIPTION

Figure 1:
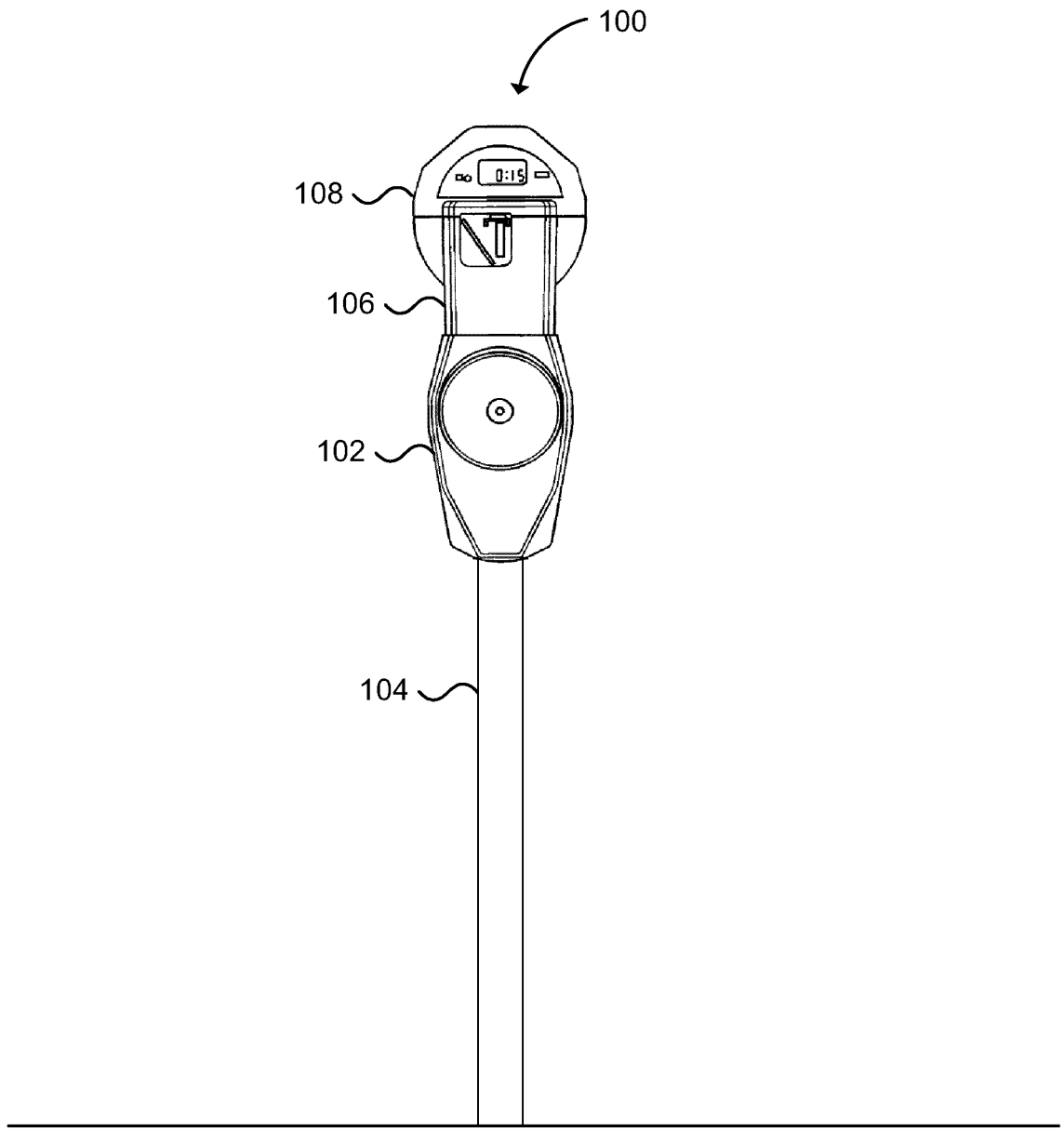
FIG. 1 depicts a single space parking meter.

In accordance with the present disclosure there is provided a parking meter comprising: parking meter components for metering use of one or more parking spots; and, a housing formed at least significantly of a material comprising one of: a polycarbonate copolymer or polycarbonate blended resin; a nylon-based copolymer; or, a nylon-based polymer that includes long glass fiber or Kevlar fiber; wherein the housing encloses the parking meter components to provide protection for the parking meter components against an external environment and vandalism attacks.

In a further embodiment of the parking meter, the housing comprises a plurality of housing components secured together, each of the housing components formed substantially of the housing material.

In a further embodiment of the parking meter, the housing components comprise a front housing component and a rear housing component, wherein the front and rear housing components are securable together.

In a further embodiment of the parking meter, the housing components comprise an upper housing component and a lower housing component, wherein the upper and lower housing components are securable together.

In a further embodiment of the parking meter, wherein the housing further comprises one or more reinforcing members secured to or that are part of the housing.

In a further embodiment of the parking meter, the one or more reinforcing members are secured to an interior of the housing.

In a further embodiment of the parking meter, the one or more reinforcing members are secured to the housing by one or more mechanical fasteners.

In a further embodiment of the parking meter, the one or more reinforcing members are secured to the housing through one or more formed structures of the housing mechanically retaining the one or more reinforcing members.

In a further embodiment of the parking meter, the one or more reinforcing members are secured to the housing through one or more of a friction fit, interference fit or snap-in fit.

In a further embodiment of the parking meter, the one or more reinforcing members are secured to the housing through an over-molding process.

In a further embodiment of the parking meter, the one or more reinforcing members are formed from a material comprising at least one of: a metal or metal alloy; and, a ceramic.

In a further embodiment of the parking meter, the one or more reinforcing members comprise one or more metal rods to provide protection against cutting type vandalism attacks.

In a further embodiment of the parking meter, the one or more reinforcing members reinforce one or more connection points of the housing.

In a further embodiment of the parking meter, the one or more reinforcing members comprise one or more metal structures at least partially surrounding one or more openings within the housing.

In a further embodiment of the parking meter, the one or more metal rods are secured to the housing through retaining structures or vertical channels of the housing.

In a further embodiment of the parking meter, the retaining structures or vertical channels extend vertically along a substantial portion of an interior surface area of the housing.

In a further embodiment of the parking meter, the one or more reinforcing members comprise at least one of: a wedge; a truss; a rib; a cross-brace; and, a stringer.

In a further embodiment of the parking meter, the housing material includes a mixture of small glass or ceramic beads or microspheres.

In a further embodiment of the parking meter, the housing material comprises one of a polycarbonate copolymer, a polycarbonate blended resin, or a nylon-based copolymer, and the housing material includes long glass fiber (LGF) or Kevlar fiber.

In a further embodiment of the parking meter, the housing material provides low attenuation of RF signals.

In a further embodiment of the parking meter, the parking meter components comprise one or more RF transmitters.

In a further embodiment of the parking meter, the one or more RF transmitters comprise one or more of: a near-field communication (NFC) reader; a Bluetooth radio; a ZigBee radio; a WiFi radio; and a cellular radio.

In a further embodiment of the parking meter, the one or more RF transmitters comprises a WiFi radio, and the WiFi radio uses one or more service flow channels associated with one or more WiFi routers located within wireless communication range of the parking meter.

In a further embodiment of the parking meter, the housing comprises one or more openings through which one or more buttons or interaction control components protrude, extend or are exposed.

In a further embodiment of the parking meter, the housing comprises an opening through which a display is visible.

In a further embodiment of the parking meter, the housing comprises a transparent portion through which a display is visible.

In a further embodiment of the parking meter, the housing comprises an opening through which a solar panel is exposed, or a recess in which a solar panel is received.

In a further embodiment of the parking meter, the parking meter comprises a transparent material through which a solar panel is exposed.

In a further embodiment of the parking meter, the parking meter comprises a contactless payment reader that is mounted: behind a surface of the housing; or, on top of a surface of the housing and is covered by a protective covering.

In a further embodiment of the parking meter, the parking meter comprises two or more flip-dots, and the housing comprises an opening or window through which the flip-dots are visible.

In a further embodiment of the parking meter, the parking meter further comprises input controls, and wherein the display and input controls are provided by a touch screen display.

In a further embodiment of the parking meter, the parking meter comprises a touch or proximity sensor located on the housing for detecting an initial user proximity or interaction with the parking meter.

In a further embodiment of the parking meter, the parking meter is a single space parking meter.

In a further embodiment of the parking meter, the housing comprises a first portion secured to a stationary structure and a second portion that is lockably secured to the first portion, at least some of the parking meter components secured to the second portion of the housing.

In a further embodiment of the parking meter, the housing is generally cylindrical in shape.

In a further embodiment of the parking meter, the second portion of the housing slides vertically relative to the first portion of the housing into a secured position.

In a further embodiment of the parking meter, the first and second portions of the housing comprise one or more rails or rail guides, respectively, and at least one of the one or more rails or rail guides comprises one or more of: a spring-catch assembly; and, a removable or detachable rail or rail guide for allowing release, separation or detachment of the second portion relative to the first portion.

In a further embodiment of the parking meter, the parking meter further comprises a hinge joining the first and second portions and which allows rotation of the second portion relative to the first portion.

In a further embodiment of the parking meter, the parking meter is a multi-space parking meter.

In a further embodiment of the parking meter, the housing material comprises a polycarbonate copolymer or polycarbonate blended resin.

In a further embodiment of the parking meter, the housing material comprises a nylon-based copolymer.

In a further embodiment of the parking meter, the housing material comprises a nylon-based polymer that includes long glass fiber or Kevlar fiber.

In accordance with the present disclosure there is provided a parking meter comprising: parking meter components for metering use of one or more parking spots; a contactless payment reader; and, a housing formed at least significantly of a material comprising one of: a polycarbonate copolymer or polycarbonate blended resin; a nylon-based copolymer; or, a nylon-based polymer that includes long glass fiber or Kevlar fiber; wherein the housing encloses the parking meter components to provide protection for the parking meter components against an external environment and vandalism attacks.

In a further embodiment of the parking meter, the contactless payment reader is mounted: behind a surface of the housing; or, on top of a surface of the housing and is covered by a protective covering.

In accordance with the present disclosure there is provided a parking meter comprising parking meter components for metering use of one or more parking spots; a low-power short-range radio frequency (RF) radio for receiving payment information from a mobile device or vehicle; and a housing formed at least significantly of a material comprising one of: a polycarbonate copolymer or polycarbonate blended resin; a nylon-based copolymer; or a nylon-based polymer that includes long glass fiber or Kevlar fiber; wherein the housing encloses the parking meter components to provide protection for the parking meter components against an external environment and vandalism attacks.

In a further embodiment of the parking meter, the low-power short-range RF radio comprises a Bluetooth radio.

In a further embodiment of the parking meter, the Bluetooth radio is paired to the mobile device or vehicle prior to receiving the payment information.

In a further embodiment of the parking meter, the received parking information comprises one or more of: a payment amount; a park time; an expiry time; and payment authorization details.

In a further embodiment of the parking meter, the RF radio is further for communicating meter diagnostics information.

In a further embodiment of the parking meter, the RF radio is further for communicating collected meter data.

In a further embodiment of the parking meter, the RF radio is further for configuring the parking meter.

In a further embodiment of the parking meter, the low-power short-range RF radio is at least partially powered by an alternative energy harvesting mechanism or device that harvests energy from one or more of: ambient RF signals; variations or differentials in nearby materials temperatures; and, street vibrations.

Plastic components have been used with success in single space parking meters for many years. These include some components attached to the housings and exposed to the external elements. Specific component examples include clear plastics such as Lexan for the domes or windows that cover a user display, LED indicators, RF antennas, or a solar panel. Additionally, internally to the parking meter, components made of molded plastic are generally widely accepted and used. Specific component examples may include coin guides, and coin reader covers and chute. However, until now the exterior housings that protect the meter mechanisms have traditionally been made of cast metal alloy or cast ductile iron. The heavy duty appearance of these cast metal housings discouraged vandalism attacks and were sufficiently strong to withstand repeated vandalism attempts. As described further below, the heavy and expensive to manufacture metal housings can be replaced with a lightweight and vandal resistant housing made primarily of a polycarbonate copolymer material such as a polycarbonate copolymer resin that has lower corresponding materials and manufacturing costs. In this regard, a majority, a substantial majority or virtually all of the external parking meter housing may be made of a polycarbonate copolymer material.

A lightweight housing, including preferably a plastic housing such as a polycarbonate copolymer resin housing, wherein the housing is formed substantially, or at least significantly, of the polycarbonate copolymer, may be easier and cheaper to transport and install, and may require less packaging, as compared to heavier metal housings. A housing formed at least "significantly" of the polycarbonate copolymer is one where at least one third of the housing is formed of the polycarbonate copolymer. A housing formed "substantially" of the polycarbonate copolymer is one where at least three quarters of the housing is formed of the polycarbonate copolymer. In addition, the housing may comprise a plurality of housing components secured together. Individually, each of the housing components may be formed substantially of the polycarbonate copolymer. Alternatively, a subset of the housing components may be formed substantially of the polycarbonate copolymer while the remainder of the housing components are not formed substantially of the polycarbonate copolymer, but the housing components taken together collectively provide for a complete housing that is formed significantly of the polycarbonate copolymer.

A plastic housing, including a polycarbonate copolymer resin housing, may also be cheaper to manufacture than a metal housing, and, due to the lighter weight, cheaper to transport and easier for service staff to handle. Additionally, metal housings may be more inconvenient and/or costly than plastic housings, including a polycarbonate copolymer resin housing, in relation to maintenance. In particular, metal housings may require regular or periodic paint in order to avoid rust buildup or corrosion of housings. Sometimes, due to rust or corrosion, a metal housing may need to be replaced. Furthermore, rusted or corroded metal housings may be unsightly for the general public, thus reducing public confidence, and may detract from the visibility of newer or retrofit features otherwise included in the parking meter. In contrast, plastic housings, including a polycarbonate copolymer resin housing, are corrosion-resistant.

In addition to the maintenance issues discussed above, metal housings, such as traditional sand cast steel housings, can produce imprecise joints and/or surfaces, which typically require secondary machining operations to allow any mating parts to fit properly. While Zamak alloy castings have a relatively more precise fit as compared to sand cast housings, both Zamak alloy castings and sand cast housings still require treatment and painting before being exposed to the outside environment. Secondary operations may also be required to remove metal 'flash' or burrs that might form at joints where mold sections are connected during the molding operation. In contrast, molded plastic-based materials typically provide for even more precise tolerances and dimensional stability that are better than those of traditional cast metal parts. This ultimately may produce smaller gaps at joints, and a better and more secure fit. Further, plastic-based materials, including polycarbonate copolymer resins, may not require the above-described secondary operations, such as painting or blasting. In this regard, plastics can be produced in different colours and may not require the painting typically required for metal parts.

Metal components may break or deform under sudden and focused impact. In contrast, polycarbonate copolymer resin-based plastics may temporarily bend or deform under impact and subsequently may return to their original shape in a manner that is similar to how a plastic car panel or bumper may do after an impact. Even at extreme cold temperatures, a polycarbonate copolymer resin will resist shattering or breaking. Unlike traditional (non-copolymer) polycarbonate, which may require considerable cross-ribbing or bracing material in order to achieve acceptable impact testing results or standards, a polycarbonate copolymer resin may not require as much reinforcing material, or any reinforcing material at all, in order to achieve desired results or standards (depending on the results or standards). Given its favorable strength and impact characteristics, and the decreasing prevalence of actual cash stored in parking meters (due to the increased use of non-cash payment means such as credit cards), a plastic housing such as a polycarbonate copolymer resin-based housing is a suitable alternative material to more traditional metals.

Production of more complex shapes may more easily be done with plastic than metal due to injection molds, which allow for under-cuts, threads, ports and tight tolerances. This allows for a net shape or near net shape to be produced relative to the finish level specifications, which reduces the need for any surface finishing (i.e., a part may be produced near finish or fully finished without extra production steps, thus potentially saving costs).

Plastic housings and parts, including polycarbonate copolymer resins, may be advantageous in comparison to metal housings and parts for additional reasons, such as with respect to the following: by using lower temperatures, plastic materials may be highly repeatable in processing, which may ultimately result in less scrap materials or waste; and the life of a plastics production tool may be as much as six times longer than the life of an equivalent tool used to produce a metal part, and may require less repair.

Although the following description refers to single space parking meters, it is possible for the parking meters to provide metering functionality for two or more spaces. It will be appreciated that a single space parking meter refers to a style of parking meters that historically metered only a single parking space. Single space parking meters are typically located along a street and affixed to posts adjacent to the parking spaces being metered. As an example of metering multiple parking spots, a single space parking meter located on a post in between two parking spots may be configured to provide metering of the parking space located to the left of the parking meter as well as the parking space located to the right of the parking meter. Single space parking meters are typically differentiated from multi-space meters, such as pay-and-display meters, pay-by-space meters and pay-by-plate meters, by their size. Multi space meters, which are typically provided in larger cabinets, are typically located one or a few per block, or per parking area such as a parking lot. The larger cabinets of multi space meters may allow for additional peripheral equipment such as thermal type receipt or ticket printers, paper currency readers, full alpha-numeric keypads, higher capacity cash cans, and correspondingly larger batteries and solar panels. In contrast, multiple single space meters, even when metering multiple parking spots, are typically located along a block face, or within a parking area such as a small parking lot. The single space meters are typically much smaller in size than multi-space meters.

FIG. 1 depicts a typical single space parking meter 100. The parking meter 100 comprises a coin vault housing 102 secured to a pole 104 or other structure at a parking meter location, such as an on-street location. The coin vault housing 102 holds a coin vault that holds coins used for payment. A lower housing 106 may be secured to the coin vault housing 102. The lower housing 106 receives a parking meter mechanism that provides metering functionality. An upper housing 108 may be secured to the lower housing 106 in order secure the parking meter mechanism within the lower housing 106. The lower housing 106 may be permanently or semi-permanently secured to the coin vault housing 102. The meter mechanism may be replaced with a retrofit parking meter mechanism that is received within the same lower housing. The retrofit parking meter mechanism may be secured to the lower housing 106 using the same upper housing 108, or may be secured using a different upper housing. The upper housing of the retrofit parking meter may be made from a polycarbonate copolymer resin providing strength and protection against vandalism as well as the environment. The polycarbonate copolymer resin housing may be a separate component or may be incorporated into the retrofit parking meter mechanism itself. As described in further detail below, the polycarbonate copolymer resin housing of the parking meter may include additional reinforcing components, or structural ribbing detail molded into the plastic material, in order to provide additional mechanical strength.

Figure 2:
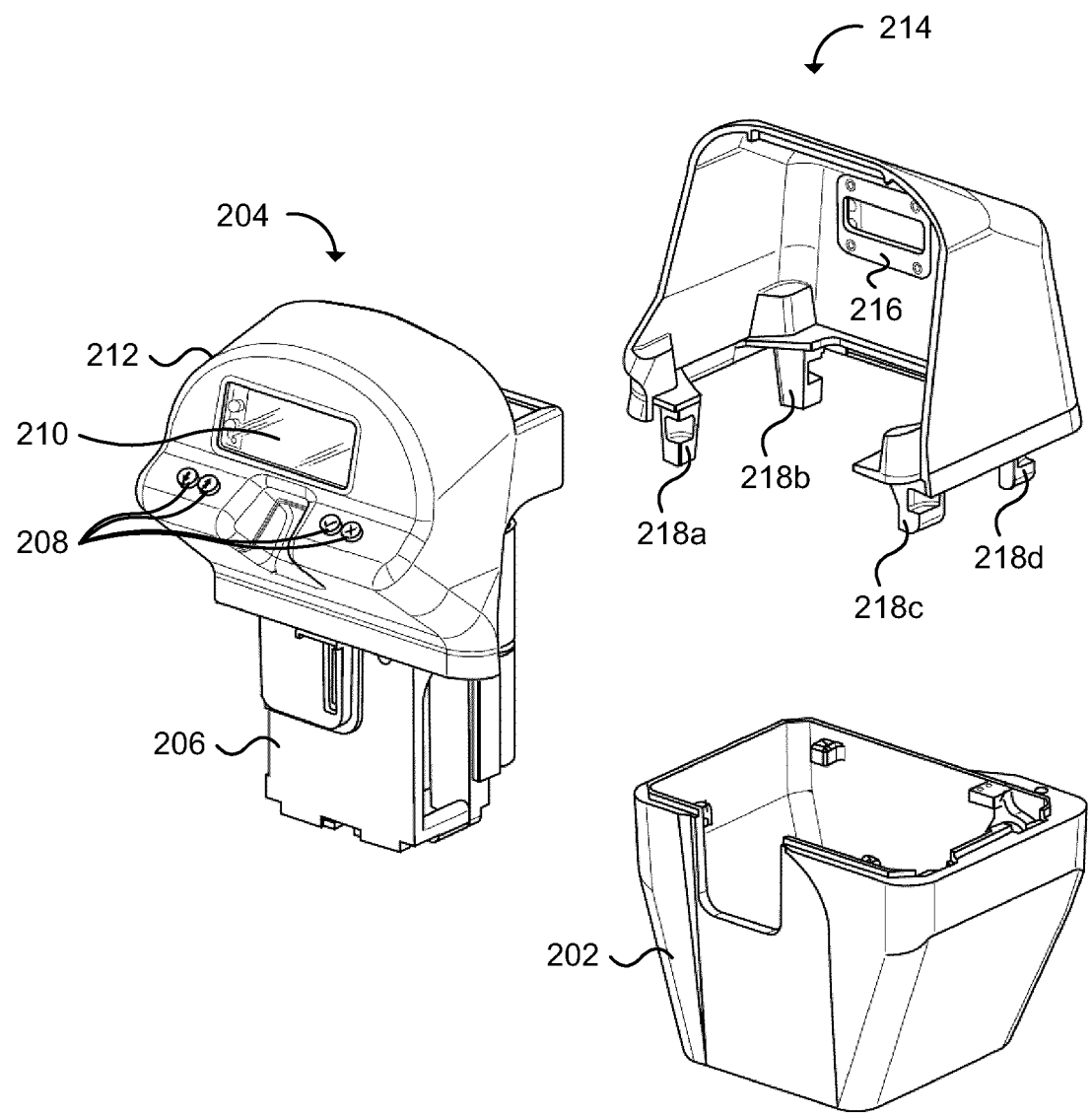
FIG. 2 depicts a further single space parking meter.

FIG. 2 depicts a disassembled view of a further single space parking meter 200. The parking meter 200 comprises a lower housing 202 that may be permanently, or semi-permanently, installed at a parking meter location. A removable parking meter mechanism 204 may be partially received within the lower housing 202. The removable parking meter mechanism 204 may have an internal frame 206 to which parking meter components are attached. The parking meter components may include, for example, payment mechanisms, including coin chutes, card readers, and contactless card readers. The parking meter components may also include buttons 208 or other interaction control components for controlling operation of the parking meter, as well as a display 210 for displaying parking related information such as an amount of time purchased. Further, the components may include one or more radio frequency (RF) antennas for transmitting and/or receiving RF signals. In this regard, such RF transmitters may comprise one or more of a near-field communication (NFC) reader, a Bluetooth radio, a ZigBee® radio, a WiFi® radio, and a cellular radio.

With respect to the WiFi radio, it may use a private communication channel, or any public or otherwise available hotspot for carrying out communications. For example, an owner or operator of one or more parking meters may engage or contract with an Internet service provider (ISP) to provide for Internet access over WiFi for the parking meter (s). In one example, the arrangement with the ISP may involve the use of additional or secondary channels, such as secondary ISDN channels that may be referred to as "service flow" channels, associated with one or more WiFi routers located within wireless communication range of the parking meter(s). Typically, the WiFi routers in this example are located at an ISP's customer premises, and are such that they have the ability to concurrently route or support one or two additional or secondary non-overlapping and non-interfering ISDN service flow channel(s). The service flow channel(s) is in addition to the primary ISDN channel used by the customer, and all channels use the same wire or other physical connection to the ISP's network equipment located outside the customer premises. The result is that the router acts as a secured WiFi hotspot for one or both of the two additional channels, and, in parallel, routes any associated data or traffic separately and independently from the data and traffic of the primary ISP customer. Use of one or more of the additional service flow channels by a parking meter system operator establishes a connection between a parking meter and the Internet so that regular two-way flow of data between the meter and a backend meter management system is possible.

The foregoing describes one example of how a WiFi radio and communication system may be used; other approaches would be understood to be possible. Use of WiFi as described or otherwise for parking meter communications may be advantageous, as purchasing or inclusion of additional hardware by parking meter vendors, installers or operators may be unnecessary. This is in contrast to cellular communications and other alternative ISM band solutions such as ZigBee where additional hardware may be required. In this regard, and by way of example, a transceiver or repeater with antenna may need to be located relatively close to a parking meter, and may need to be mounted to a pole, building or other structure, which may further complicate installation and/or implementation of a parking meter system. In addition, use of WiFi as described or otherwise may be advantageous in that regulatory requirements (e.g., FCC requirements) may be less restrictive or onerous, the WiFi radios may be less expensive than other radios, and the data transmission costs associated with cellular communications may be reduced or eliminated as a result of a greater amount of data being transmitted over WiFi as opposed to cellular. Further, with respect to the example approach described above, reliability of transmissions may be improved because of the use of a managed, secured and/or restricted Internet access point (as compared to a public WiFi hotspot, which may be less reliable and/or provide poor performance due to heavy use or data loading).

Since the housing is made from a polycarbonate copolymer resin that can have low RF attenuation, the placement of the RF antennas are not as particularly restricted as is the case for more traditional metal housings. The removable parking meter mechanism 204 includes a front housing 212. The front housing 212 is made of a polycarbonate copolymer resin, and includes one or more cutouts or openings through which interface buttons 208 extend, protrude or are exposed, and through which the display is visible. The display, when visible through a cutout in the polycarbonate copolymer resin housing, may be covered by a clear polycarbonate material such as Lexan. In the alternative, rather than a physical opening or cutout in the polycarbonate copolymer resin, the display opening may be provided by a transparent portion in the housing that may be formed from the transparent polycarbonate copolymer resin of the housing 212.

Physical openings in the polycarbonate copolymer front housing 212 may present a weak point in the housing 212 and as such the housing 212 may include reinforcing members to provide it with additional strength. For example, a reinforcing member may comprise a metal frame or structure surrounding the opening and be located on an interior of the front housing 212. The reinforcing member surrounding the display opening may provide additional strength to prevent a vandal from prying at the opening, or otherwise attacking the integrity of the housing through the opening. As depicted, when the removable parking meter mechanism is received within the lower housing, a rear housing 214 may be slid over the removable parking meter mechanism 204 and secured to the lower housing. When secured in place, the front housing 212 and rear cover 214 provide a continuous housing providing protection against the environment and vandal attacks. In addition to providing reinforcing members at, or around, openings, metal reinforcing members may also be provided for structurally weaker areas of the housing such as at sharp corners. In addition or in the alternative to metal reinforcing members, the polycarbonate copolymer component may include, as part of its design and molded shape, wedges, trusses, ribbing, cross bracing, stringers, and the like that are more precisely and strategically shaped and placed, and are designed into the injection molded component for reinforcement. This may further enhance the structural strength and integrity of the component without adding substantially more or additional plastic material. As a result, the polycarbonate copolymer resin-based component that is produced may provide further improved strength based on the combination of above-described mechanical design features together with the inherent strength and ductility characteristics of the polycarbonate copolymer resin materials.

The rear cover 214 may be made from the same polycarbonate copolymer resin used to make the front cover 212. As described above, the polycarbonate copolymer housing may include at openings reinforcing components to provide extra strength. As depicted, the rear cover 214 includes an opening with reinforcing member 216 surrounding the opening. Further, reinforcing members or components may be included to provide extra strength to connection points. For example, the rear cover 214 may include four contact points 218a-218d used to secure the rear cover 214 to the lower housing 202. In order to provide additional strength, the contact points 218a-218d may be reinforced with metal. The reinforcing members may be formed within, or secured to, the polycarbonate copolymer, for example by an overmolding process in which the polycarbonate copolymer resin is formed over the metal reinforcing contact points. Alternatively, the reinforcing members may be secured to the polycarbonate copolymer housing in various ways such as by a mechanical fastener, such as screws, through formed structures that co-operate with the reinforcing member, through a friction fit, interference fit or snap-in fit and/or through the use of adhesives.

As described above, the single space parking meter 200 comprises a housing made from a polycarbonate copolymer resin that may be reinforced at one or more points with metal strengthening components. As depicted, the housing may be made from two or more housing components that connect together to provide a single housing that encloses the parking meter components and protects them from the environment and from vandal attacks. As depicted, the housing may secure the removable parking meter mechanism to the lower housing 202. As depicted in further embodiments below, it is possible for removable parking meter mechanisms to be directly secured to the coin vault rather than to a lower housing.

Figure 3:
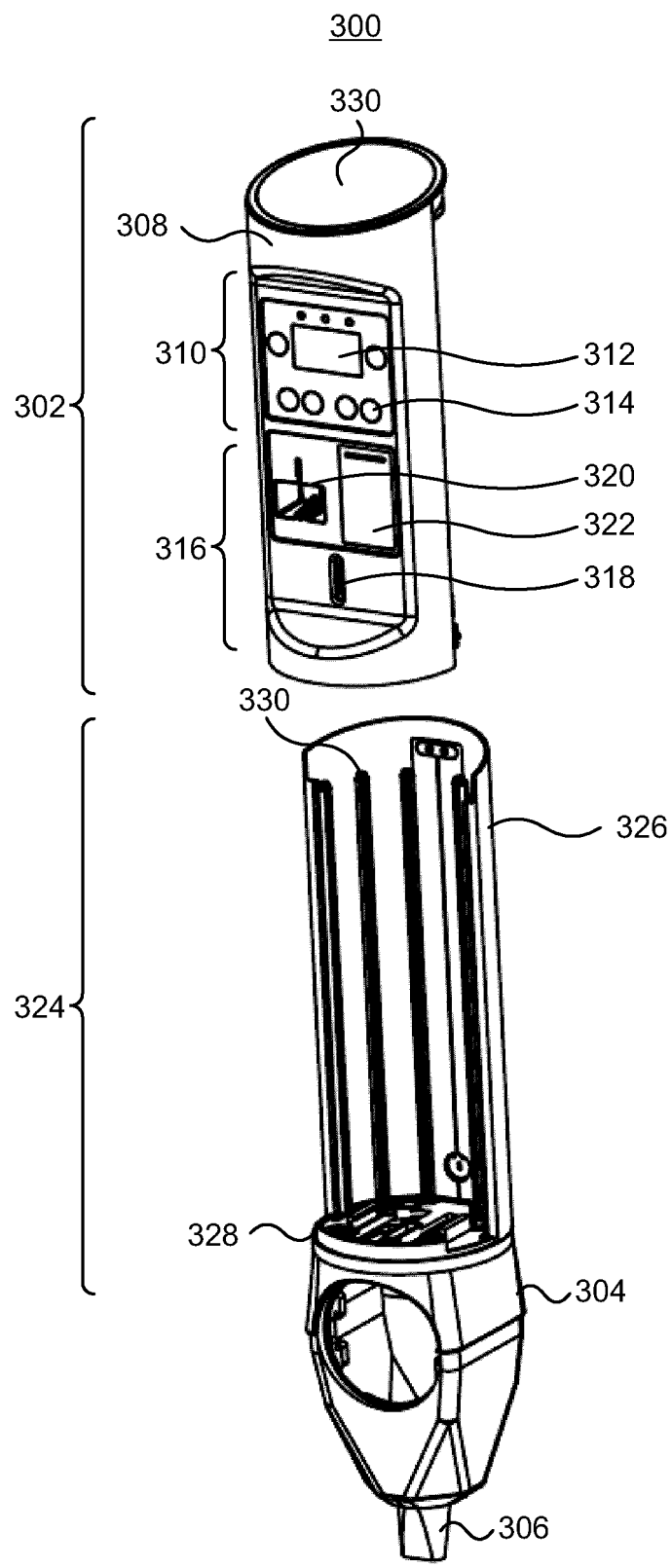
FIG. 3 depicts a further single space parking meter.

FIG. 3 depicts a further single space parking meter. The parking meter 300 comprises a removable parking meter assembly 302 that is connected to a coin vault assembly 304, rather than being received within a traditional single space parking meter lower housing. The coin vault housing provides an opening, secured by a door or covering (not shown), through which a coin vault or canister can be inserted and removed. The coin vault assembly may include or be attached to a lower protrusion 306 for use in directly securing the coin vault assembly, and indirectly the attached parking meter assembly, to a post or other structure.

The parking meter assembly 302 comprises a front covering 308 formed from a polycarbonate copolymer resin. The parking meter assembly 302 further includes a number of parking meter components for providing a functioning parking meter. Particular components included in a parking meter may vary depending upon the manufacturer, or the specific requirements of a city, municipality or other potential purchaser of parking meters.

The parking meter assembly 302 may be secured to a rear housing assembly 324 that in turn is secured to the coin vault housing 304. As depicted, the rear housing assembly 324 comprises a rear cover 326 that is affixed to a lower plate 328. The lower plate 328 may be permanently, or semi-permanently, attached to the coin vault housing. The rear cover 326 may be secured to the lower plate through one or more connecting bolts or rods 330 within corresponding retaining structures or vertical channels in the rear cover 326 that may be screwed into the lower plate 328. The bolts or rods 330 are of a hardened material such as metal, and may be threaded. The rear cover 326 may be formed from the polycarbonate copolymer resin used in forming the front cover 308.

In addition to securing the rear cover 326 to the lower plate 328, the connecting rods 330 may act as reinforcing members that provide additional strength and protection against vandalism. For example, the rods 330, which may be made of metal, may extend vertically along a substantial portion of the interior perimeter or surface area of the rear cover 326. The metal rods 330 may provide additional protection from vandal attacks. In this regard, the rods may act as reinforcements and may be used to augment the high strength housing. As a result, the rods may act as a deterrent to vandal attack using hack saws, or other cutting tools. Similar reinforcements may be applied to injection molded covers or housings in strategic areas, such as connection points, surrounding openings, or in likely points of attack by vandals. The reinforcing metal components may be inserted into formed channels, pockets, or similar structures for receiving the reinforcing components. Additionally or alternatively, the reinforcing metal components may be incorporated into the injection molded covers using an over molding technique.

Figure 4:
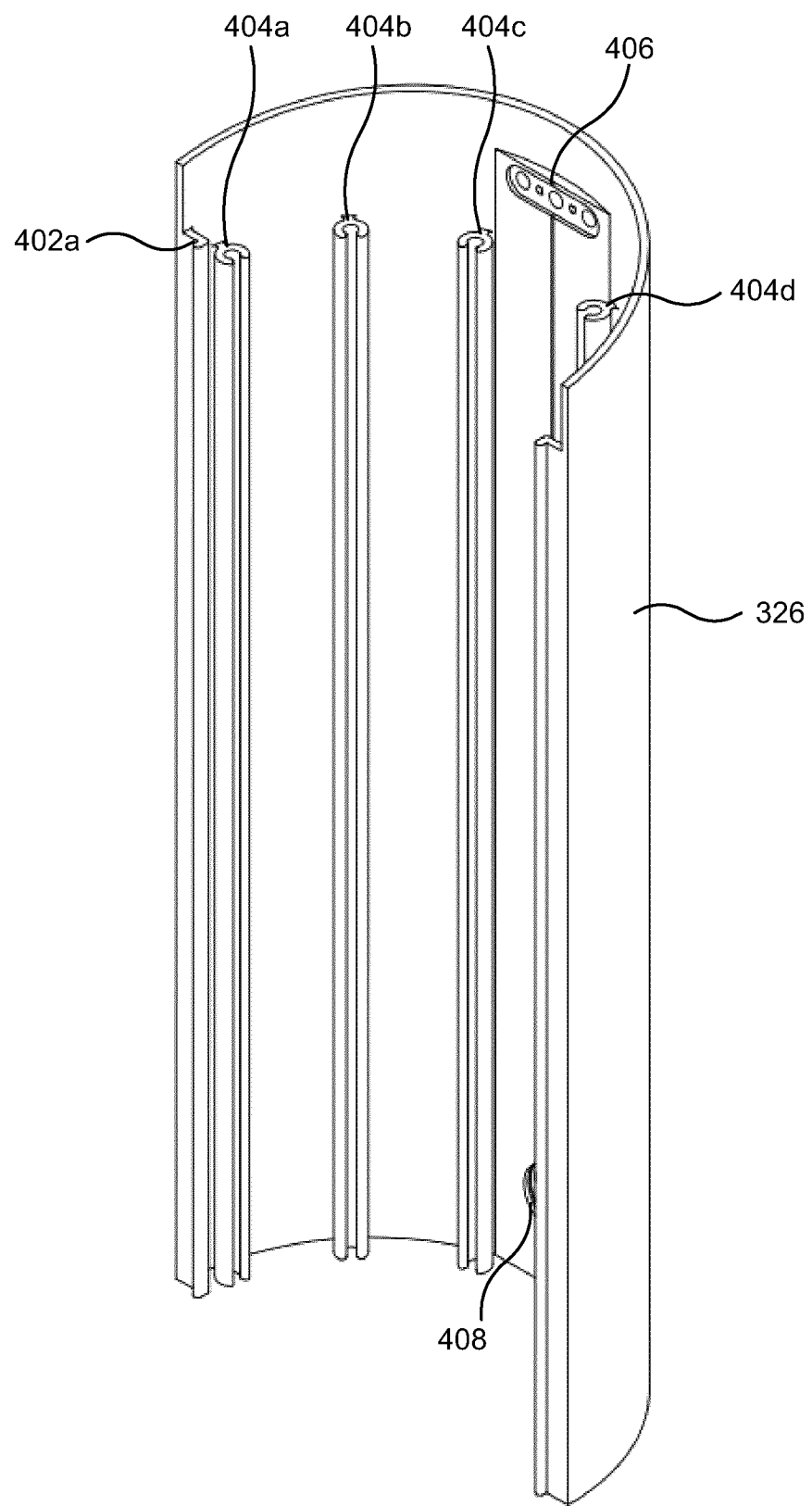
FIG. 4 depicts a rear cover of the parking meter of FIG. 3.

FIG. 4 depicts an isometric view of the rear cover 326 in further detail. The rear cover 326 may be formed as an extrusion of a polycarbonate copolymer resin that is cut to the required length and subsequently machined to provide the desired component. Alternatively, the rear cover 326 may be formed from injection molding of the polycarbonate copolymer resin. The rear cover 326 may include one or more molded or formed rails 402a, 402b on which the front cover 308 of the parking meter assembly 302 may be captured and slide up and down. Further, the interior of the rear cover comprises a plurality of extended cylindrical portions, vertical channels or retaining structures 404a, 404b, 404c, 404d that extend down a length of the rear cover and through which the connecting rods may be inserted. The connecting rods may extend through the bottom plate 328 and the extended cylindrical portions 404a-d. A nut may be used to secure the bolt or rod, and so the rear cover 326 to the bottom plate 328. Alternatively, the rear cover 326 and the bottom plate 328 may be formed as a single injected component.

The rear cover may further include one or more openings 406 for elements such as LEDs or other visual devices for quickly communicating a status of the parking meter to parking officials. Further, the rear cover 326 may include an opening 408 for a locking component. As with the front cover 308, the openings 406, 408 of the rear cover may also be surrounded by a reinforcing metal component to harden or strengthen the opening in the rear housing for protection against attacks.

The front cover 308 and rear cover 326, which are shown in FIG. 3, may be securely joined together forming a secure housing to protect the parking meter components against an external environment, including dirt, dust, rain and snow, as well as from vandalism. Although the secure housing is depicted as being provided by two interacting housing components, namely, the front cover 308 and the rear cover 326, it is contemplated that additional covers, or portions of the housing, may be provided. When in use, the rear cover 326, front cover 308, parking meter components and bottom plate are coupled together and secured to the coin vault housing 304 by a locking mechanism. The locking mechanism may be provided by a single locking component securing all of the parking meter assembly components together. Alternatively, the locking mechanism may include a plurality of locking components.

The rear cover 326 and the front cover 308 of the parking meter 300 may provide a generally cylindrical appearance or shape. Although the appearance of the parking meter 300 may be a design aesthetic that may be varied based on different design factors, a cylindrical appearance may provide a more attractive parking meter assembly than a non-cylindrical assembly. In addition to providing a visually more attractive appearance, the cylindrical shape may improve the strength of the parking meter for withstanding physical attacks since the cylindrical nature of the housing eliminates, or at least reduces, the number of corners in the housing, which corners may provide weaker points. The front cover 308 may have a recessed flat portion that provides a location 310 for user interaction. The user interaction location 310 may comprise an information area or display 312 for presenting information to a user, as well as input controls 314 for interacting with and controlling the parking meter assembly 302.

The recessed flat portion may also include a payment area 316 for providing a plurality of different payment mechanisms. The plurality of different payment mechanisms may be arranged, one next to the other, horizontally. For example, a coin chute, including an opening 318 for inserting coins into the coin chute, may be provided along with a card slot 320 for accepting payment via a magnetic stripe or chip card. The card slot 320 as depicted is vertically-oriented. Optionally, the card slot may be horizontally-orientated and/or angled so as to shed away any water in the vicinity of the card slot (e.g., the card slot may be sloped downwardly away from the interior of the parking meter). The payment area 316 may also have a tap area 322 for making payment via a contactless payment device. The tap area 322 may include an industry-recognized logo and/or a message such as "tap here" for directing a user with respect to where the contactless payment device should be held to effect payment. The tap area 322 may also include one or more progress indicators, which may for example be a band of light emitting diodes (LEDs) for providing an indication of the progress of a transaction. The progress indicators may include color-based indications (e.g., green indicates a successful transaction).

Although depicted as a separate tap area 322 in the payment area 316, contactless payment readers and/or antennas therefor may be provided at other locations including, for example, surrounding, or in close proximity to, the display 312, or on a lower non-vertical or angled surface that provides a transition from the recessed flat portion to the cylindrical perimeter of the front cover 308. The contactless payment readers and/or antennas therefor may alternatively be mounted such that they are attached to or mounted on top of a surface of the housing, such as on top of one or more surfaces of the front cover as opposed to being flush mounted and/or hidden behind a front cover surface(s). In this regard, a number of locations for the contactless payment reader and corresponding antenna are possible. For example: a self-contained contactless payment reader device, such as an after-market contactless payment reader device may include a built-in antenna, and may be located or mounted either behind the front cover surface or on top of the front cover surface; or, alternatively, a contactless payment reader device may be physically separate from but connected to its corresponding antenna, and either one or both of the reader and the antenna may be located or mounted either behind the front cover surface or on top of the front cover surface (such that if the antenna is mounted externally and the reader is mounted internally, there would be a connection between the two through the front cover). For instances where the contactless payment reader and/or antenna are mounted on the surface of the front cover, they may be mounted by way of bolt and/or adhesive, and the may be protected by suitable plastic or other protective covering for protection against vandalism and the elements. In the case of a contactless reader mounted on the surface of the front cover, it may extend outwardly from such surface or sit higher on the surface. The front cover 308 may be made from a polycarbonate copolymer resin, which may be substantially transparent to radio frequency (RF) signals, allowing greater flexibility in where the tap area for the contactless payment reader may be located. In addition, and depending on the layout of components, either the user interaction area 310 or payment area 316 may include a keypad (not shown) for entering information, such as a PIN or license plate number for carrying out transactions. Further, the recessed flat portion that provides a location for user interaction may be illuminated with one or more lights (not shown), such as LED-type lights, that may be positioned at or near where the top of the flat portion transitions from the recessed flat portion to the cylindrical perimeter of the front cover 308.

The parking meter may include a low power and short range radio frequency (RF) type radio. The low power RF radio may be a Bluetooth® type radio, although other types of RF radios are possible, including, for example, WiFi, ZigBee, etc. More specifically, the low power and short range RF radio may be a Bluetooth low energy (also known as Bluetooth LE, BLE or Bluetooth Smart) radio, which provides lower power consumption than traditional Bluetooth but maintains a similar communication range. The RF radio may be mounted within the interior of the housing and may be constantly supplied with power, or supplied with power while there is sufficient power to power the RF radio. The housing, which may be made either significantly or substantially of polycarbonate copolymer resin, will not significantly attenuate RF signals from the RF radio. Accordingly, the housing may provide flexibility in the placement and mounting of the RF radio within the meter interior. The RF radio may have an electrical connection, or interface, to the meter controller board allowing the constantly powered RF radio to notify or interrupt the controller board, even if the meter is in a low powered or sleep state, as well as send and receive data and/or commands to and from the controller. By having the RF radio continuously powered, there is no need for a user having a mobile device to initially interact with the meter such as by pressing a user button, inserting a card, etc. in order to ensure the parking meter is in a wake, or operation, mode. Rather, the user, or more particularly the user's mobile device communicating with the RF radio, may place the meter in the wake or operation mode.

The primary power source for the Bluetooth low energy radio may comprise one or more battery packs located inside the parking meter. A supplementary source of power for the Bluetooth low energy radio, and/or for other devices, components or circuits within the parking meter, may comprise an alternative energy harvesting mechanism or device. For example, the parking meter may include an alternative energy harvesting mechanism or device that harvests energy from ambient RF signals, variations or differentials in nearby materials temperatures, and/or street vibrations. Energy harvested in this regard may be used to at least partially power the Bluetooth low energy radio and/or other devices, components or circuits within the parking meter. Such supplemental power source may allow a device such as a Bluetooth low energy radio to be more autonomous from and self-sufficient relative to the primary parking meter power sources and circuits, including the one or more battery packs of the parking meter.

The RF radio device may be used to facilitate purchases of park time from mobile devices or vehicles which have paired, or otherwise associated, with it. An associated mobile app may be used by the owner of the mobile device or vehicle to request and make the park time purchase. An identifier or name of the RF radio device in a particular meter being paired with, or otherwise associated with, the mobile device or vehicle may be associated with the meter's location or an ID label found on the exterior of the meter housing. Such a visible identifier or name allows the mobile device or vehicle owner to visually check to ensure they are pairing with, or otherwise associating with, the desired meter from or within a group of nearby meters that may also be outfitted with RF radio devices and possibly be within reception range of the mobile device or vehicle. The application on the mobile device may also provide the ability to scan or read barcodes, 2-D 'QR' codes, or RFID tags attached to the exterior of the meter, which can provide additional information about the meter including the meter location identifier or ID. Scanning a bar code, QR code or RFID tag may reduce the amount of user keyboard entry, thus speeding up the park time request process. The owner of the mobile device or vehicle may have previously registered the mobile app and associated it with a payment means such as a credit or debit card or other financial payment means such as PayPal, Applepay, GoogleWallet or Android Pay.

Once the mobile app or vehicle has paired with, or otherwise associated with, the selected RF radio device in a given meter, the current meter parking rate information is made available to the app, and the user completes their request for park time and confirms payment. Once payment is confirmed by the mobile app or vehicle, payment information, such as payment amount, park time, expiry time and/or authorization details may be provided from the app or vehicle to the meter via the RF radio device. The meter may then show paid status as well as the amount of park time purchased and/or remaining.

The low power RF radio may also be used by parking authority meter repair staff (e.g., city or municipality staff) to interact with the meter using an app on their mobile devices, without the use of any other special service cards, pressing any buttons, or physically opening up the meter housing. The app may allow for meter diagnostics, meter data collection, meter configuration, as well as repair staff time management. This alternative meter communication channel is particularly helpful to parking authority meter repair staff if the meter's cellular radio is not functional or the meter is located in an area with particularly poor cellular coverage.

The information area 310 may include one or more input controls 314 for interacting with and controlling the parking meter. For example, the input controls 314 may include buttons for increasing or decreasing an amount of time to be purchased, an 'OK' button, a 'cancel' button and one or more additional input controls which may be used for navigating one or more options or menus presented on a display 312. For example, if the parking meter is for two parking spots, left and right buttons may be included so that a user may indicate which spot he/she is paying for. Individual buttons may alternatively be combined into a keypad array, arranged horizontally above or below the user display or vertically to the left or right of the display.

The individual buttons and/or individual keys of a keypad array may use piezo-style switches, buttons or actuators, which are substantially or fully sealed from external environmental elements, thus making them advantageous for use in outdoor equipment. The keypad array may provide an electrical interface in the form of one or two conductors for each normally open or normally closed piezo-style switch, button or actuator in the array. Alternatively, to reduce the number of conductors, the keypad array electrical interface may use a circuit that implements a one, two or three-wire communications protocol, such as inter-integrated circuit (I2C) bus, serial peripheral interface (SPI) bus, or a custom protocol. In this regard, the number of input/output (I/O) lines or conductors required to detect switch states may be reduced or minimized. This form of electrical interface provides improved flexibility, as a keypad array with just a few buttons can use the same electrical interface as a keypad array with many buttons. For example a two-button, a six-button, or a 40-button keypad array could all be implemented using the same electrical interface. Further, reducing the number of conductors as described may also advantageously free up I/O on a meter's controller, and/or use an existing bus already used by the meter to manage other peripherals.

In addition to the display 312 for presenting information to a user, the interaction area 310 may further include one or more status LEDs for communicating a status of the parking meter at a distance. For example, the status LEDs may be used by parking enforcement personnel to determine which parking meters have expired time, have purchased time remaining, are malfunctioning, etc. without having to closely inspect the meter. The status LEDs may employ one color or more than one color in order to convey one or more statuses to parking enforcement personnel with respect to the parking meter, which, for example, may be a parking meter for a single parking spot or two parking spots. It is possible to replace the status LEDs with other indications that can be understood from a distance, such as flashing of the display, or magnetic "flip dots". (While not depicted, the rear cover may also provide a clear window or opening that allows two or more brightly coloured and/or highly visible enforcement "flip-dots" (also known as "flip-discs"). The "flip-dots" may be magnetically energized, and each individual "flip-dot" may have a different colour on each side of it. A particular colour serves to represent a particular status of a specific parking space managed by the meter. Such "flip-dots" may be easily visible from enforcement vehicles or by walking parking attendants even in bright sunlight.) However, the status LEDs, particularly when flashing a low duty cycle, draw relatively very little power, and as such are preferable for remaining on for long periods of time, whereas powering the relatively larger display, even if only flashing, may consume a significantly greater amount of power. Additionally, although depicted as separate display and input components, it is contemplated that the input controls 314 and the display 312 may be provided by a single touch screen display, which may or may not provide color graphics. Although different types of touch screen sensors may be used, the preferred technology solution would offer low power consumption, which allows the touch screen sensor circuits to remain active even during non-operational periods, and when the main display is turned off to conserve power, so that any tap or touch to the display screen by the user will activate the meter. A touch screen display may allow some or all other user input controls to be eliminated. Alternatively, an additional touch or proximity sensor located anywhere on the meter front surface that preferably has low power consumption may be used to detect an initial user proximity or interaction with the parking meter, which may permit the parking meter to power on additional components such as the touch screen display. The preferred touch screen sensor would be robust, resistant to abuse and vandalism, and function reliably in outdoor environments, including extreme heat and cold, as well as with a gloved finger. Although not depicted in the FIGS., the parking meter may comprise a printer, including paper roll, and opening in the front cover for dispensing receipts for users upon payment of parking time.

As is well understood, single space parking meters are powered by one or more internal battery packs. The batteries may be supplemented, and/or charged, by a solar panel 330. Although other positions are possible, locating a solar panel 330 at or near the top of the parking meter is a desirable location. While the solar panel 330 is depicted in the FIGS. as being in a fixed, forward sloping orientation, it will be appreciated that the cylindrical shape of the exterior housing allows for an adjustable solar panel assembly that can be rotated at the time of installation such that the solar panel may be oriented to point in any direction. Typically, the direction to be pointed is due south for the northern hemisphere. The adjustable solar panel assembly may be allowed to be adjusted to any one of two or more vertical slopes or angles relative to the horizon. Although not depicted in the FIGS., the solar panel 330 at the top of the meter may also be optionally augmented with one or more additional flexible type solar panels attached to the exterior of the cylindrical surface of the rear cover.

As depicted, the parking meter 300 may be comprised of two sub-assemblies, namely, a front assembly 302, and a rear assembly 324. The rear assembly 324 may be secured to a coin vault housing permanently secured to the parking meter location. The rear assembly 324 may comprise a bottom plate 328 secured to the rear cover 326. The bottom plate can be permanently, or semi-permanently, attached to the coin vault housing. The front assembly 302 may be slidably engageable with the rear assembly 324 to allow the front assembly 302 to be removed from the rear assembly. The front assembly 302 may be fully removed, or partially removed or partially installed. That is, the front assembly 302 may engage with and slide down or up rails or profiles of the rear assembly 324 in order to secure the front assembly 302 to the rear assembly 324. In this regard, the front assembly 302 may comprise rail guides that engage with the rails of the rear assembly 324. The rail guides of the front assembly 302 may be formed as part of the front cover 308, or may be provided as separate components that may be attached to the front cover 308. It will be appreciated that the opposite configuration—i.e., rail guides on the rear assembly and rails on the front assembly—may also be possible, and that the variations and embodiments described herein may similarly be reverse vis-à-vis the front and rear assemblies. Additionally or alternatively, the front cover of the front assembly may include side edge surfaces that provide a bearing surface that in conjunction with bearing surfaces of an internal structure of the front assembly capture the rails of the rear assembly and allow the front assembly to slide up and down the rear assembly.

The front assembly 302 may be locked to the rear assembly 324 using a locking mechanism, which may be operated via a keyhole in the rear cover. The locking mechanism (not shown) may be affixed to the rear cover and engage with and secure the front cover in the locked position, or alternatively the locking mechanism may be affixed to the front cover and engage with and secure the rear cover when in the locked position. The front assembly 302 may be removed and replaced as a complete assembly by fully raising or lifting the front assembly vertically until its bottom end clears the rails of the rear assembly. Partially or fully raising the front assembly 302 from the rear assembly 324 may be done to, for example, inspect components or perform routine maintenance such as replacing batteries or clearing card reader or coin chute blockages. The rails may provide a spring-catch assembly (not shown) that allows the front assembly 302 to be lifted and held at any one of multiple partially raised vertical positions which allows hands free service work and testing of the meter to be carried out while in the partially raised or lifted position. Releasing the spring-catch would release the front assembly 302 allowing it to freely slide up or down on the rails or profiles. Alternatively, the front assembly 302 may be raised to a first position such that the rail guides of the front assembly 302 may be released from the rails of the rear assembly 324 at this first position, while the bottom of the front assembly 302 remains engaged with the rear assembly. Under this alternative configuration, there would also be a hinge, such as a telescoping or folded metal rod, located at a release point. For example, the hinge may be fixed at or near the top of the front assembly at one of its ends (such as at or near the top of the rail guides) and at the other end fixed at or near the top of the rear assembly (such as at or near the top of the rails). Releasing, separating or detaching the front assembly from the rear assembly at the release point allows the hinge to unfold or extend to a stopping point and the front assembly to tilt forward to a non-vertical or horizontal position. The bottom of the front assembly that remains engaged with the bottom of the rear assembly is pivotably configured at such bottom location so as to allow the front assembly to rotate forward from its vertical position to the more horizontal position. Such pivotable configuration may require that the rail guides at the bottom of the front assembly be partially releasable or hinge-able relative to the bottom of the rails and/or bottom of the rear assembly in order to allow for the rotation of the front assembly. Such rotation, which involves pivoting or hinging about an axis at the bottom location, thus allows for the back side or internally-facing components of the front assembly to be exposed for service work. The ability to raise and/or hinge forward the front assembly in this regard is advantageous for more openly exposing some or all of the internal parking meter components as compared with traditional single space parking meters. This may make repair, servicing and/or replacement of such components easier and/or quicker. With respect to the coin chute, a mirror (not shown) may be positioned just above a coin inspection slot or opening for the purpose of facilitating or making easier the inspection of the coin chute for blockages. Alternatively, payment devices may have quick release knobs allowing them to be disengaged from a normally fixed/rigid position on the front cover, such that they can be quickly and easily inspected, serviced and/or removed without the use of tools.

Figure 5:
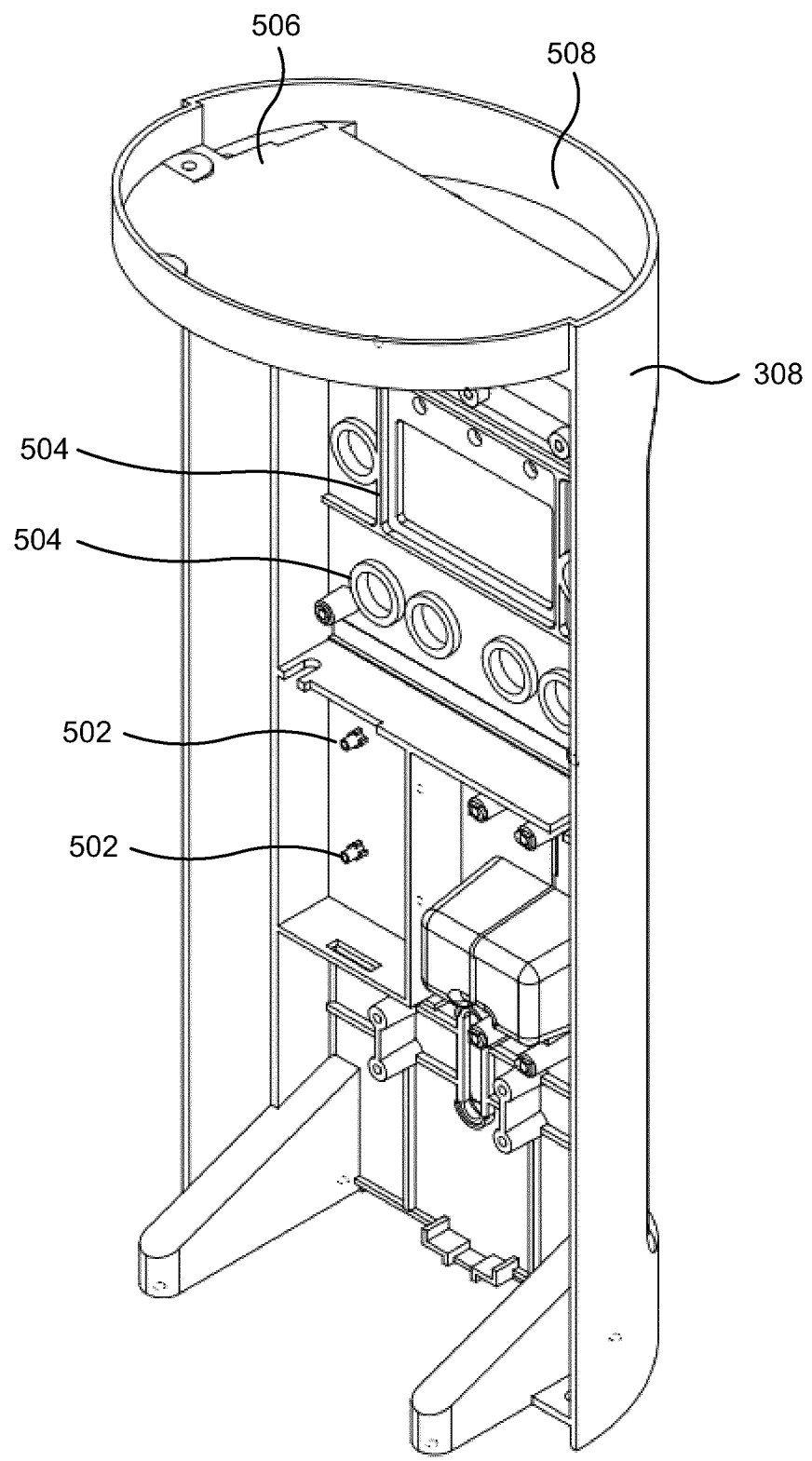
FIG. 5 depicts an internal view of a front housing of the parking meter of FIG. 3.

FIG. 5 depicts a rear isometric view of the front assembly's front cover or housing. The front cover is primarily formed from polycarbonate copolymer resins, which provides for lower interference than metal housings with respect to wireless communications from the parking meter. The front cover 308 may be molded or otherwise machined to provide the exterior surface, as well as to provide a plurality of mounting points 502 for connecting the parking meter components. The front cover 308 may include strategically placed features or projections on the inside surfaces for the attachment of steel rod or sheet metal reinforcing members which may provide additional vandal resistance against common cutting tools. The front cover 308 may comprise reinforcing members located around openings 504 in the housing. In addition or alternatively, the injected molded polycarbonate copolymer resin may include a mixture of small glass or ceramic beads or microspheres providing anti-drilling protection. Additionally, or alternatively, long glass fiber (LGF) or Kevlar® fiber may be included in the resin. Combining the raw plastic material with the above-described additional or alternative materials at the time of mold injection may result in a formed component that is particularly resistant to drilling by traditional carbide tip drills. The introduction of such additional or alternative materials may increase tensile strength and resistance to penetration, though such materials may correspondingly cause a reduction in elasticity, ductility and/or flexibility.

The front cover 308 may include a recess 506 at the top of the front cover 308 for receiving a solar panel. The solar panel recess 506 may include a secondary radio antenna recess 508 located towards the front of the front cover 308. The radio antenna recess 508 may provide a location for a flexible antenna that may be used for various communications, including for example cellular data communications related to authorization of payment transactions, verification of parking meter status, and/or updating of parking meter functions. Preferably, the antenna is located at or close to the curved inner surface of the front cover 308 within the recess 508. Alternatively, the antenna may be integrated into or surface mounted to the top facing surface of the solar panel. The solar panel recess 506 and radio antenna recess 508 may be fixedly part of, or rigidly attached to, the front cover 308, or, alternatively, the solar panel recess 506 and radio antenna recess 508 may be removable components that are replaceable in the field. The solar panel may optionally be covered with a transparent material that may be applied after the solar panel is received in the solar panel recess. Also, the solar panel may be permanently sealed or glued in the recess using an adhesive, such as a 3M adhesive gasket. In the alternative, the solar panel may be provided in a solar panel assembly or module that slidably engages with or is removably coupled or secured to the front cover 308, and further electrically engages with a battery of the parking meter when the solar panel assembly is fully engaged with the front cover. The solar panel assembly allows the solar panel to be replaceable/serviceable in the event of vandalism, failure or other damage. Such solar panel assembly may include the one or more lights, such as LED-type lights, that may be positioned at or near where the top of the flat portion transitions from the recessed flat portion to the cylindrical perimeter of the front cover 308. Such solar panel assembly may further include status LEDs or holes for permitting the visibility of such status LEDs. In addition to the alternative solar panel assembly, the radio antenna may alternatively be provided in a radio antenna compartment that slidably engages with or is removably coupled or secured to the front cover 308, and further electrically engages with the main electronics board when the radio antenna compartment is fully engaged with the front cover. This allows the radio and antenna combination to be quickly and easily swapped out in the field for maintenance/service, to replace/inspect a SIM card, or to switch the meter from one cellular network to another alternative network that may have better coverage or signal strength than the original network. The inside surface of the front cover 308 comprises a number of mounting locations for other components. The mounting points may include, for example, a mounting location for display and input components, a mounting location for a contactless reader, a mounting location for a magnetic stripe and chip card reader as well as a mounting location for a coin chute. Although a specific molding of a front cover is depicted, it will be appreciated that the particular locations of the mounting points and other features may vary, and will depend upon the specific components incorporated into the parking meter.

Figure 6:
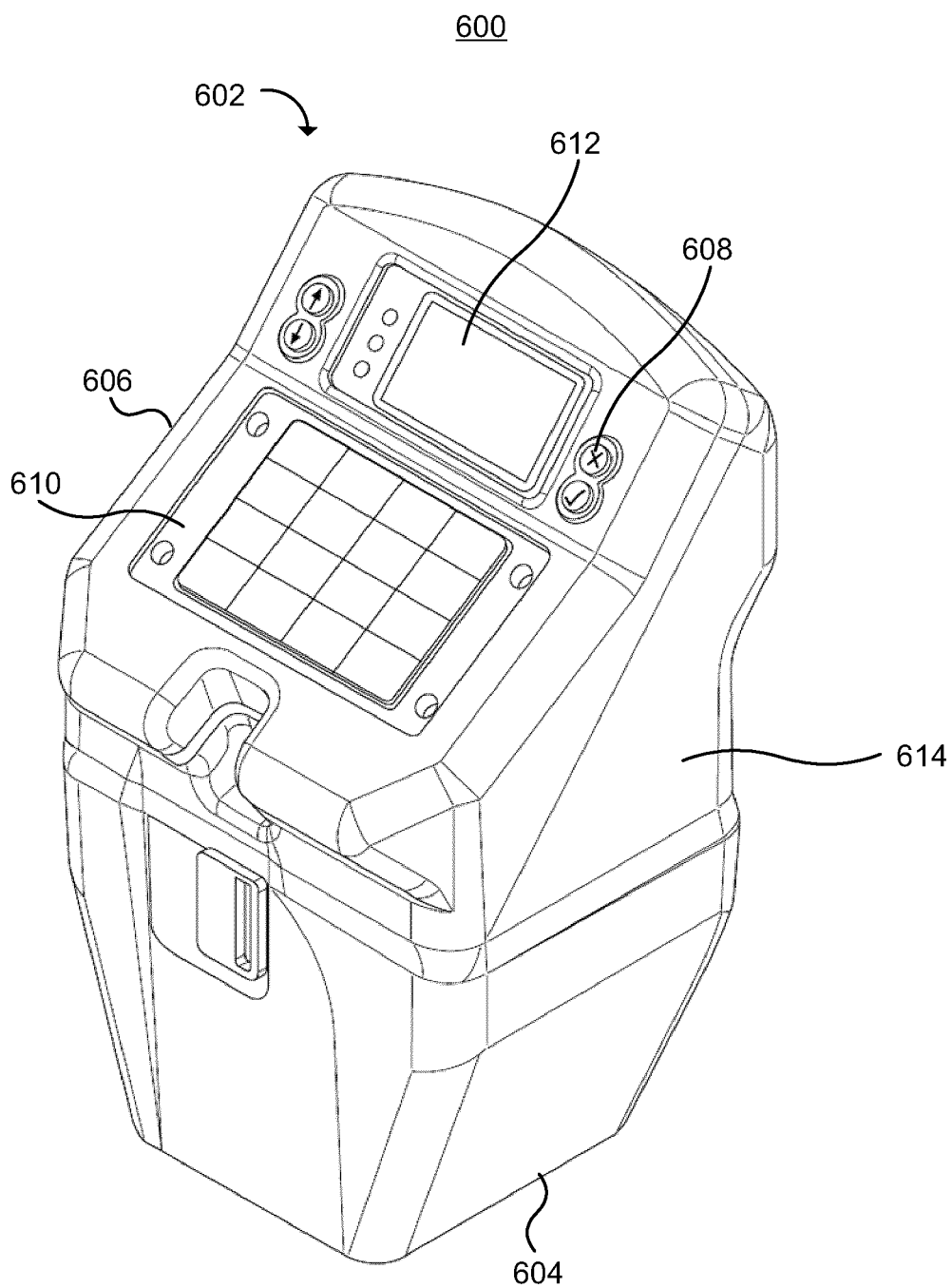
FIG. 6 depicts a further single space parking meter.
Figure 7:
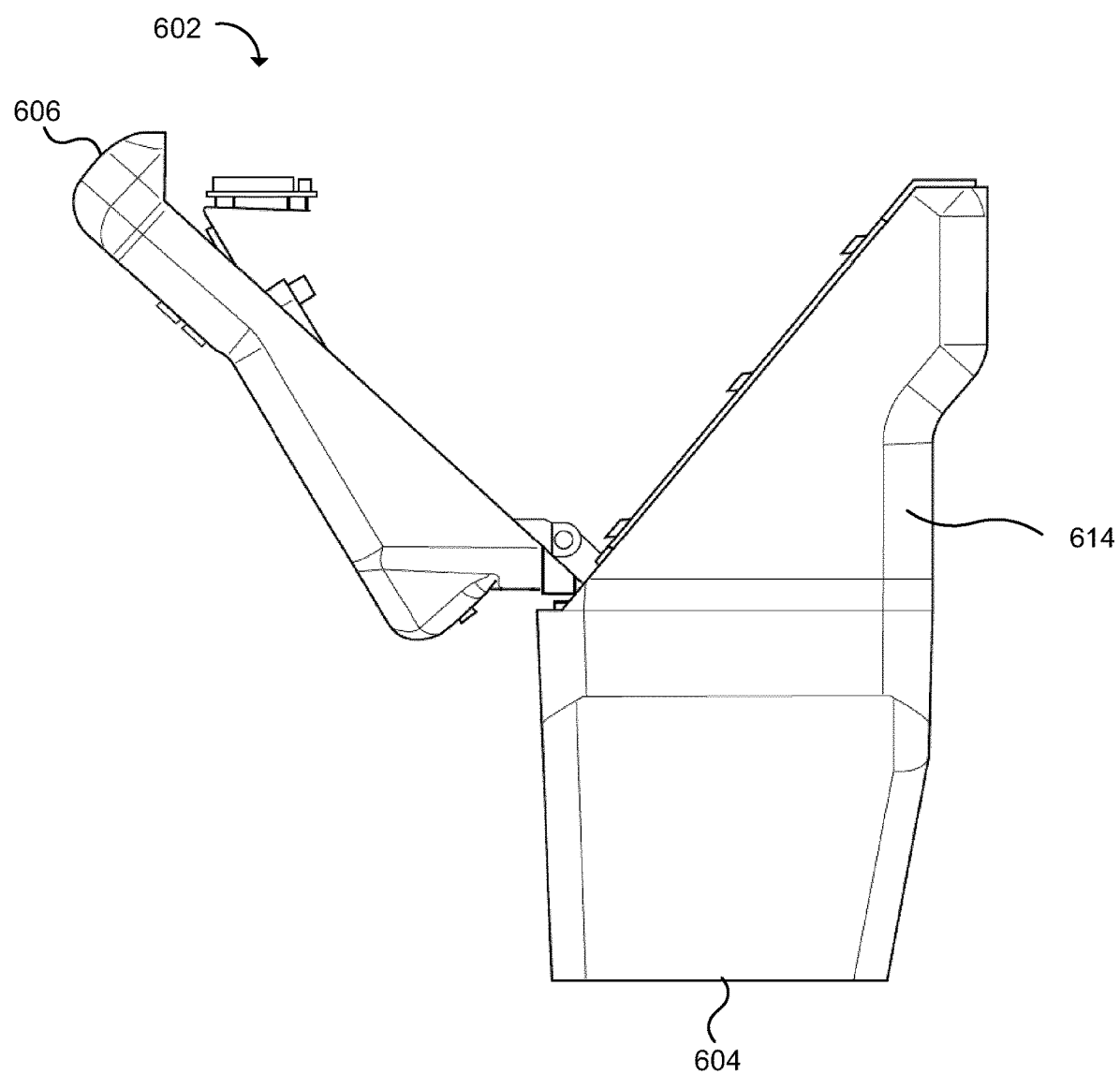
FIG. 7 depicts the single space parking meter of FIG. 6 in a partially opened position.

FIG. 6 depicts a further single space parking meter and FIG. 7 depicts the single space parking meter of FIG. 6 in a partially opened position. The parking meter 600 comprises a removable meter mechanism 602 that is received within a lower housing 604. The removable meter mechanism 602 comprises a front housing 606 formed of a polycarbonate copolymer resin. The front housing 606 comprises a number of openings including openings for buttons or control components 608 and a display 612. Situated on top of and affixed to a flat recessed portion of housing 606 is a solar panel 610. Alternatively, the solar panel 610 may be exposed to light through an opening in the front housing 606. As described above, the openings within the front housing 604 may be strengthened by one or more reinforcing metal members. As depicted in FIG. 7, the front housing 606 may be pivotally connected to an internal portion received within the lower housing 604. A rear housing 614 may be secured to the lower housing 604, and may also be formed of a polycarbonate copolymer resin. The front housing 606 and the rear housing 614 may be secured together in order to provide a unitary housing providing protection from vandalism attacks.

Figure 8:
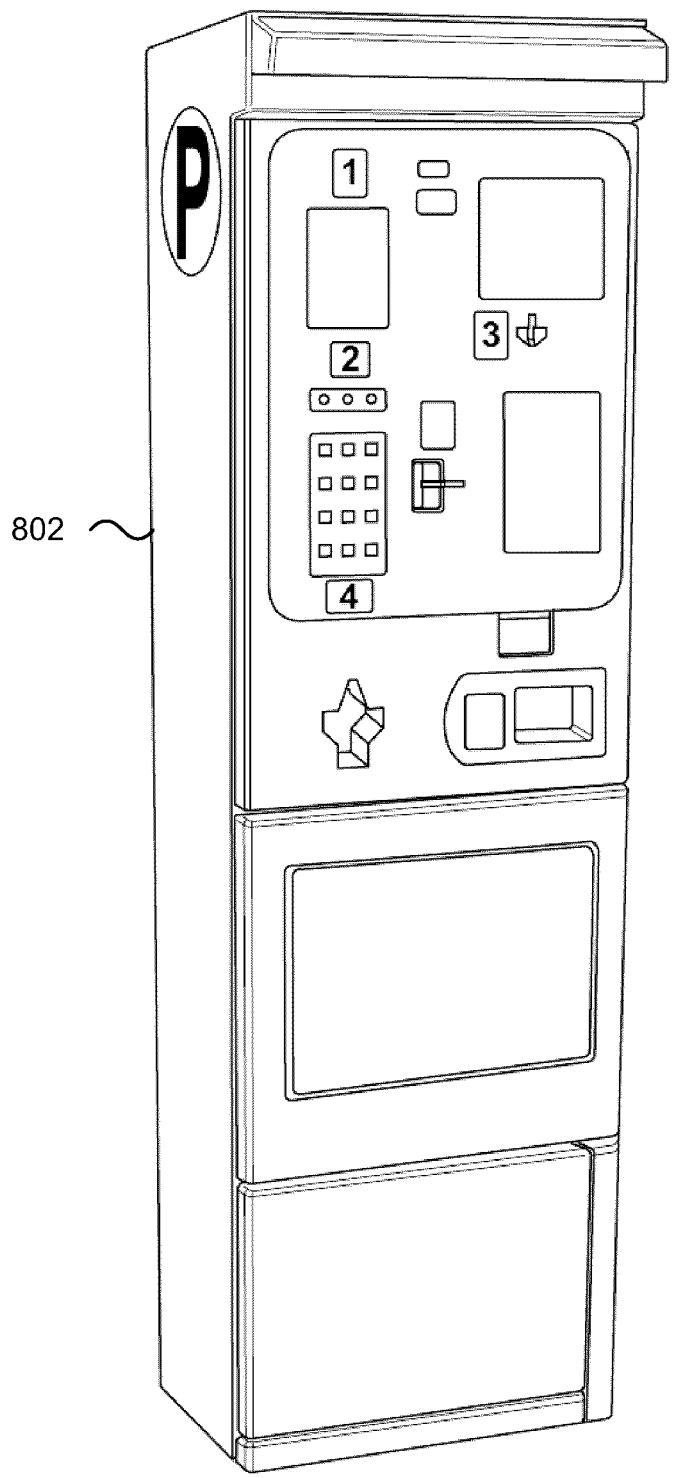
FIG. 8 depicts a multi space parking meter.

FIG. 8 depicts a multi space parking meter 800. The parking meters described above are single space parking meters. However, the lightweight polycarbonate copolymer housing may also be used in multi space parking meters. As depicted, the multi space parking meter 800 may have a housing 802 formed of a polycarbonate copolymer resin. Additional reinforcing members may be provided on an interior of the multi space parking meter housing in order to provide additional strength and protection against vandal attacks. For example, the parking meter housing may include metal rods at select locations to prevent sawing or cutting type attacks. Additional reinforcing members may be located surrounding openings for other components such as payment devices, displays, compartment doors, etc. In addition, the polycarbonate copolymer resin may include a mixture of small glass or ceramic beads or microspheres providing anti-drilling protection.

Figure 9:
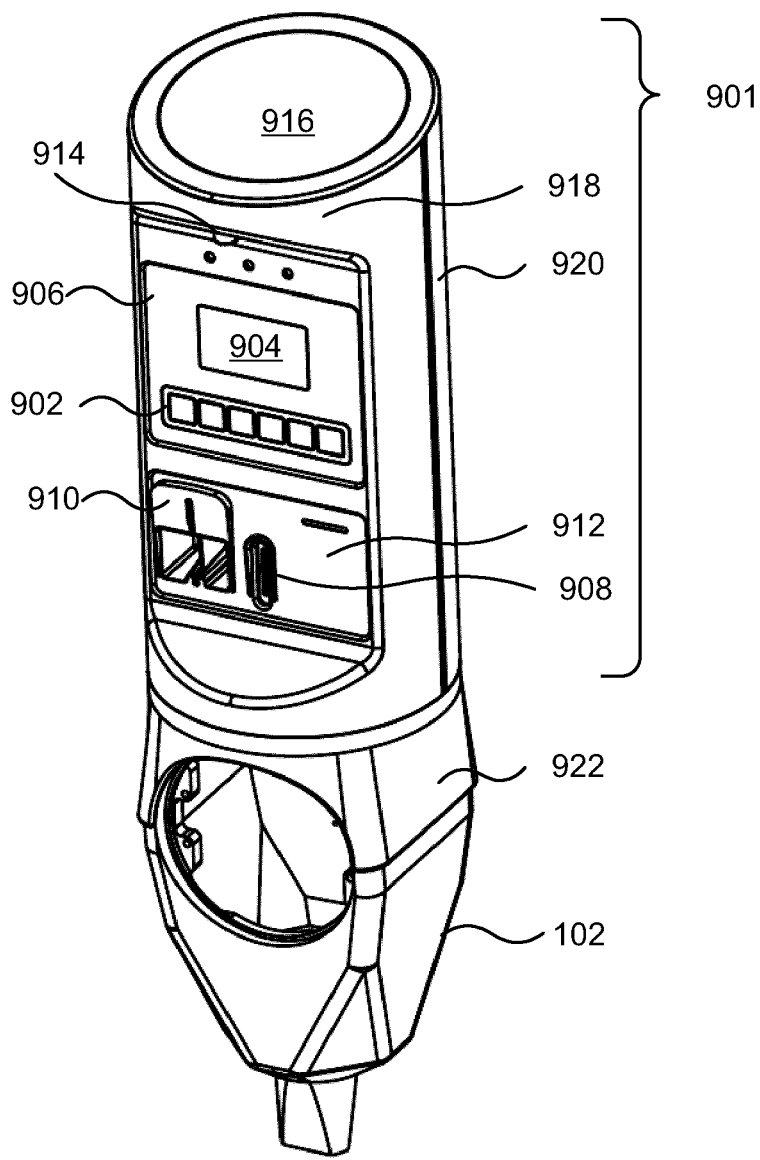
FIG. 9 depicts a front isometric view of an alternative single space parking meter.

FIG. 9 depicts a further parking meter. The parking meter 900 is similar to the parking meters described above. In particular, a parking meter assembly comprises a protective outer covering, which may be made at least in part from a polycarbonate copolymer resin that provides protection to internal parking meter components. The protective outer covering may be provided by a plurality of exterior covers. One or more of the covers may be formed substantially of a polycarbonate copolymer resin. Alternatively, it is possible for an individual cover to be formed from something other than a polycarbonate copolymer resin, or for an individual cover to be formed of a polycarbonate copolymer resin, but not substantially of a polycarbonate copolymer resin. Preferably, at least one cover is formed substantially of a polycarbonate copolymer resin. For example, the protective outer covering may be provided by a front cover that is formed substantially of a polycarbonate copolymer resin and a rear cover that is formed from metal. Alternatively, the rear cover may also be formed substantially of a polycarbonate copolymer resin.

The parking meter 900 provides a low-profile parking meter assembly 901 that can be secured to a coin vault assembly, or similar structure. The parking meter assembly comprises an input area 906 comprising a plurality of input controls 902 arranged horizontally below a display 904. It will be appreciated that other arrangements of input controls and/or displays are possible. Further, in order to reduce an overall height of the parking meter assembly 901, the payment means are all located in the same general horizontal area located below the input area 906. That is, the coin chute 908 is located horizontally adjacent to the card slot 910 for the card reader as well as a tap target, or antenna location, 912 for the contactless payment reader. As depicted in FIG. 9, the payment means 908, 910 and 912 are generally horizontally aligned with each other. This is in contrast to the coin chute 318 of parking meter 300, which is vertically offset from, and so not generally horizontally aligned with, the other payment means 320, 322. The parking meter 900 may further comprise an overhead light 914 projecting downwards from the front cover in order to illuminate at least a portion of the parking meter to facilitate user interactions in the evening or during dark periods. The parking meter may include a solar panel 916 located at a top section of the parking meter. As described further below, the parking meter assembly 901 may include an internal structure to which various parking meter components may be connected. A front housing cover 918 may be secured to the internal structure, and the internal structure and front housing 918 of the parking meter assembly 901 may slide up and down a rear assembly 920 that remains fixed to the coin vault.

Figure 10:
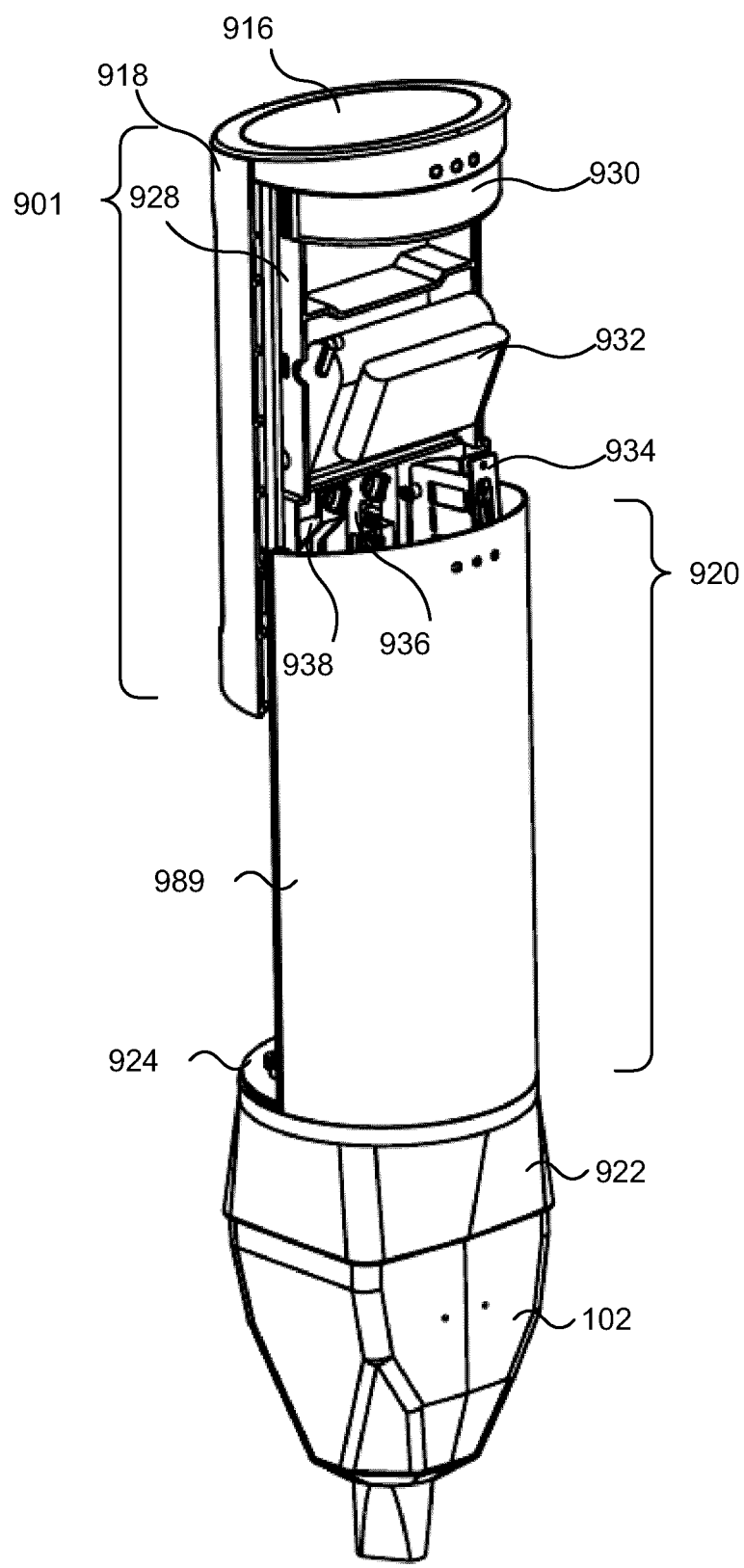
FIG. 10 depicts a rear isometric view of the single space parking meter of FIG. 9 with the parking meter assembly partially raised.

FIG. 10 depicts a rear isometric view of the single space parking meter of FIG. 9 with the parking meter assembly partially raised. As depicted, a rear assembly 920 can be secured to the coin vault 102 and saddle plate 922 that may be secured over the coin vault 102. The rear assembly 920 may comprise a bottom plate 924 that can be secured to the saddle plate 922 and to the coin vault housing 102 using bolts or other connection means. A rear cover 989 may be secured to the bottom plate 924 using any number of fastening techniques such as welding, screws, bolts, etc. A locking assembly may comprise a locking component for preventing vertical movement of the front assembly 901 relative to the rear assembly 920 when engaged with the front assembly in a lowered position. When the vertical locking component is disengaged, the front assembly 901 may be slid up and/or down the rear assembly 920. The front assembly 901 may be partially slid up the rear assembly 920 to a service position as depicted in FIG. 10 that allows for inspection and servicing of internal parking meter components. Although described as sliding vertically to a service position, it is possible for other movements to be provided.

For example, it is possible for the front assembly 926 to slide vertically and then rotate or hinge so as to place the front assembly in an angled or at least partially horizontal position to facilitate servicing and inspections. The front assembly 901 may be completely removed from the rear assembly 920 for replacement or other purposes.

As depicted in FIG. 10, the front assembly 901 may comprise the front cover 918 which may be securely attached to an internal structure 928. The internal structure 928 and/or the front cover 918 may provide mounting connections for securing various parking meter components to the front assembly 901. The components may be secured using a quick-connection type of mechanism that allows individual components to be moved for inspection and/or removed for servicing or replacing without requiring any tools for such moving and/or removal. The components may include a solar panel assembly or module that includes a solar panel 916, a radio board component or radio antenna compartment 930, a battery compartment 932 (depicted with a battery), a magnetic stripe and/or contact based card reader 934, a coin chute 936 and/or a contactless payment card reader and antenna 938.

Figure 11:
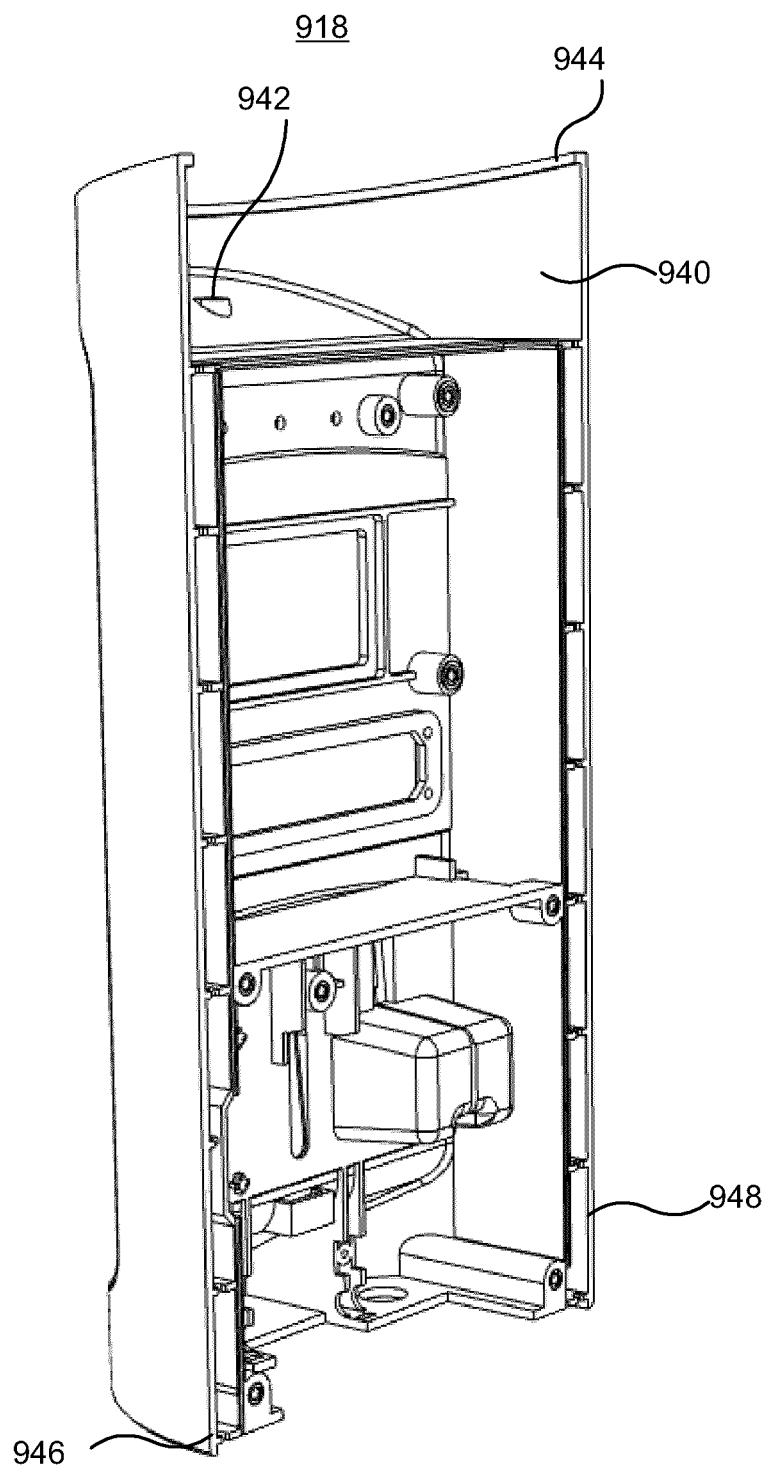
FIG. 11 depicts an internal isometric view of a front cover of the single space parking meter of FIG. 9.

FIG. 11 depicts an internal isometric view of a front cover of the single space parking meter of FIG. 9. The front cover 918 may be formed at least in part from a polycarbonate copolymer resin to provide desirable protection against vandalism and the environment. Although formed at least in part from a polycarbonate copolymer resin, the front cover 918 may include metal reinforcing components in potentially weak areas. For example, a metal reinforcing plate may be secured to the polycarbonate copolymer resin front cover 918 in the area surrounding a display opening. Other metal reinforcing structures or components may be provided at various locations where the polycarbonate copolymer resin front cover 918 may require additional mechanical strength. As depicted, the front cover 918 may provide various mounting structures for securing various components, such as displays, main circuit boards, input components, the internal structure, etc. to the front cover 918. The front cover 918 includes an upper portion 940 where the solar panel assembly may be received. The upper portion may include a downward protrusion 942 above a user interface panel to provide a housing for an LED to illuminate the user interface panel. The upper portion may also include a ridge 944 for securely capturing the solar panel assembly when slid into the upper portion 940. The front cover 918 may include two side edge surfaces 946, 948 that provide a bearing surface that in conjunction with bearing surfaces of the internal structure 928 capture rails of the rear assembly 920 and allow the front assembly 901 to slide up and down the rear assembly 920.

Figure 12:
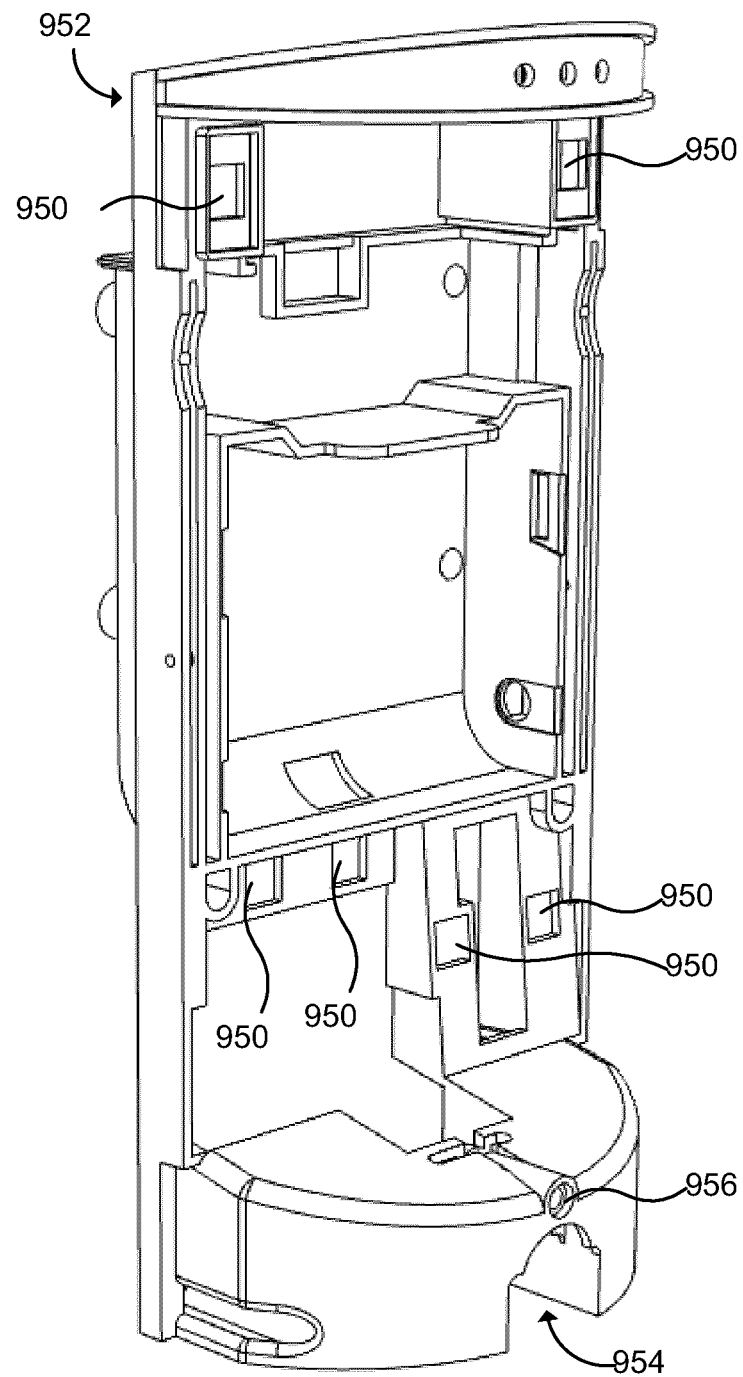
FIG. 12 depicts a rear isometric view of an internal structure of the single space parking meter of FIG. 9.

FIG. 12 depicts a rear isometric view of an internal structure 928 of the single space parking meter of FIG. 9. The internal structure may be formed at least in part from the same polycarbonate co-polymer resin as the front cover 918. However, since the internal structure 928 will be protected by the front cover 918, and rear cover 989, it may not be necessary to form the internal structure from the same material. Rather, the internal structure may be formed from other plastics. The internal structure may include various mounting points for securing components to the parking meter. As described above, individual components may be connected using quick-connect connections such as thumb-screws or similar friction type connections to secure the components in place. The internal structure 928 comprises a number of square openings 950 that may receive capturing components that allow, for example, a thumbscrew to secure the component with a quarter turn. The internal structure 928 includes two side edge surfaces 952, only one of which is labeled, that provide bearing surfaces that cooperate with the bearing surfaces 946, 948 of the front cover to capture rails of the rear assembly 920. The internal structure 928 may also include an opening or section 954 for receiving a locking component used to secure the front assembly from vertical movement. A locking bar or rod 956 may be secured within the internal structure 928 and may be captured by a hook (not shown) when the lock is engaged.

Figure 13:
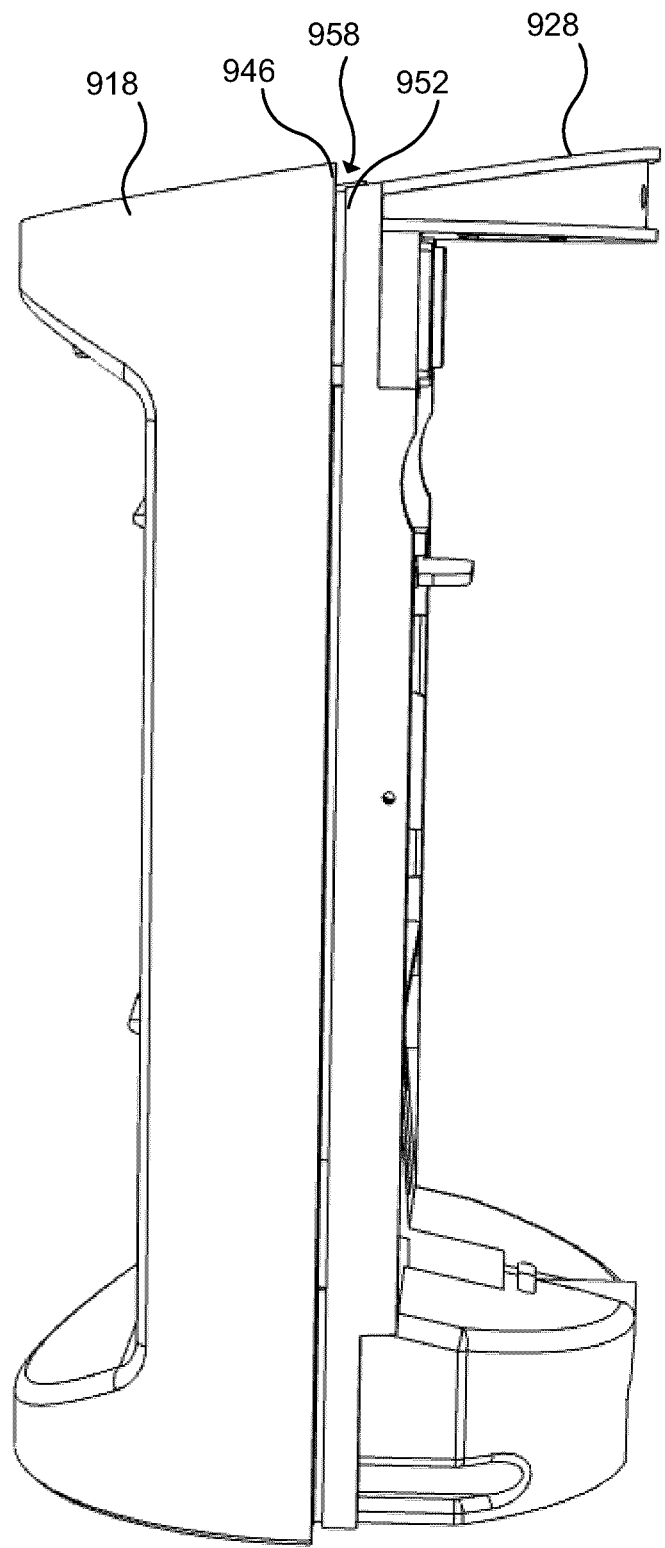
FIG. 13 depicts a side view of the internal structure of FIG. 12 attached to the front cover of FIG. 11.

FIG. 13 depicts a side view of the internal structure of FIG. 12 attached to the front cover of FIG. 11. As depicted, when the front cover 918 is secured to the internal structure 928, the corresponding bearing surfaces 946, 952 of the front cover 918 and the internal structure 928, respectively, are in close proximity to each other forming a channel 958. The channel 958 captures a rail of the rear assembly 920 to secure the front assembly 901 to the rear assembly 920 while allowing the front assembly 901 to slide up and down the rear assembly 920.

Figure 14:
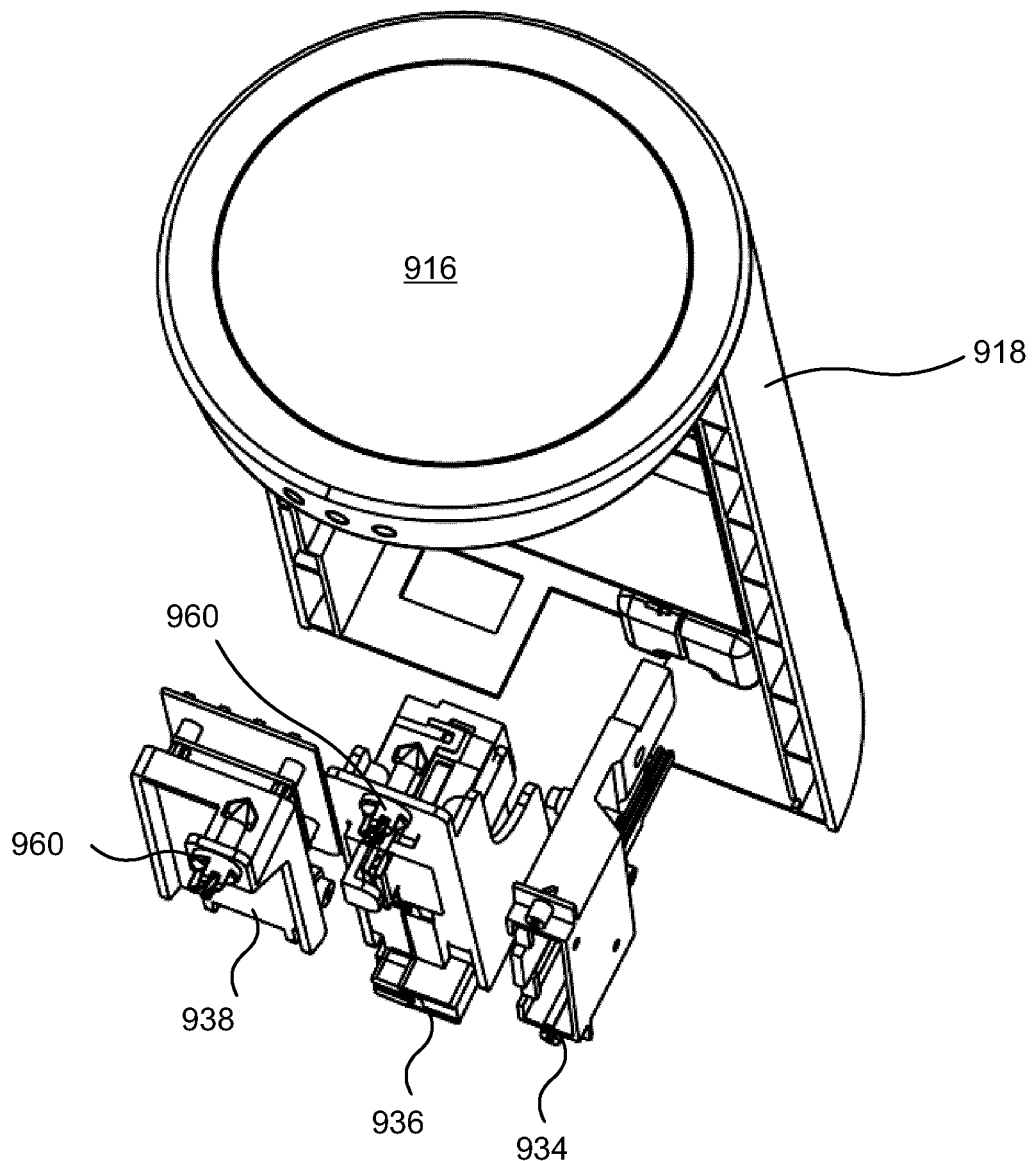
FIG. 14 depicts a top perspective view of the front cover and removable components of the parking meter of FIG. 9.

FIG. 14 depicts a top perspective view of the front cover 918 and removable components of the parking meter of FIG. 9. As described above, the internal structure 928 (not shown in FIG. 14) and/or the front cover 918 may provide mounting features to allow the payment components, such as coin chute 936, card reader 934 and contactless payment reader 938 to be releasably secured within the parking meter. As an example, the payment components may be secured to the front cover 918 and internal structure 928 using thumb-screws 960. The thumbscrews 960 allow the components to be easily disengaged from the internal structure and/or front cover for inspection, service, or removal from the internal structure and/or front cover if necessary. The thumbscrews 960 may be inserted through a capturing component on the internal structure and turned an amount, such as a quarter turn, in order to secure the connection. For example, during routine maintenance on the street, a coin chute 936 may be quickly replaced with another coin chute by unscrewing the thumbscrew or thumbscrews and removing the coin chute 936. Additionally or alternatively, unscrewing the thumbscrew may allow the payment component to be moved to a partially attached position which allows the payment component to be easily inspected while not being fully separated from the parking meter. For example, the payment components may be pivotally connected to the internal structure and/or front cover. Unscrewing the thumbscrew may allow the payment component to become partially disengaged from the internal structure and/or front cover and swing outwards into a disengagement position. Such a disengagement position may provide improved visibility for inspection and improved access for service without actual removal of the payment component from the parking meter. Once inspection or service has been completed, the payment component may be swung or rotated back to a fully engaged position and the thumbscrew re-attached to secure the payment device in the fully engaged position. If upon inspection or servicing it is determined that the payment component should be replaced, it can be removed from the disengagement position and a replacement component secured to the parking meter.

Figure 15:
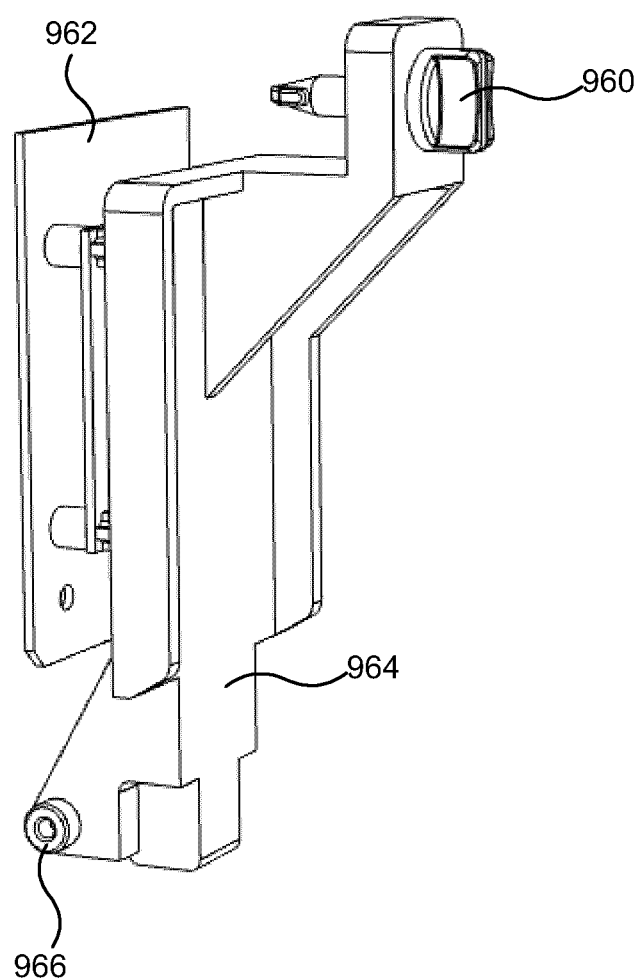
FIG. 15 depicts a detail perspective view of a removable contactless payment reader.

FIG. 15 depicts a detail perspective view of a removable contactless payment reader 938. The removable contactless payment reader 938 as depicted may include electronic components, such as the reader circuitry and antenna secured to, or formed on, one or more boards 962 that can be secured to a frame 964. The frame 964 includes a thumbscrew 960 that can be used to secure the removable contactless payment reader 938 in place. The frame 964 includes a lower portion that has a protruding cylindrical portion 966 that may act as a pivot point of the connection.

Figure 16:
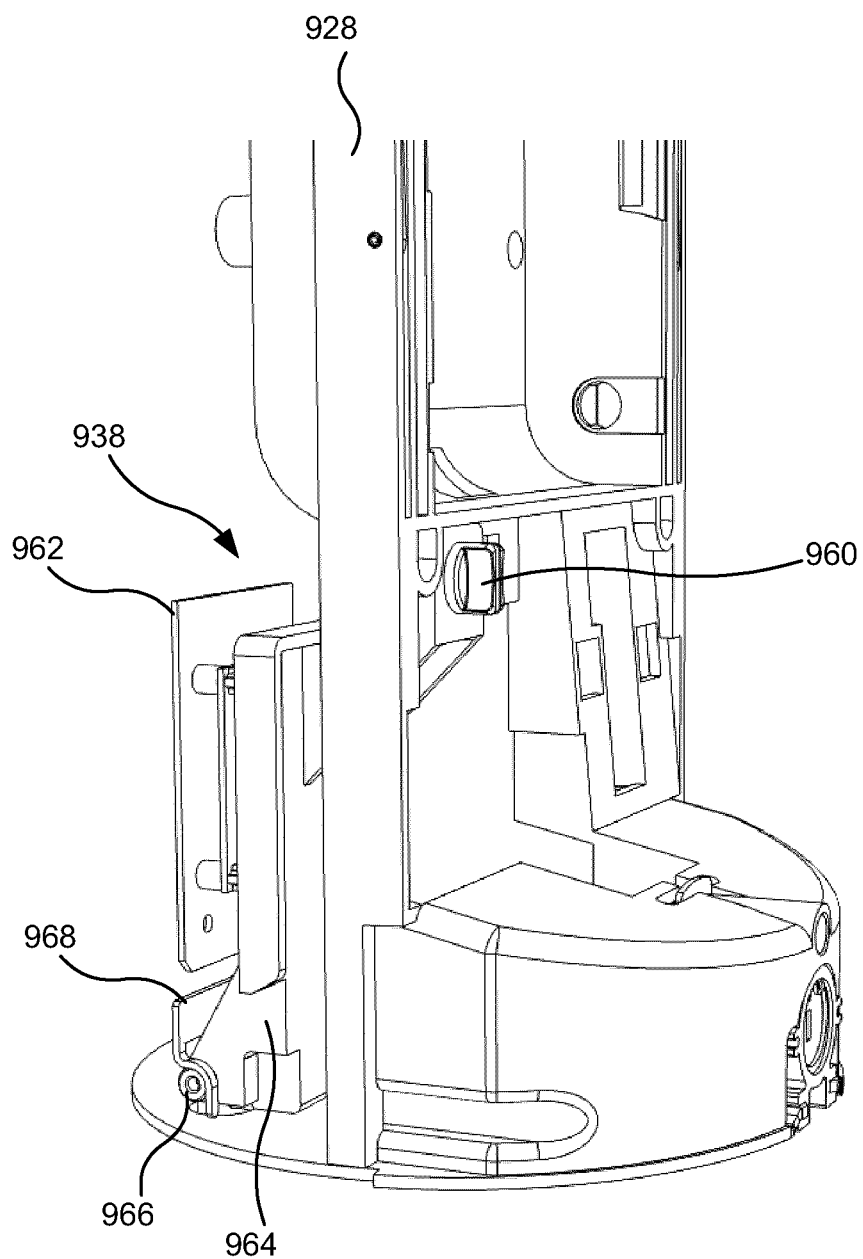
FIG. 16 depicts details of the mounting of the removable contactless payment reader of FIG. 15 to the internal structure of FIG. 12.

FIG. 16 depicts details of the mounting of the removable contactless payment reader of FIG. 15 to the internal structure of FIG. 12. The contactless payment reader 938 is secured within the parking meter by a thumbscrew 960 that secures the reader 938 to the internal structure 928. Additionally the cylindrical protrusion 966 of the frame 964 provides a second connection point that can help provide a secure connection of the removable contactless payment reader to the parking meter. The cylindrical protrusion may be partially secured against a retaining bar 968 that may be secured to the parking meter, for example by screws or other attachment means. When the internal structure 928, and front cover (not shown) are raised, the removable contactless payment reader 938 may be removed by disengaging the thumbscrew 960 and lowering the removable contactless payment reader 938 so that the cylindrical protrusion clears the retaining bar 968 and the reader 938 can be fully removed from the parking meter. The contactless payment reader 938 may be partially disengaged from the internal structure by disengaging the thumbscrew 960, but maintaining contact between the cylindrical protrusion 966 and the retaining bar 968. Such partial disengagement may allow the component to be rotated for quick inspection. The component may then be easily re-secured to the internal structure 918 by the thumbscrew 960.

Figure 17:
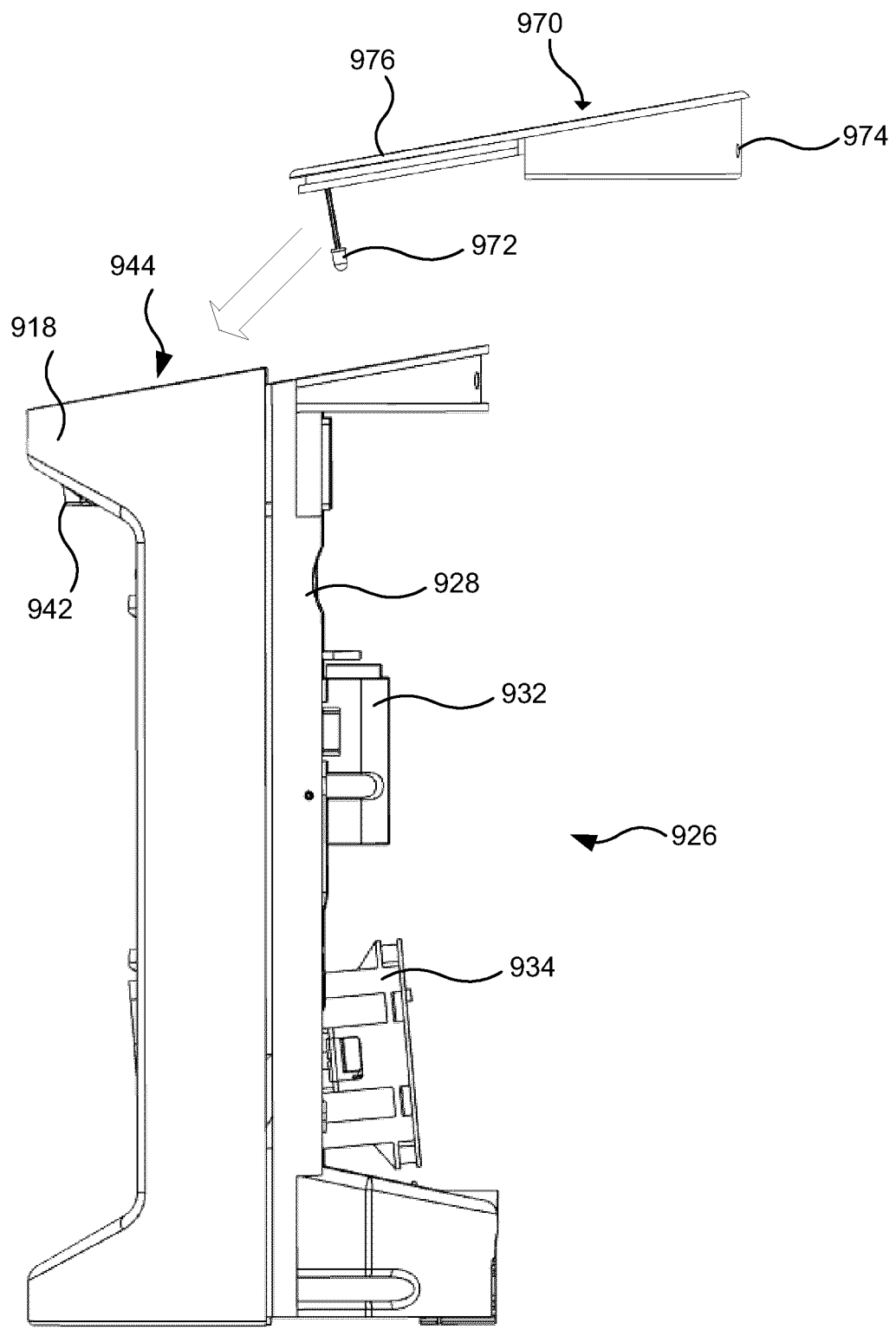
FIG. 17 depicts a side view of the front cover, internal structure and solar panel assembly.

FIG. 17 depicts a side view of the front cover, internal structure and solar panel assembly. The parking meter may include a solar panel that is located in a solar panel assembly 970 that can be inserted into the front assembly 901, and further electrically engages with a battery of the parking meter when the solar panel assembly is fully engaged with the front assembly. This allows the solar panel assembly 970 to be easily replaceable and/or serviceable in the event of vandalism, failure, or other damage or malfunction. The solar panel assembly 970 may include the one or more lights 972 that can be exposed through a small opening or downward protrusion 942 in the front cover 918 for illuminating the user interface of the parking meter. The solar panel assembly 970 may further include status LEDs or holes 974 for permitting the visibility of such status LEDs. As depicted, the solar panel assembly 970 may include a channel 976 that matches with the ridge 944 to secure the solar panel assembly 970 within the front assembly 901. FIG. 17 also depicts a rotatable battery compartment 932 as well as the card payment reader 934.

Figure 18:
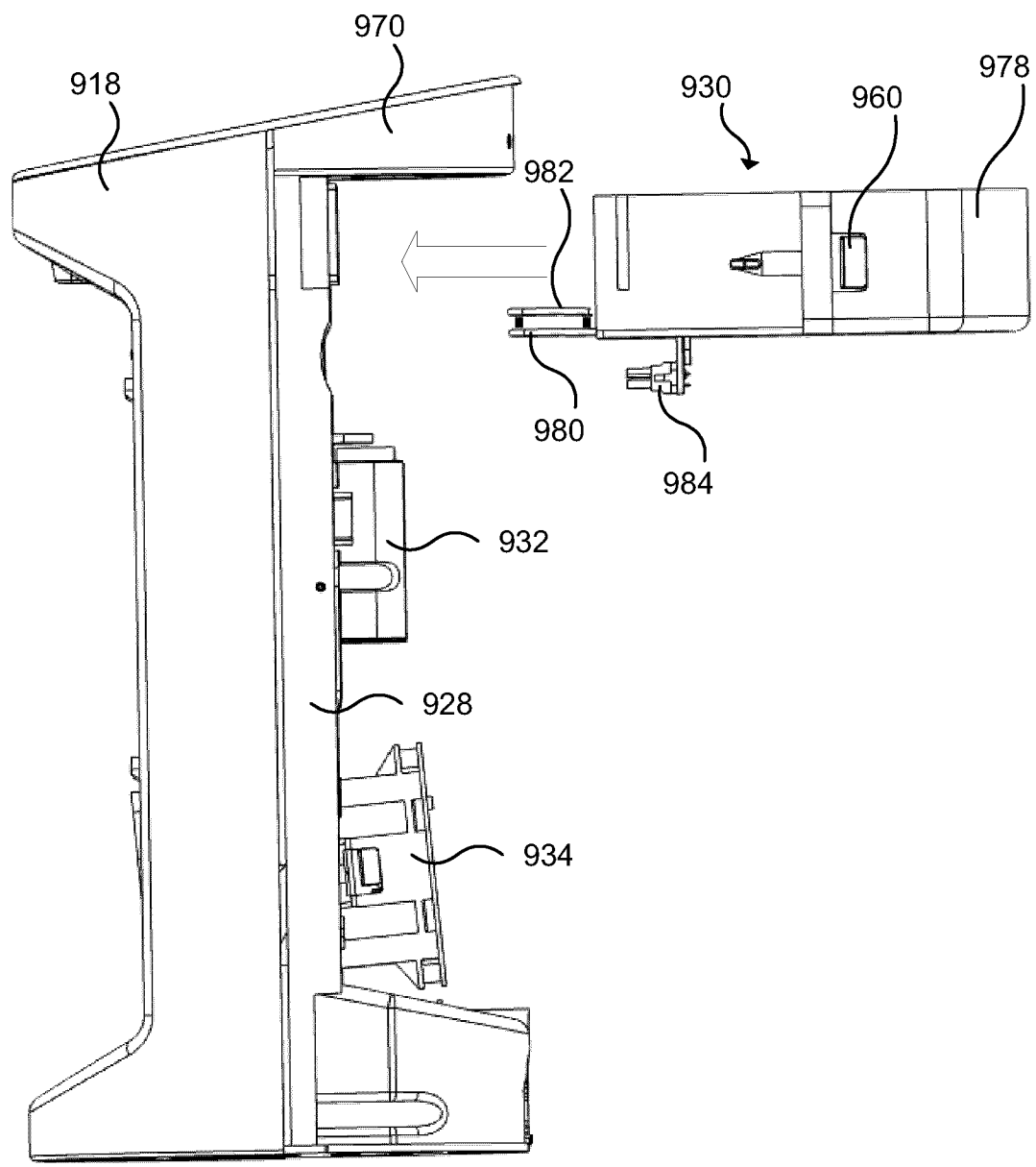
FIG. 18 depicts a side view of the front cover, internal structure, solar panel assembly and radio assembly.
Figure 19:
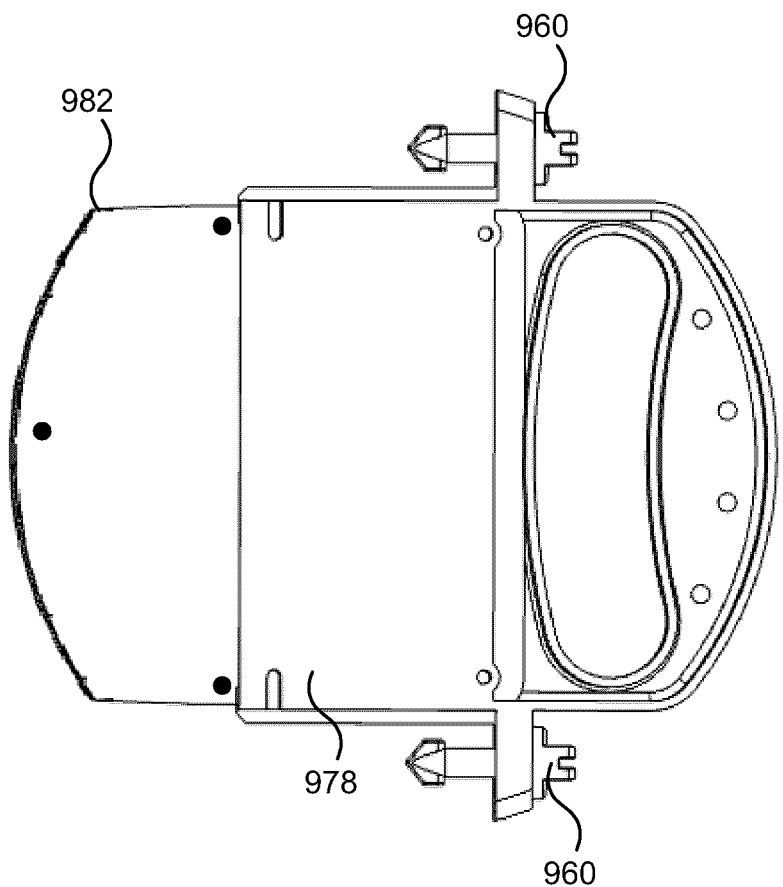
FIG. 19 depicts a top view of the radio assembly.

FIG. 18 depicts a side view of the front assembly and radio assembly (or radio communication component). In addition to the slidable solar panel assembly 970 described above, the radio antenna of the parking meter may be provided in a radio antenna compartment or removable radio module 930 that slidably engages with or is removably coupled or secured to the front assembly 901 and further electrically engages with the main electronics board when it is fully engaged onto the front assembly. The radio antenna compartment 930 may be secured in position by, for example, thumbscrews 960. The radio antenna compartment 930 comprises a housing 978 that can enclose radio electronics such as radio transceivers. An electrical connector 984 may be secured to the housing 978 so that when the radio antenna compartment is slid into the front assembly, the electrical connector mates with a corresponding connection to establish power and data connections. This allows the radio and antenna combination to be quickly and easily swapped out in the field for maintenance/service, to replace/ inspect a SIM card, or to switch the meter from one cellular network to another alternative network that may have better coverage or signal strength than the original network. The radio antenna compartment 930 may include a metal ground plane 980 above which an antenna board 982 may be located. As will be appreciated, the metal ground plane may be used to provide desired radio frequency (RF) transmission performance from the antenna of the antenna board 982. The radio antenna compartment 930 may also include conductive sprays applied onto inside surfaces of the compartment for the purpose of shielding the radio and reducing spurious emissions. As depicted in FIG. 19, the radio antenna board 982 (as seen from above) may be contoured in order to follow the shape of the front cover 918 in order to locate the antenna in a favorable location adjacent the front cover.

Figure 20:
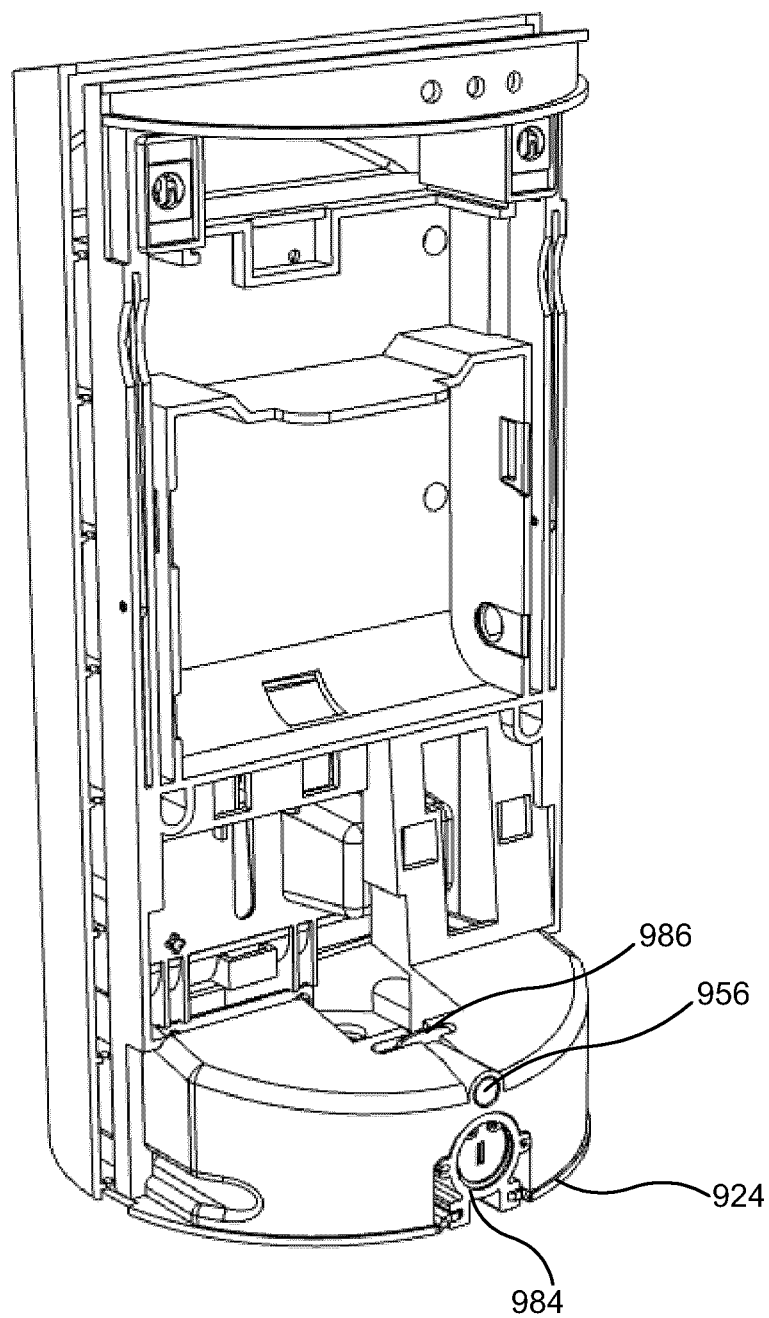
FIG. 20 depicts a rear perspective view of the front cover, internal structure and locking assembly.

FIG. 20 depicts a rear perspective view of the front cover, internal structure and locking assembly with the rear cover removed for visibility. The locking assembly may comprise a cylindrical locking component 984 that is secured to the bottom plate 924. Upon rotation of the cylindrical lock, a hook bar 986 rotates so that a hook portion captures a locking rod 956 fixed within the front assembly 901. By rotating the cylindrical lock 984 to a locked position with the hook bar engaged with the locking rod 956, the front assembly cannot be raised from the bottom plate, which in turn is secured to the coin vault assembly.

Figure 21:
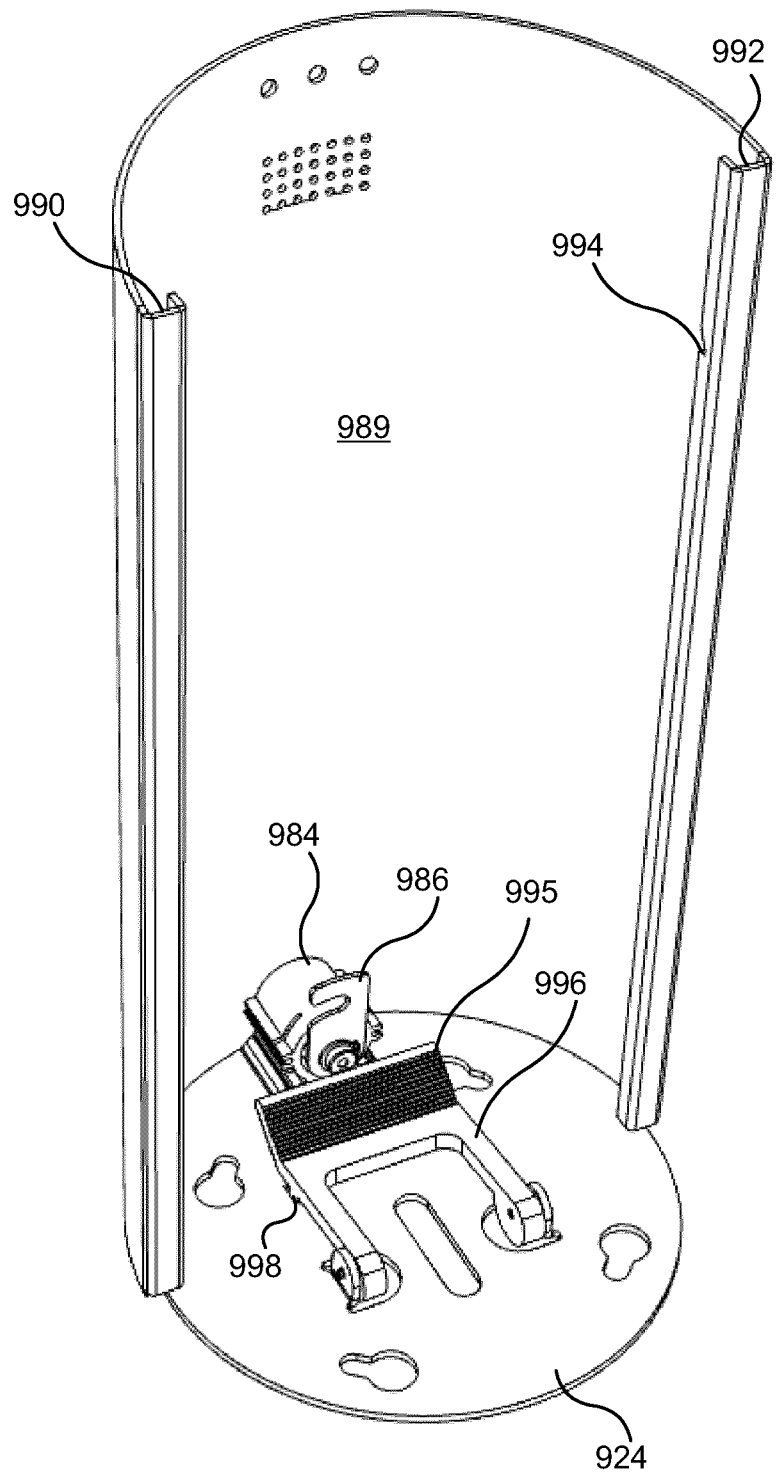
FIG. 21 depicts a perspective view of the rear cover, base plate and locking assembly.

FIG. 21 depicts a perspective view of the rear assembly. The rear assembly 920 includes a rear cover 989 that provides the rear portion of the protective housing. The rear cover 989 may be formed at least partially from a polycarbonate copolymer resin. Preferably, the rear cover is substantially formed from a polycarbonate copolymer resin. Alternatively, the rear cover 989 may be formed from metal, such as stainless steel, or other rugged materials to provide the desired protection against vandalism and the environment. The rear cover 989 includes two rails 990, 992 that can be received within the channel 958 between the bearing surfaces of the front cover 918 and the internal structure 928. The front assembly can be slid up and down the rails 990, 992. The rails may include an indent 994 that can engage a releasable locking pin to maintain the front assembly in a partially raised position, such as that of FIG. 10, to facilitate servicing and inspections. The rear assembly 920 further includes the cylindrical lock 984 and attached hook bar 986 for securing the front assembly to the rear assembly and preventing vertical movement. The rear assembly may further include a second locking component 995 that prevents rotation of the rear assembly 920. The rear assembly may be secured to the coin vault housing by twisting the rear cover, and attached bottom plate, so that expanded bolt heads secured to the coin vault housing are positioned above a reduced-sized opening. The bolt heads in this position, in combination with the reduced-sized openings of the bottom plate, prevent the rear assembly from being lifted away from the coin vault assembly. As a result, the combination of the second locking component 995 and bolt heads positioned above reduced-sized openings prevents withdrawal or removal of the rear assembly from the coin vault assembly and ensures the two assemblies are secured together. The second locking component or rotational lock 995 comprises a locking arm 996 pivotally connected to the bottom plate 924. The locking arm 996 includes two protrusions 998 (only one is labeled), although other numbers of protrusions are possible, that when the locking arm is in a lowered locked position, protrude through openings in the bottom plate and are received in corresponding apertures in the coin vault assembly to prevent rotation. When in an unlocked position, the protrusions 998 do not extend into the apertures of the coin vault assembly, and the rear assembly can be rotated such that the securing bolt heads of the coin vault assembly may be positioned within the expanded portions of the bottom plate openings. As such, the securing bolt heads can be lifted or withdrawn through the openings. Alternatively, the rear assembly may be secured to the coin vault housing using other fastening techniques such as screws or bolts, wherein the bottom plate is not rotatable in the manner as described above.

Figure 22:
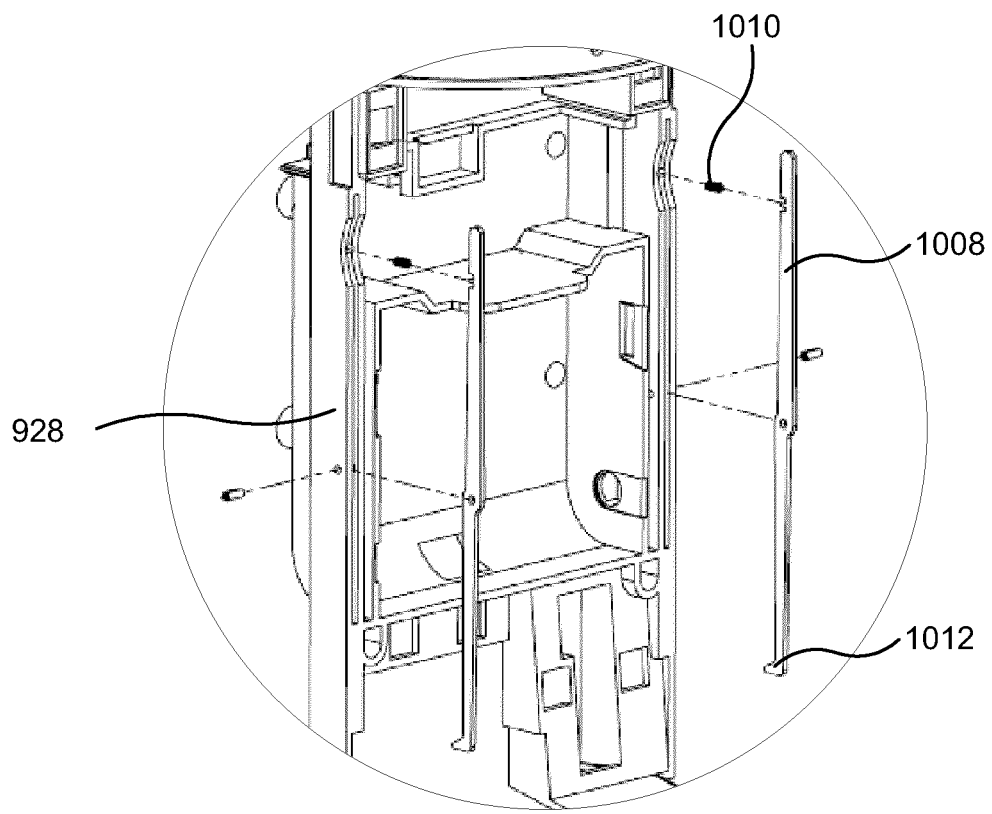
FIG. 22 depicts details of service locks.

FIG. 22 depicts details of service locks. As described above with reference to FIG. 21, the rails 990, 992 upon which the front assembly slides up and down may include indents or notches 994. Service locking bars 1008 may be pivotally connected to the internal structure 928. The locking bars 1008 may include a biasing spring 2010 at one end of the locking bars 1008 to bias the locking bars 1008 into a locked position. The locked position forces the lower end of the locking bars which includes a foot protrusion 1012 into the rail's notch or indent as it slides past. The notch 994 and foot protrusions 1012 may have an angled surface to allow the foot protrusion to be forced out of the notch 994 when sliding the front assembly upwards. However, a bottom of the foot protrusions 1012 and notches may be relatively flat so that upon sliding the front assembly down the rails, the foot protrusions may engage with the notches 994 to prevent further sliding down of the front assembly. The locking bars 1008 may be manually disengaged from the notches 994 by pressing the spring biased portion inwards to release the foot protrusions 1012 from the notches. In addition, and as discussed in greater detail above, the front assembly may be raised to a first position such that rail guides at the top of the front assembly may be released from the rails of the rear assembly at this first position, while the bottom of the front assembly remains engaged with the rear assembly. Under this configuration, there would also be a hinge, such as a telescoping or folded metal rod, located at a release point, thus allowing movement or rotation of the front assembly so that even more convenient access to the internal components for servicing or removal is made possible.

The above has described the use of polycarbonate copolymer resins in forming lightweight and vandal resistant parking meter housings. Although various polycarbonate copolymer resins may be used, one commercially available example is the Lexan EXL® resin series made by SABIC (Saudi Arabia Basic Industries Corporation). Lexan EXL® resin is a copolymer formulation of polycarbonate and polysiloxane providing a material having high impact resistance, low temperature ductility and favourable humidity characteristics. Polycarbonate copolymer resins such as the Lexan EXL® resin series may also include electrical and flame retardant properties, UV-stabilizers, improved aesthetics such as high surface finish, and a broad spectrum of both opaque and transparent colours. In addition, as a favourable plastic for addressing eco-footprint concerns and demands, the Lexan EXL® resin series is based on non-chlorine and non-bromine flame retardant systems, and is free from heavy-metal pigments. In addition to the Lexan EXL® resin series, and as discussed further below, an alternative polycarbonate copolymer resin, or polycarbonate blended resin that may be used is the Makroblend UT1018 resin made by Covestro LLC.

In contrast to polycarbonate copolymer resins such as the Lexan EXL® resin series, non-copolymer or traditional polycarbonate material is less flexible, more susceptible to stress cracking or fracturing (particularly in cold conditions), more easily marked, has lower abrasion resistance, and has less favorable ductility and flexibility properties over a wide temperature range. In addition, non-copolymer or traditional polycarbonate is less favorable than nylon with respect to chemical resistance.

In the alternative to a polycarbonate copolymer, or polycarbonate blended resin, such as the Lexan EXL® resin series or the Makroblend UT1018 resin, other commercially available example materials that may be used for the housing exist. For example, the OnForce™ LFT NN-60LGF/000 HS Natural product of PolyOne Corporation, and the RTP 299 A X 140812 A product of RTP Company, each when combined or included with long glass fiber (LGF) or Kevlar fiber, may be suitable materials for the parking meter housing.

Both of the above-noted alternative products (of PolyOne Corporation and RTP Company) are nylon-based, and are technically known as aliphatic or semi-aromatic polyamides (PA). (The prefix "PA" and "nylon" are equivalent in meaning.) In similar impact tests, the Lexan EXL® was found to be preferable to both of the above-noted materials even when those materials were combined with LGF. The OnForce (PolyOne Corporation) product noted is PA 66 made from hexamethylenediamine and adipic acid. The RTP product is PA 6 made from ε-Caprolactam. Both products are considered homopolymers. Copolymers, on the other hand, comprise a plurality of monomers, wherein one monomer of a copolymer is known as a comonomer. Both the OnForce and RTP products may preferably be combined with or include long glass fiber (LGF) material to increase their strength. Including LGF, or alternatively, Kevlar fiber, in this regard, results in a preferable material with respect to strength and other desirable characteristics as compared to standard nylon, such as standard PA 66 or standard PA 6.

PA 6 and PA 66 nylon materials can alternatively be combined to form a copolymer, i.e., PA 6/66 made from caprolactam, hexamethylenediamine and adipic acid. As they stand on their own, they have not been mixed or combined, and as such their crystallinity (which contributes strength and rigidity) and melting point are typically greater than the crystallinity and melting point of a copolymer that has resulted from a mixture of comonomers or pairs of comonomers. However, a mixture that forms a copolymer may still possess high crystallinity while increasing the amorphous regions in a material which contributes to its flexibility or elasticity. An example of a PA 6/66 copolymer that is nylon-based and that may be used to substantially or significantly form a parking meter housing is as DuPont's ZYTEL® 74G33J.

Preferably, a plastic copolymer or blended resin material that strikes a balance between crystallinity and elasticity (i.e., stiffness and toughness) is used. Standard or conventional nylon and polycarbonate materials do not offer the desired balance that achieves the materials characteristics found in a copolymer or a blended resin, such as those described herein. Moreover, standard or conventional nylon and polycarbonate materials may not provide material characteristics or performance that would make them preferable or acceptable for use or deployment in applications previously addressed by metal, such as the external housing of a parking meter, when compared with the material characteristics and performance of a copolymer or blended resin. In the alternative to a copolymer or blended resin, a nylon based polymer that includes long glass fiber or Kevlar fiber may be preferable over standard or conventional nylon and polycarbonate materials.

As noted above, Lexan EXL® is a copolymer made of polycarbonate and siloxane (silicone rubber). Nylon-based materials tend to absorb moisture at a rate greater than other plastics such as polycarbonate. Polycarbonate materials have a lower RF absorption coefficient (wherein a lower coefficient makes for better RF performance) than nylon-based materials. Unlike most thermoplastics, polycarbonate can undergo significant plastic deformations without cracking or breaking. A polycarbonate blend that may be an alternative to the Lexan EXL® polycarbonate copolymer and that may be used to substantially or significantly form a parking meter housing is the Makroblend UT1018 resin made by Covestro LLC, which is an impact-modified blend of Makrolon® polycarbonate and polyethylene terephthalate (PET) polyester. This plastic blend combines the physical toughness of polycarbonate with the favorable chemical resistance of PET, and provides favorable chemical resistance, favorable low-temperature impact strength, and favorable dimensional stability, even in high-moisture environments. Its fatigue endurance and abrasion resistance are preferable to that of standard polycarbonate. The naturally glossy finish of Makroblend UT1018 resin provides an attractive surface that does not require painting. The resin is opaque and is supplied in pellet form for injection molding or extrusion.

The above-described favorable characteristics of polycarbonate copolymer and polycarbonate blended resins, nylon-based copolymers, and nylon-based polymers that include long glass fiber or Kevlar fiber are not commonly or generally known to those skilled in the art of parking meters. In this regard, the common general knowledge of those skilled in the art of parking meters is to prefer metallic parking meter housings given such housings are widely accepted and in use based on a strong track record for security and vandal-resistance, given use of plastics in parking meters has been overwhelmingly limited to internal molded plastic components and limited external components such as clear plastics for windows that cover a user display, and/or given the disadvantages of traditional polycarbonate (i.e., non-copolymer) or other traditional plastic material that would or may be felt if such material were used in or for a parking meter housing.

Although various individual features and/or functionality may have been described with reference to a specific embodiment, such features and/or functionality may be incorporated into other embodiments.

Although specific embodiments of a retrofit parking meter are described, it will be appreciated that other parking meter designs, including other parking meter components or configurations of parking meter components, may be implemented. Variations and modifications not described herein will be apparent to one of ordinary skill in the art having regard to the description herein.

What is claimed is:

1. A parking meter comprising:
   a removable assembly comprising:
      a structure formed from at least one of plastic, co-polymers and resins, the structure comprising a plurality of releasable mounting point connections molded integrally with the structure;
   one or more parking meter payment components comprising one or more of a card reader, contactless payment reader and a coin chute, each of the one or more of the parking meter payment components individually secured to one or more of the releasable mounting point connections of the structure by a toolless releasable connector;
   a first external housing secured to the structure of the removable assembly and formed at least significantly of a high-strength housing material comprising at least one of:
      high strength plastic;
      high strength co-polymers; and
      high-strength resins;
   a second external housing secured at a parking location, the second external housing secured to the first external housing of the removable assembly in a first orientation to provide a unitary housing enclosing the parking meter payment components of the removable assembly to provide protection for the parking meter payment components against an external environment and vandalism attack, and wherein at least one of the first external housing and the second external housing is vertically slidable relative to each other into a second orientation in which the first external housing is attached to the second external housing, and the toolless releasable connector of the respective one or more releasable mounting point connections of the removable assembly are accessible to release the one or more parking meter components from the structure;
   a saddle plate secured between a top of an existing coin vault at the parking location and a bottom of the second external housing, the saddle plate providing a transition
      between a rectangular profile of the top of the existing coin vault and a circular profile of the bottom of the second external housing;
   one or more reinforcing members secured to or that are part of at least one of the first external housing of the removable assembly and the second external housing secured at the parking location to strengthen at least a section of the unitary housing.

2. The parking meter of claim 1, wherein the first and second external housings comprise a front housing and a rear housing respectively.

3. The parking meter of claim 1, wherein the first and second external housings comprise an upper housing and a lower housing respectively.

4. The parking meter of claim 1, wherein the one or more reinforcing members reinforce one or more connection points of the unitary housing.

5. The parking meter of claim 1, wherein the one or more reinforcing members comprise at least one of:
   a wedge;
   a truss;
   a rib;
   a cross-brace; and
   a stringer.

6. The parking meter of claim 1, wherein the high-strength material includes a mixture of small glass or ceramic beads or microspheres.

7. The parking meter of claim 1, wherein the high-strength material provides low attenuation of RF signals.

8. The parking meter of claim 1, wherein the parking meter components comprise one or more RF transmitters, and wherein the one or more RF transmitters comprise one or more of:
   a near-field communication (NFC) reader;
   a Bluetooth radio;
   a ZigBee radio;
   a WiFi radio; and
   a cellular radio.

9. The parking meter of claim 1, further comprising one or more RF transmitters, and wherein the one or more RF transmitters comprises a WiFi radio, and the WiFi radio uses one or more service flow channels associated with one or more WiFi routers located within wireless communication range of the parking meter.

10. The parking meter of claim 1, wherein at least one of the first external housing and the second external housing comprises at least one of the following: one or more openings through which one or more buttons or interaction control components protrude, extend or are exposed; an opening through which a display is visible; a transparent portion through which a display is visible; and, an opening through which a solar panel is exposed, or a recess in which a solar panel is received.

11. The parking meter of claim 1, wherein the contactless payment reader is mounted: behind a surface of the unitary housing; or, on top of a surface of the unitary housing and is covered by a protective covering.

12. The parking meter of claim 1, wherein the parking meter comprises two or more flip-dots, and at least one of the first external housing and the second external housing comprises an opening or window through which the flip-dots are visible.

13. The parking meter of claim 1, wherein the parking meter further comprises input controls, wherein at least one of the first external housing and the second external housing comprises an opening through which a display is visible or a transparent portion through which a display is visible, and wherein the display and input controls are provided by a touch screen display.

14. The parking meter of claim 1, wherein the parking meter comprises a touch or proximity sensor located on at least one of the first external housing and the second external housing for detecting an initial user proximity or interaction with the parking meter.

15. The parking meter of claim 1, wherein the parking meter is a single space parking meter.

16. The parking meter of claim 15, wherein the second external housing is secured to a stationary structure and the first external housing is lockably secured to the second external housing, at least some parking meter components secured to the first external housing of the unitary housing.

17. The parking meter of claim 16, wherein the unitary housing is generally cylindrical in shape, and wherein the first external housing of the unitary housing slides vertically relative to the second external housing of the unitary housing into the second orientation.

18. The parking meter of claim 16, wherein the first and second external housings of the unitary housing comprise one or more rails or rail guides, respectively, and at least one of the one or more rails or rail guides comprises one or more of: a spring-catch assembly; and, a removable or detachable rail or rail guide for allowing release, separation or detachment of the first external housing relative to the second external housing.

19. The parking meter of claim 18, wherein the parking meter further comprises a hinge joining the first and second external housings and which allows rotation of the first external housing relative to the second external housing.

20. The parking meter of claim 1, wherein the parking meter is a multi-space parking meter.

21. The parking meter of claim 1, wherein the first external housing material comprises a polycarbonate copolymer, a polycarbonate blended resin, or a nylon-based copolymer.

22. The parking meter of claim 1, wherein the one or more of the parking meter components releasably secured to the one or more of the mounting point connections of the structure are secured by thumb screws.

23. The parking meter of claim 1, further comprising a low-power short-range radio frequency (RF) radio for receiving payment information from a mobile device or vehicle.

24. The parking meter of claim 23, wherein the low-power short-range RF radio comprises a Bluetooth radio that is paired to the mobile device or vehicle prior to receiving the payment information.

25. The parking meter of claim 23, wherein the received payment information comprises one or more of:
a payment amount;
a park time;
an expiry time; and
payment authorization details.

26. The parking meter of claim 23, wherein the RF radio is further for one or more of the following: communicating meter diagnostics information; communicating collected meter data; and, configuring the parking meter.

27. The parking meter of claim 23, wherein the low-power short-range RF radio is at least partially powered by an alternative energy harvesting mechanism or device that harvests energy from one or more of: ambient RF signals; variations or differentials in nearby materials temperatures; and, street vibrations.

28. The parking meter of claim 1, wherein the one or more reinforcing members are formed of at least one of a metal, a metal alloy and a ceramic.

29. The parking meter of claim 28, wherein the one or more reinforcing members are secured to or are part of an internal portion of at least one of the first external housing and the second external housing.

30. The parking meter of claim 29, wherein the one or more reinforcing members are secured to the internal portion of the first external housing by one or more mechanical fasteners.

31. The parking meter of claim 29, wherein the one or more reinforcing members are secured to the internal portion of the first external housing through: one or more formed structures of the first external housing mechanically retaining the one or more reinforcing members; one or more of a friction fit, interference fit or snap-in fit; or, an over-molding process.

32. The parking meter of claim 29, wherein the one or more reinforcing members comprise: one or more metal rods to provide protection against cutting type vandalism attacks; or, one or more metal structures at least partially surrounding one or more openings within the unitary housing.

33. The parking meter of claim 32, wherein the one or more metal rods are secured to the first external housing through retaining structures or vertical channels of the first external housing, and the retaining structures or vertical channels extend vertically along a substantial portion of an interior surface area of the first external housing.

34. The parking meter of claim 1, wherein a plurality of reinforcing rods are retained on an interior circumference of the second external housing by a plurality of vertically extending retaining structures.

35. The parking meter of claim 1, wherein in the second orientation in which the toolless releasable connectors are accessible, the first external housing remains attached to the second external housing.

* * * * *